US008588563B2

(12) United States Patent
Alexopoulos et al.

(10) Patent No.: US 8,588,563 B2
(45) Date of Patent: Nov. 19, 2013

(54) PROJECTED ARTIFICIAL MAGNETIC MIRROR WAVEGUIDE

(75) Inventors: Nicolaos G. Alexopoulos, Irvine, CA (US); Chryssoula A. Kyriazidou, Kifisia (GR)

(73) Assignee: Broadcom Corporation, Irvine, CA (US)

( * ) Notice: Subject to any disclaimer, the term of this patent is extended or adjusted under 35 U.S.C. 154(b) by 16 days.

(21) Appl. No.: 13/037,236

(22) Filed: Feb. 28, 2011

(65) Prior Publication Data

US 2011/0248180 A1 Oct. 13, 2011

Related U.S. Application Data

(63) Continuation of application No. 13/034,957, filed on Feb. 25, 2011.

(60) Provisional application No. 61/322,873, filed on Apr. 11, 2010.

(51) Int. Cl.
*G02B 6/32* (2006.01)

(52) U.S. Cl.
USPC .......... 385/31; 333/219

(58) Field of Classification Search
USPC .......... 385/129-132, 31; 335/306; 343/909; 250/396 R; 333/219
See application file for complete search history.

(56) References Cited

U.S. PATENT DOCUMENTS

| | | | | |
|---|---|---|---|---|
| 6,512,494 | B1 * | 1/2003 | Diaz et al. | 343/909 |
| 7,151,506 | B2 * | 12/2006 | Knowles et al. | 343/909 |
| 8,018,375 | B1 * | 9/2011 | Alexopoulos et al. | 342/175 |
| 2002/0051275 | A1 * | 5/2002 | Tokushima | 359/241 |
| 2005/0030137 | A1 * | 2/2005 | McKinzie et al. | 335/306 |
| 2005/0168314 | A1 * | 8/2005 | Alexopoulos et al. | 336/223 |
| 2005/0184833 | A1 * | 8/2005 | Higgins et al. | 333/208 |
| 2009/0051467 | A1 * | 2/2009 | McKinzie, III | 333/219 |
| 2009/0086322 | A1 * | 4/2009 | Lu et al. | 359/570 |

* cited by examiner

*Primary Examiner* — Charlie Peng
*Assistant Examiner* — Peter Radkowski
(74) *Attorney, Agent, or Firm* — Garlick & Markison; Timothy W. Markison; Jessica W. Smith

(57) ABSTRACT

A projected artificial magnetic mirror (PAMM) waveguide includes a substrate, metal patches, a metal backing, multiple dielectric materials, and a waveguide area. The metal patches are on a first layer of a substrate and the metal backing is on a second layer of the substrate. The first dielectric material is between the first and second layers of the substrate. The metal patches are electrically coupled to the metal backing to form an inductive-capacitive network that substantially reduces surface waves along a surface of the substrate within a given frequency band. The second dielectric material juxtaposed to the metal patches, where the waveguide area is between the second and third dielectric materials and includes the surface of the substrate. The inductive-capacitive network, the second dielectric material, and/or the third dielectric material facilitate confining an electromagnetic signal within the waveguide area.

20 Claims, 83 Drawing Sheets s = 0.15 s = 0.25 s = 0.5 effective dish antenna array 268 adjustable PAMM 276 adjustable PAMM 276 adjustable PAMM 276 waveguide area 474

PROJECTED ARTIFICIAL MAGNETIC MIRROR WAVEGUIDE

CROSS REFERENCE TO RELATED PATENTS

This patent application is claiming priority under 35 USC §120 as a continuing patent application of co-pending patent application entitled, "PROJECTED ARTIFICIAL MAGNETIC MIRROR, having a filing date of Feb. 25, 2011, and a Ser. No. 13/034,957, which application claims priority under 35 USC §119(e) to a provisionally filed patent application entitled, "PROJECTED ARTIFICIAL MAGNETIC MIRROR", having a provisional filing date of Apr. 11, 2010, and a provisional Ser. No. 61/322,873, which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to electromagnetism and more particularly to electromagnetic circuitry.

2. Description of Related Art

Artificial magnetic conductors (AMC) are known to suppress surface wave currents over a set of frequencies at the surface of the AMC. As such, an AMC may be used as a ground plane for an antenna or as a frequency selective surface band gap.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

Figure 39A:
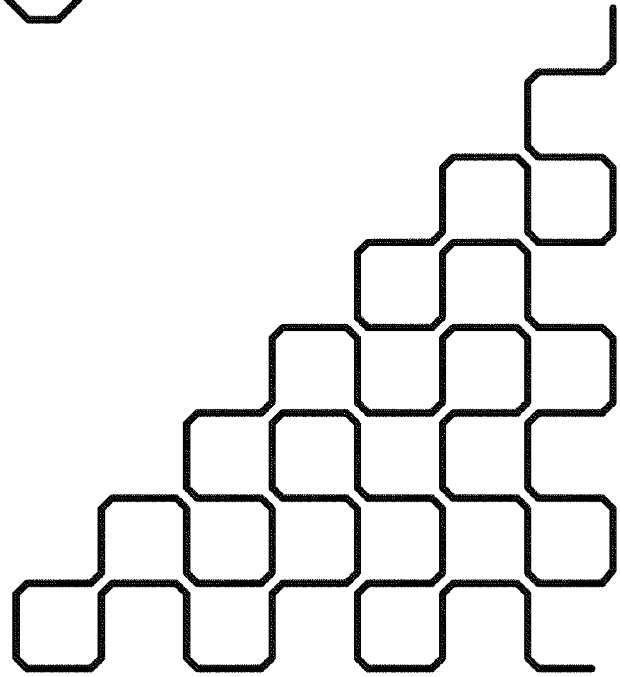
Figure 39B:
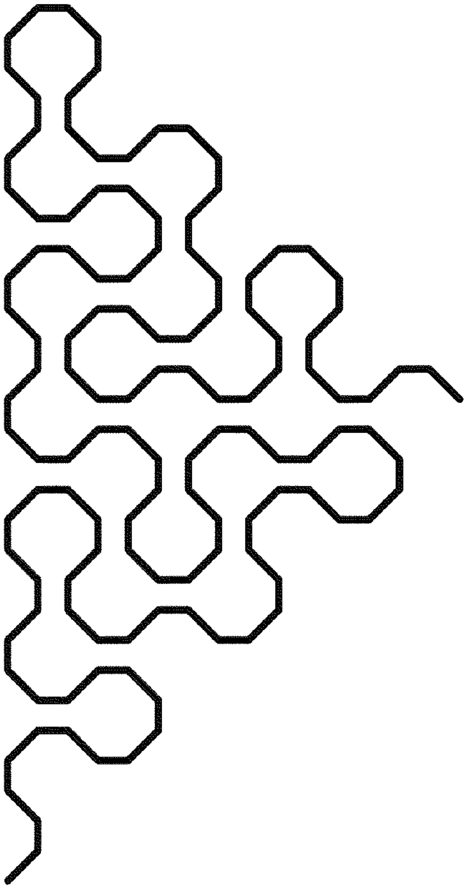
Figure 39C:
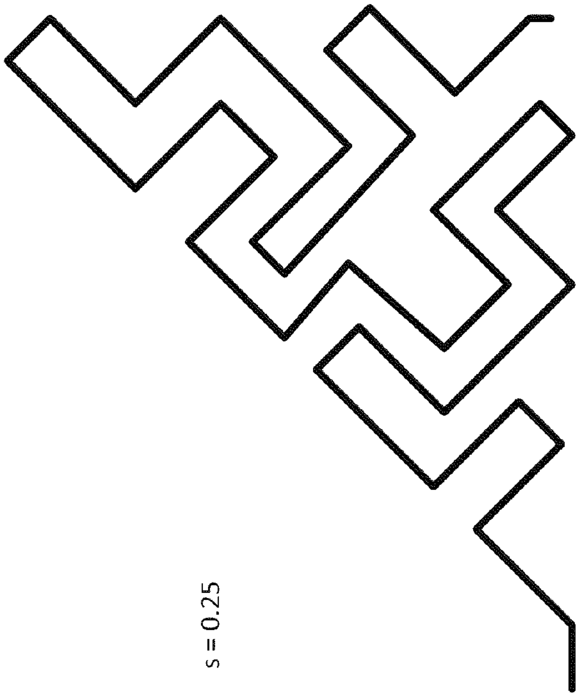
Figure 40A:
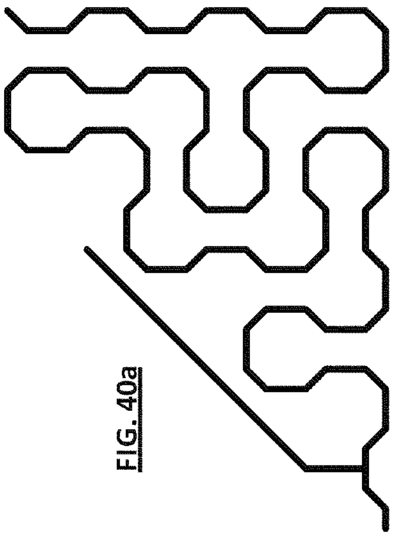
Figure 40B:
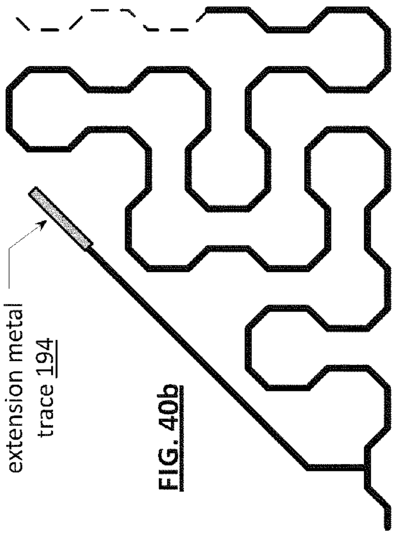
Figure 42:
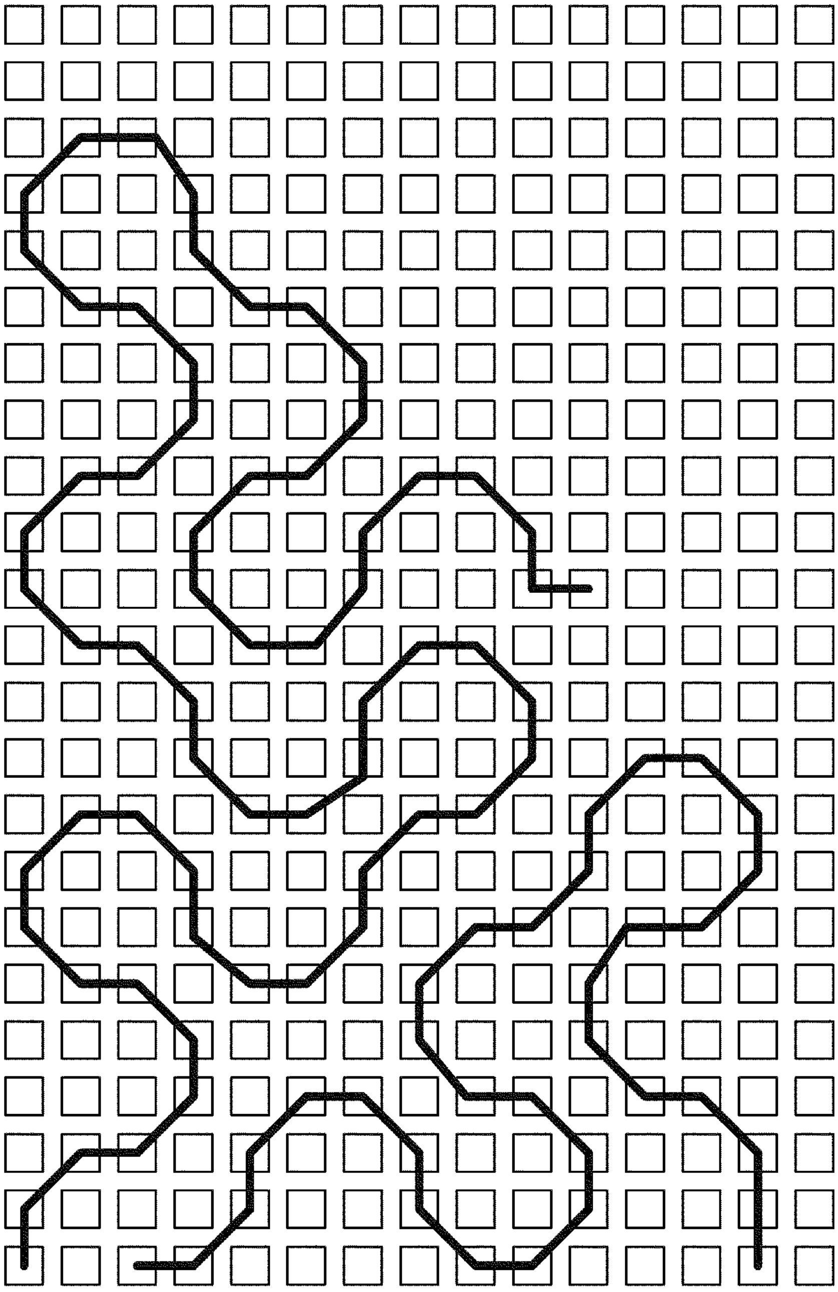
Figure 43:
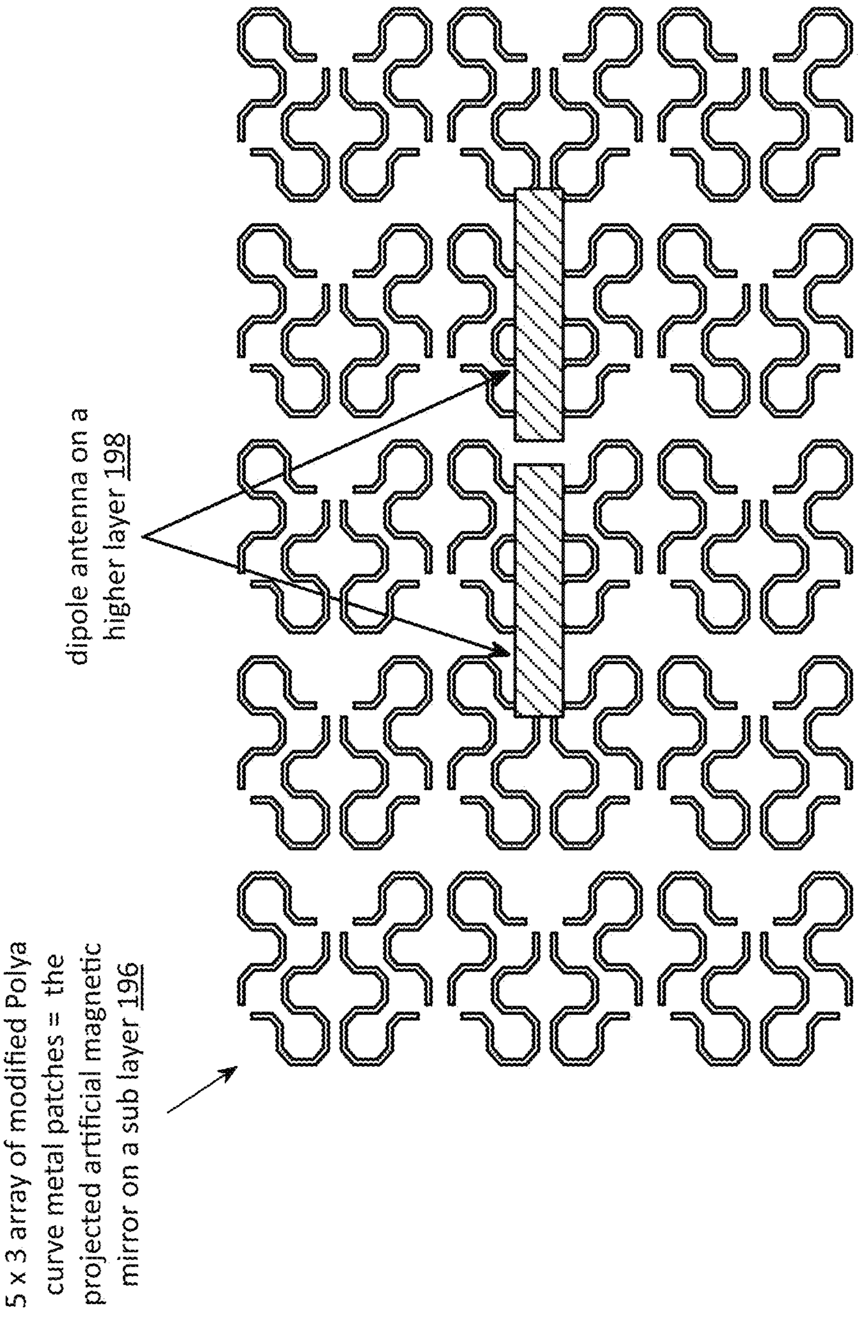
Figure 44:
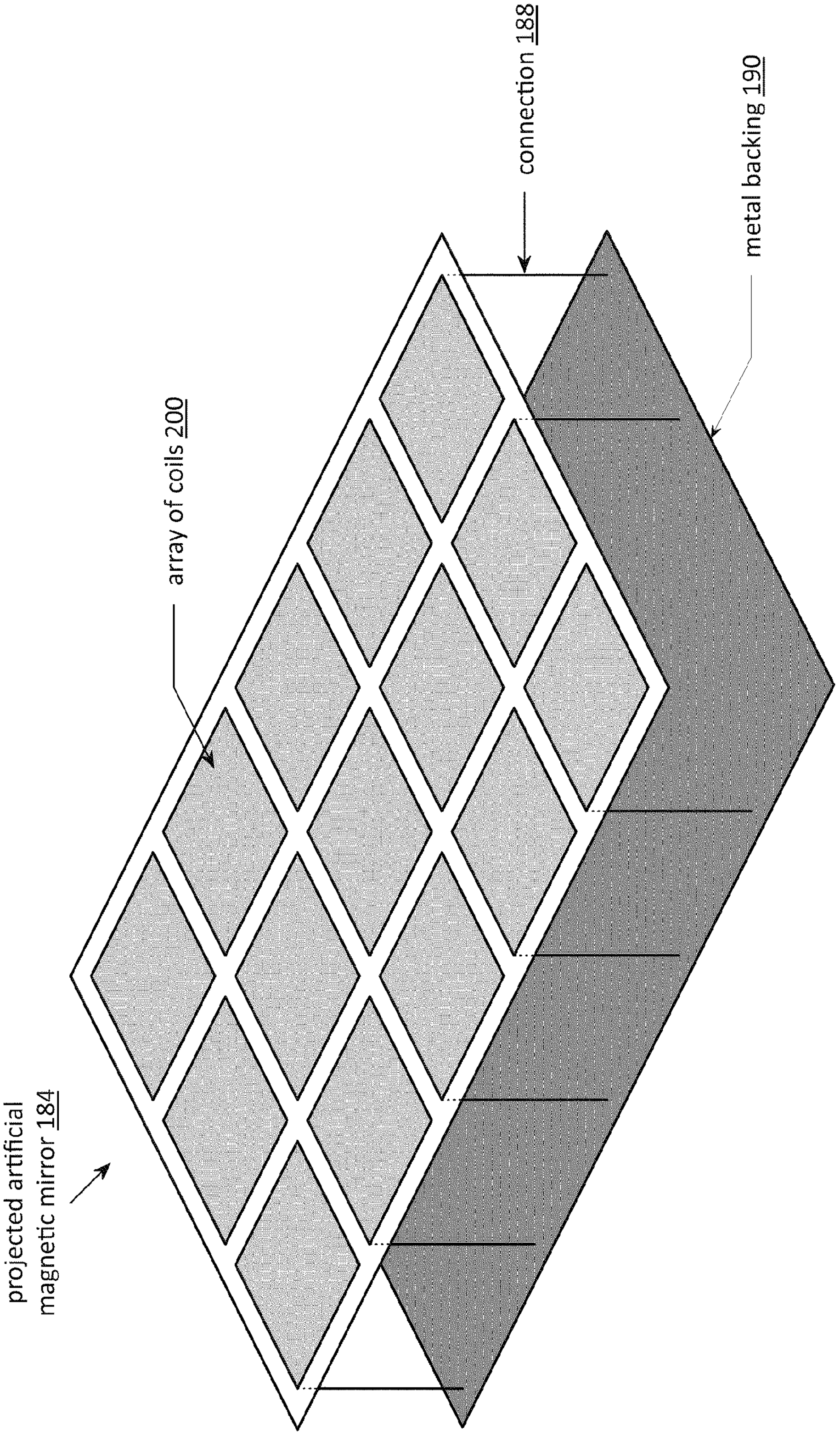
Figure 45:
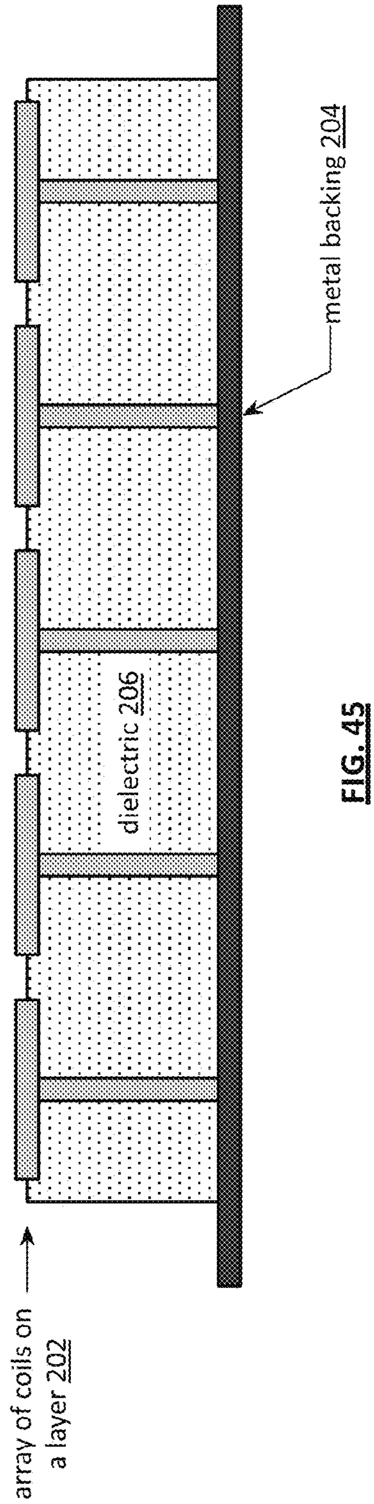
Figure 46:
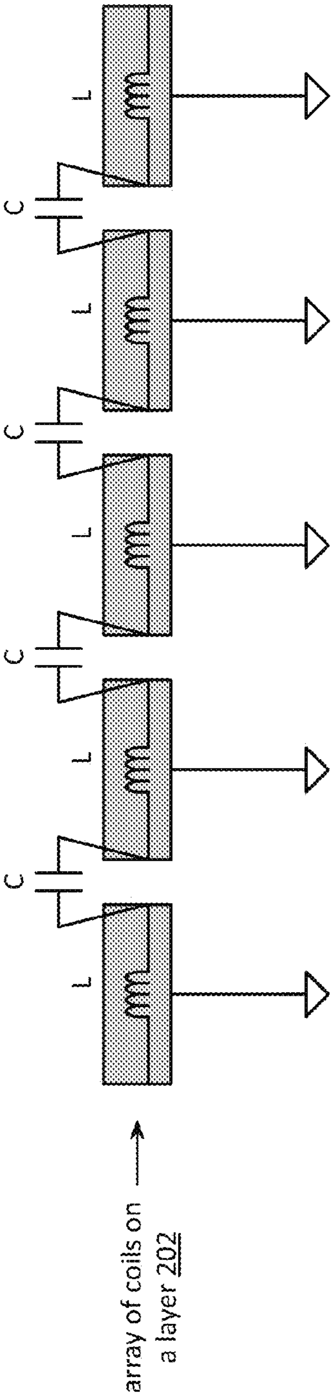
Figure 47:
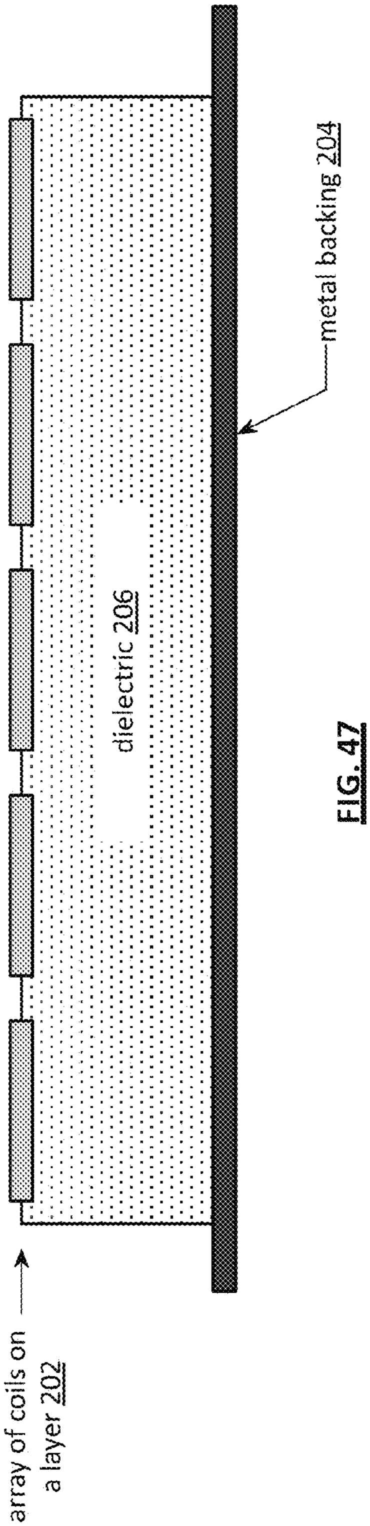
Figure 48:
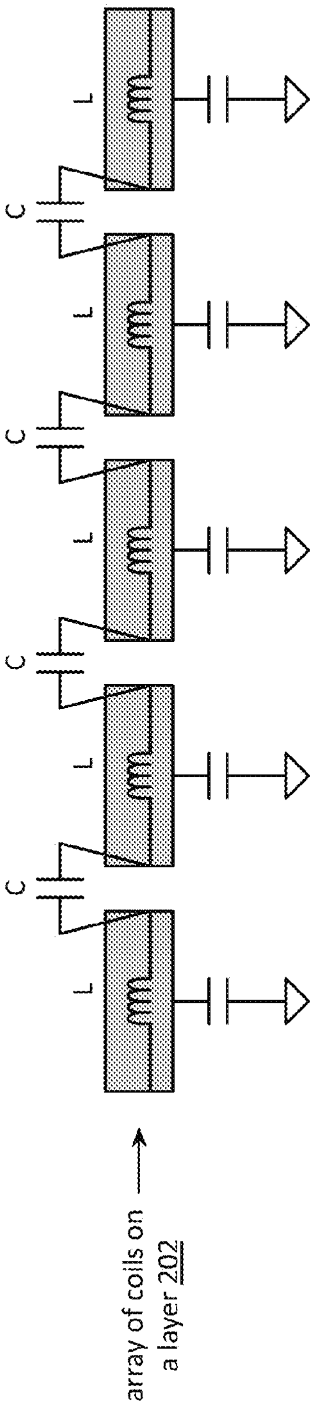
Figure 49:
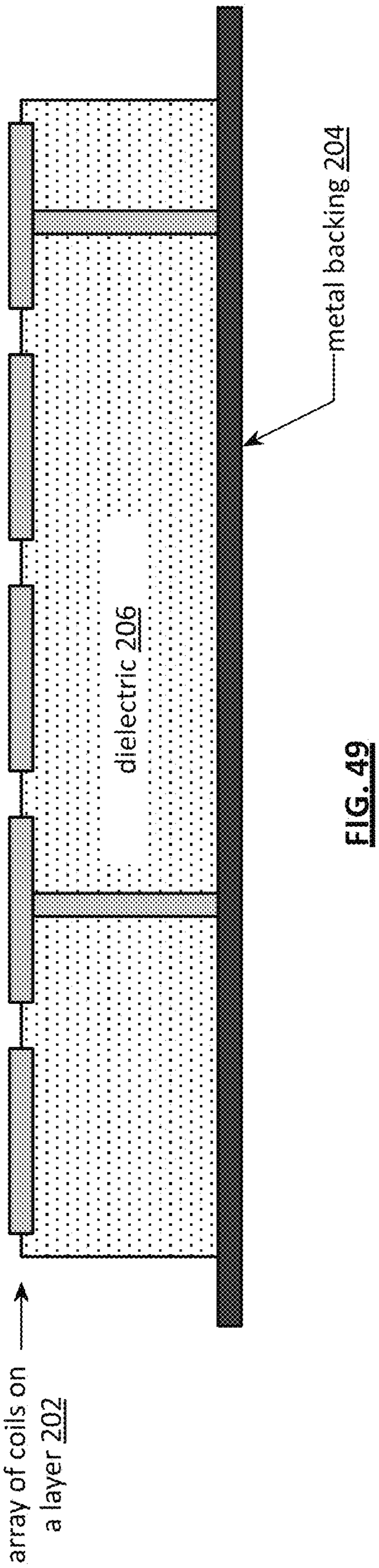
Figure 50:
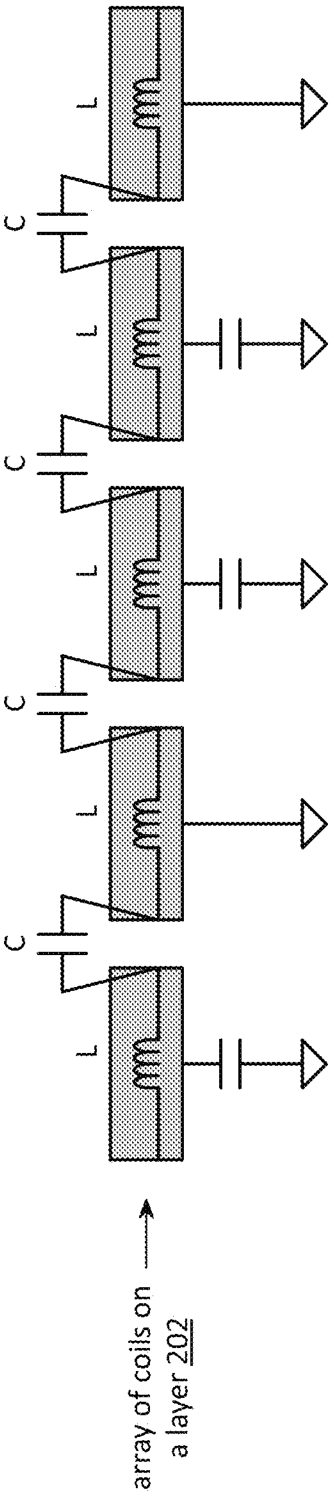
Figure 51:
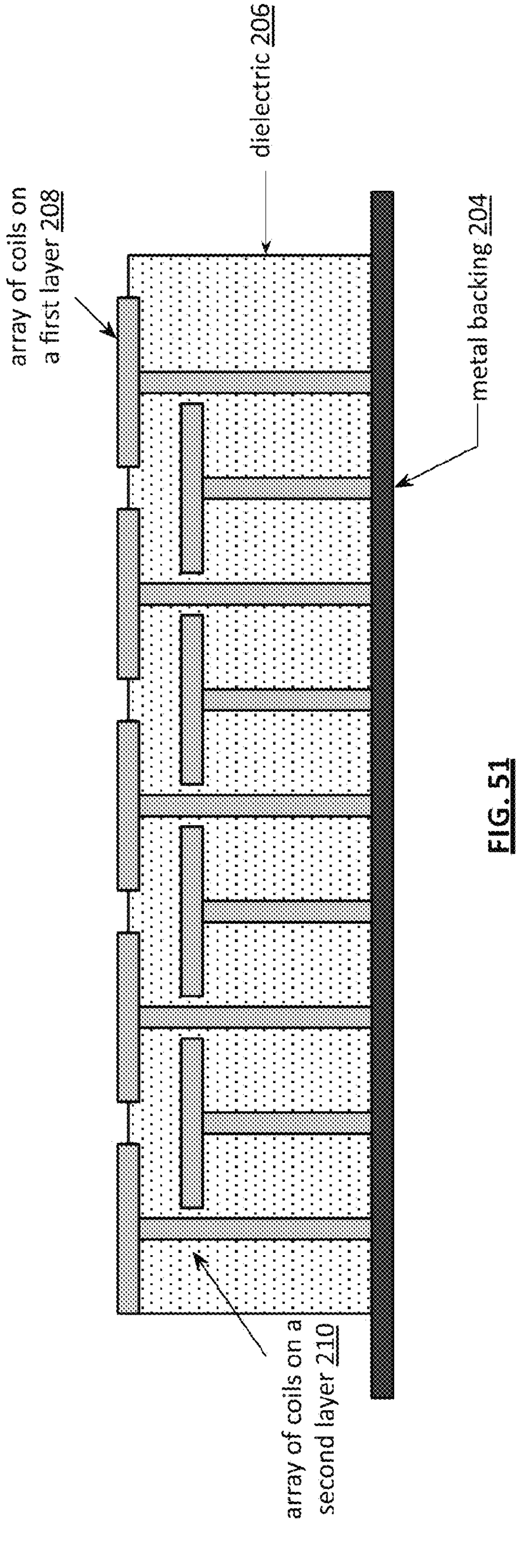
Figure 52:
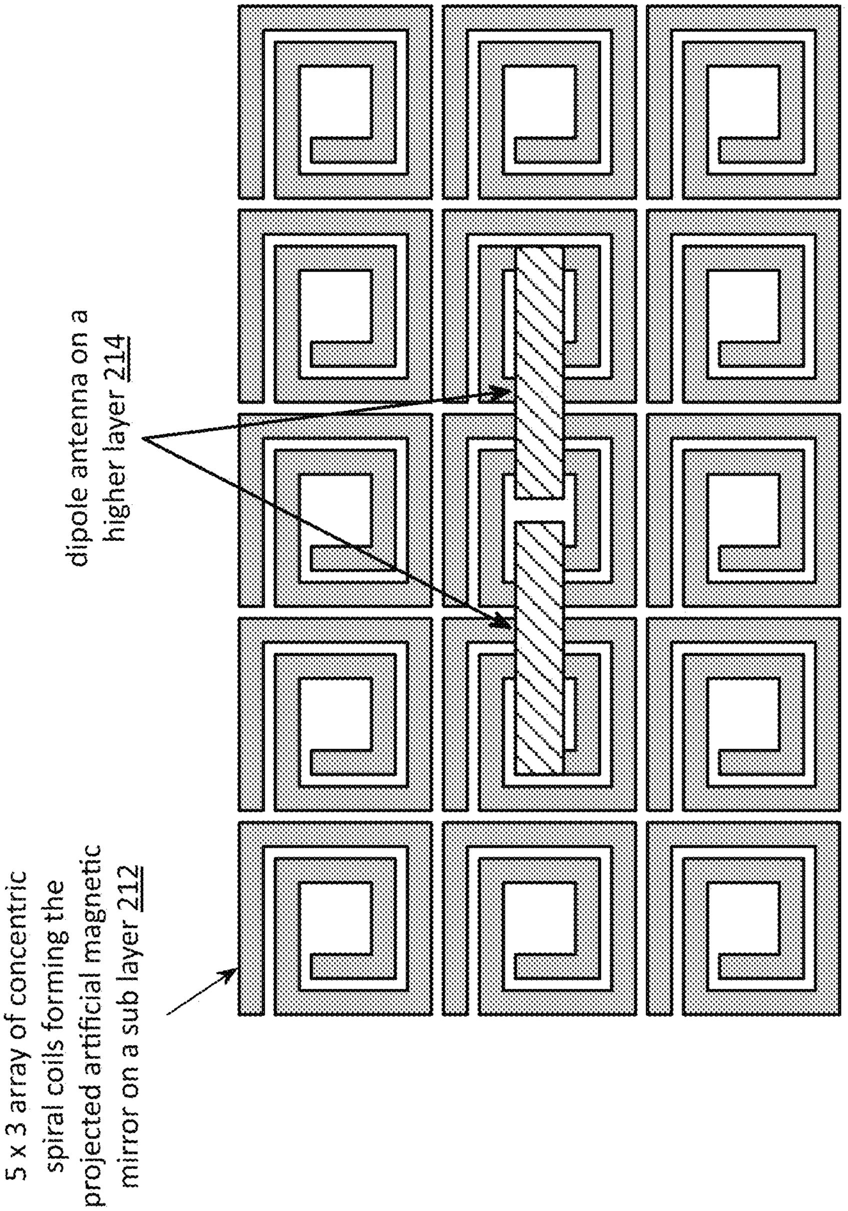
Figure 53:
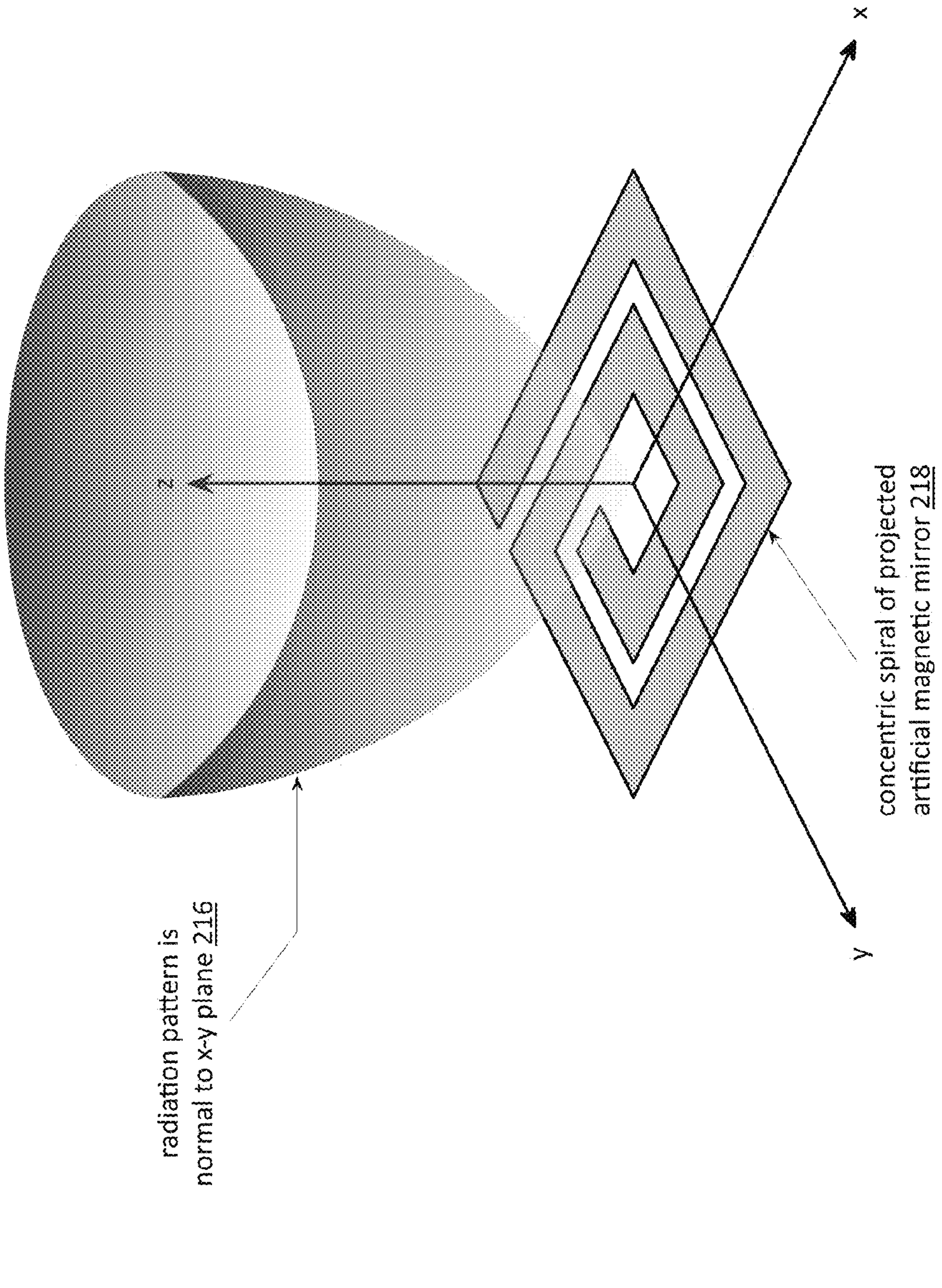
Figure 54:
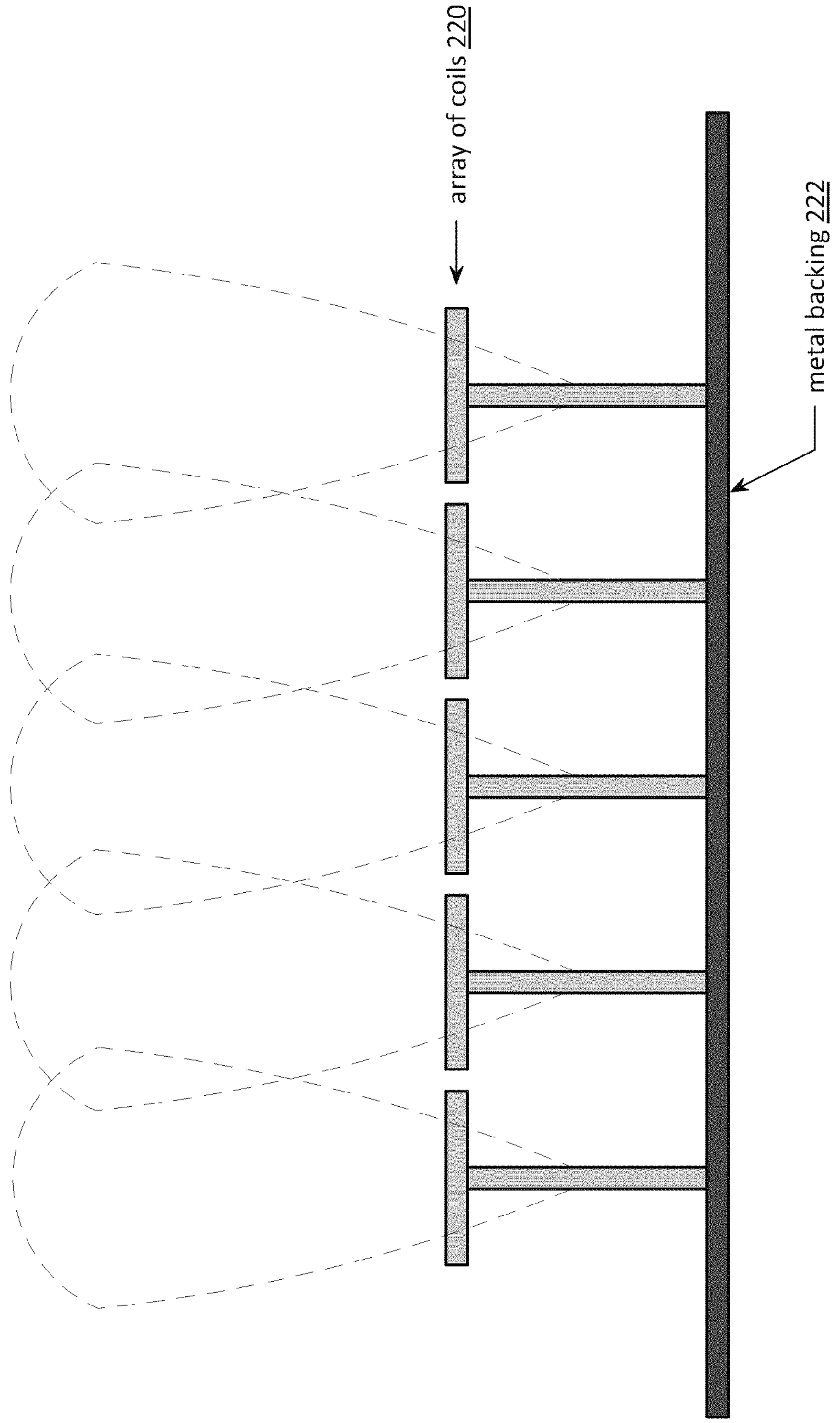
Figure 56:
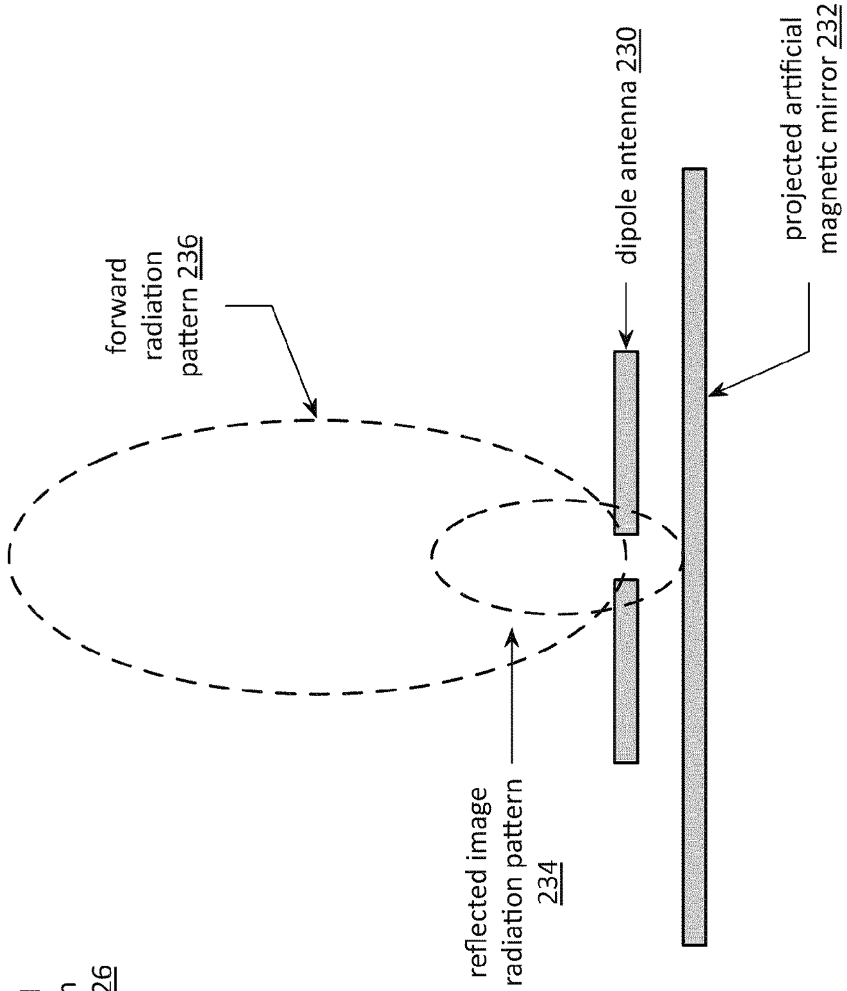
Figure 55:
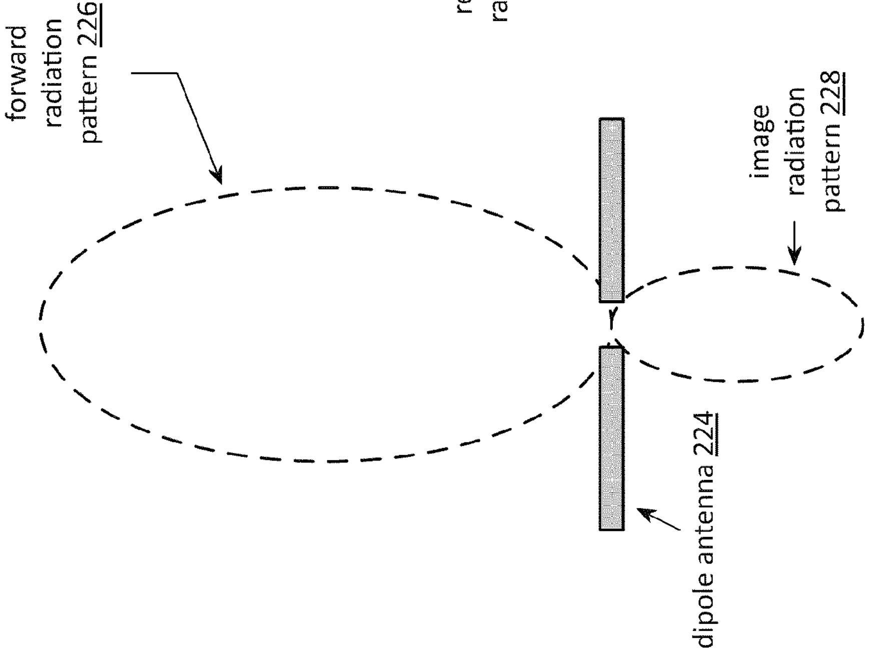
Figure 57:
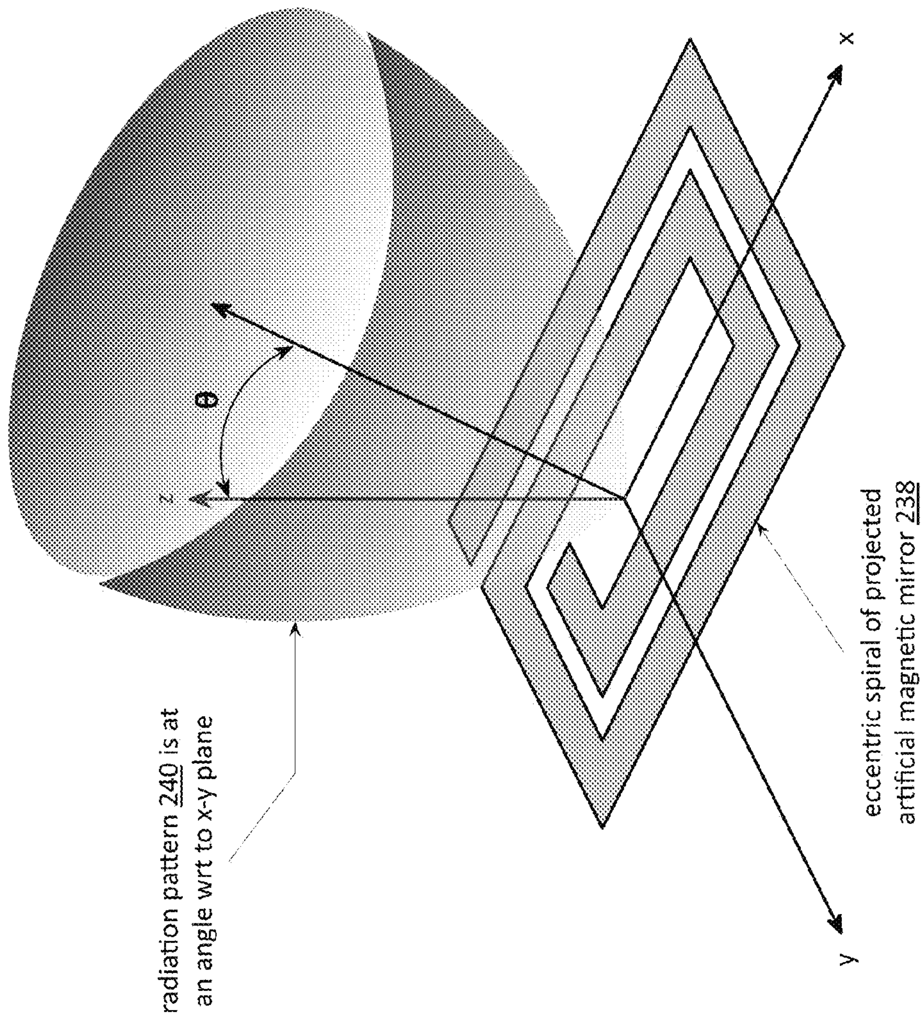
Figure 58:
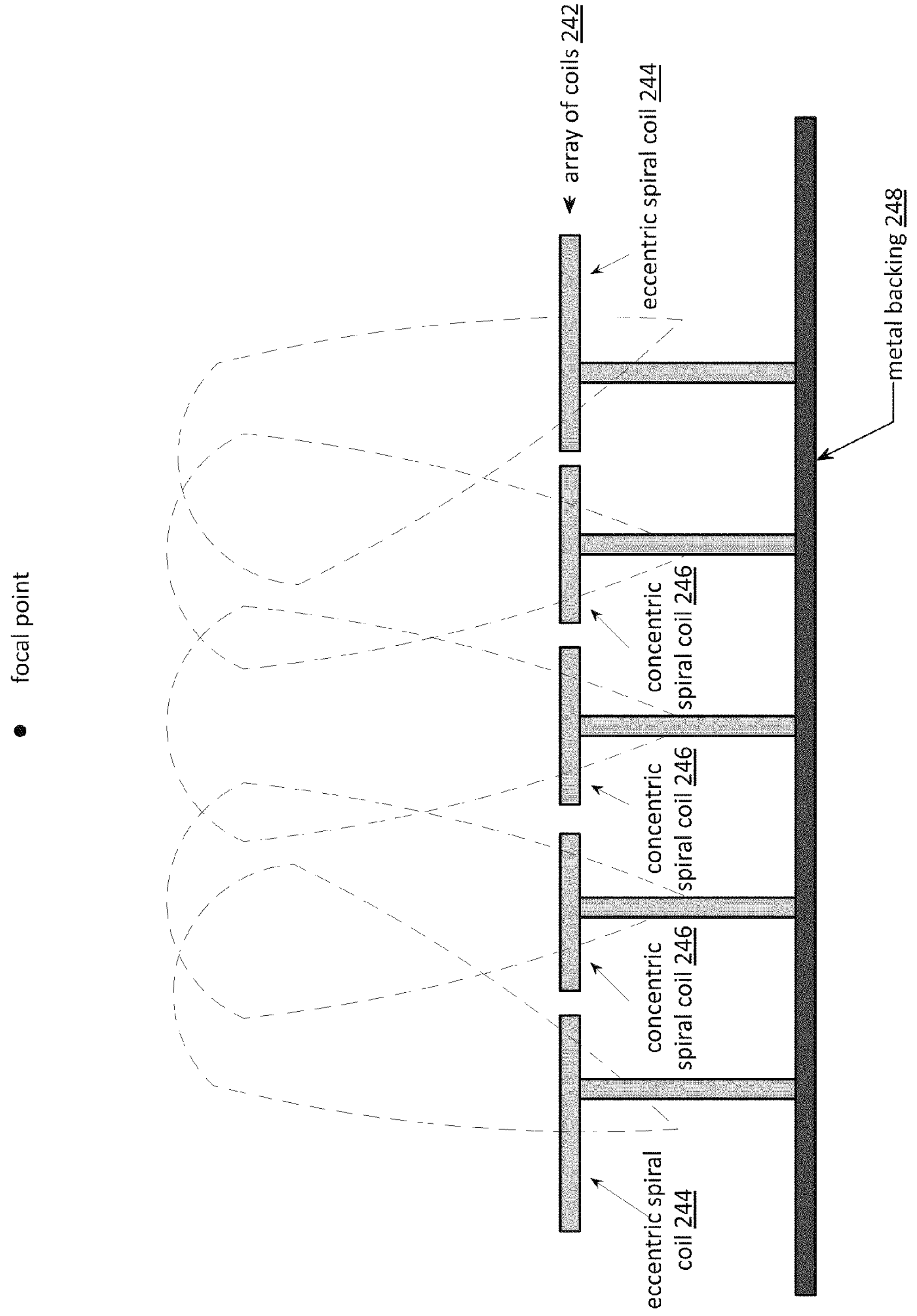
Figure 59:
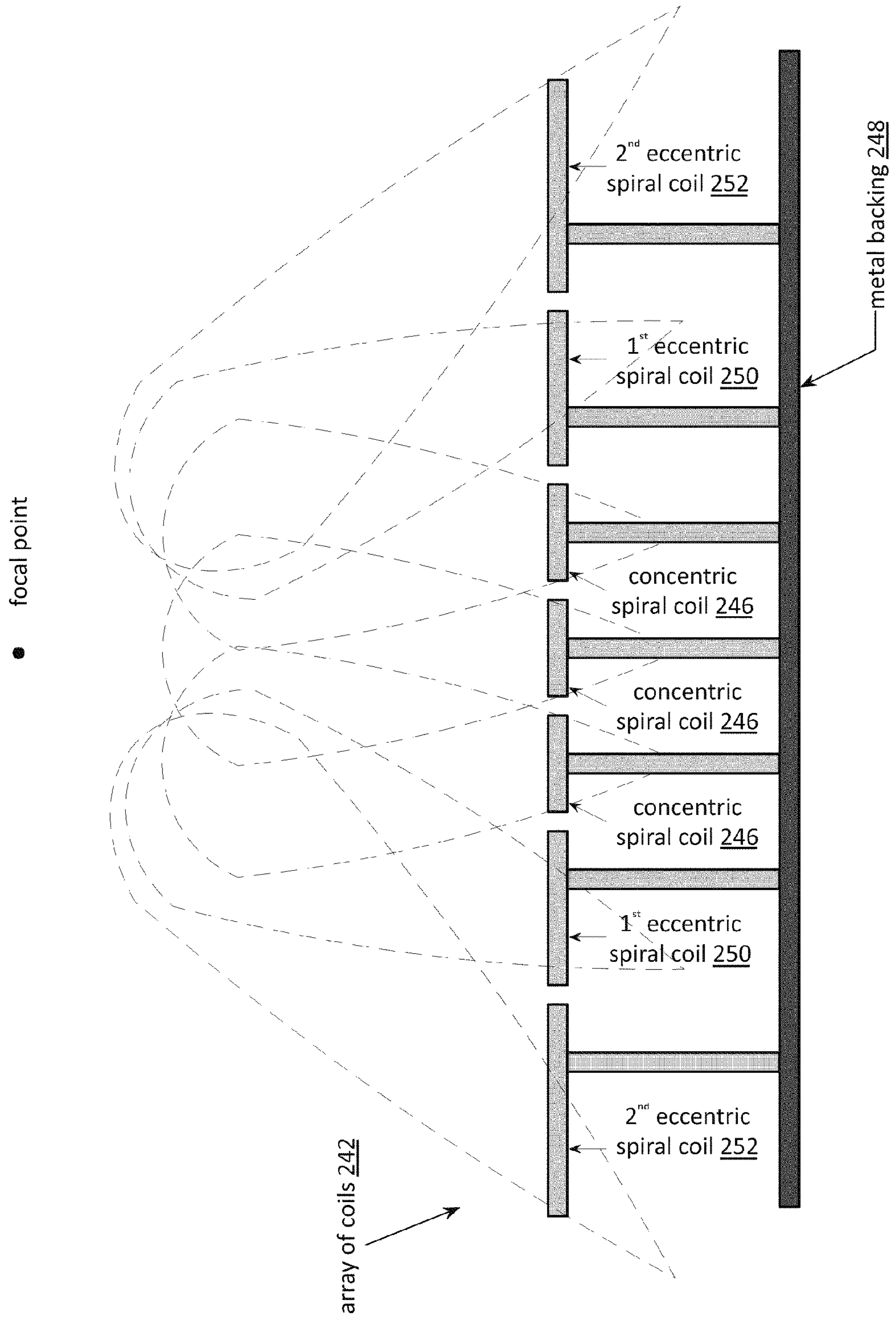
Figure 60:
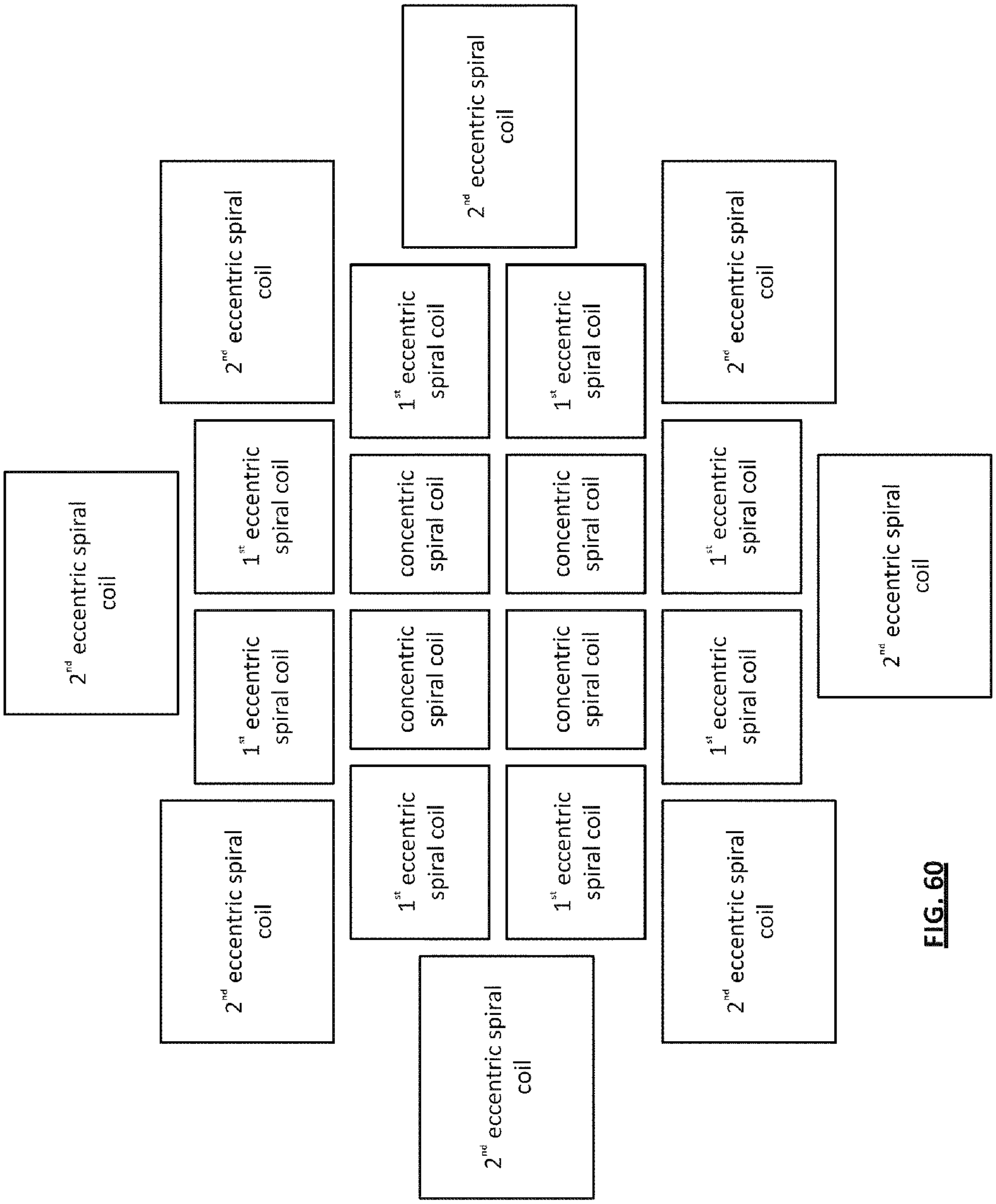
Figure 61:
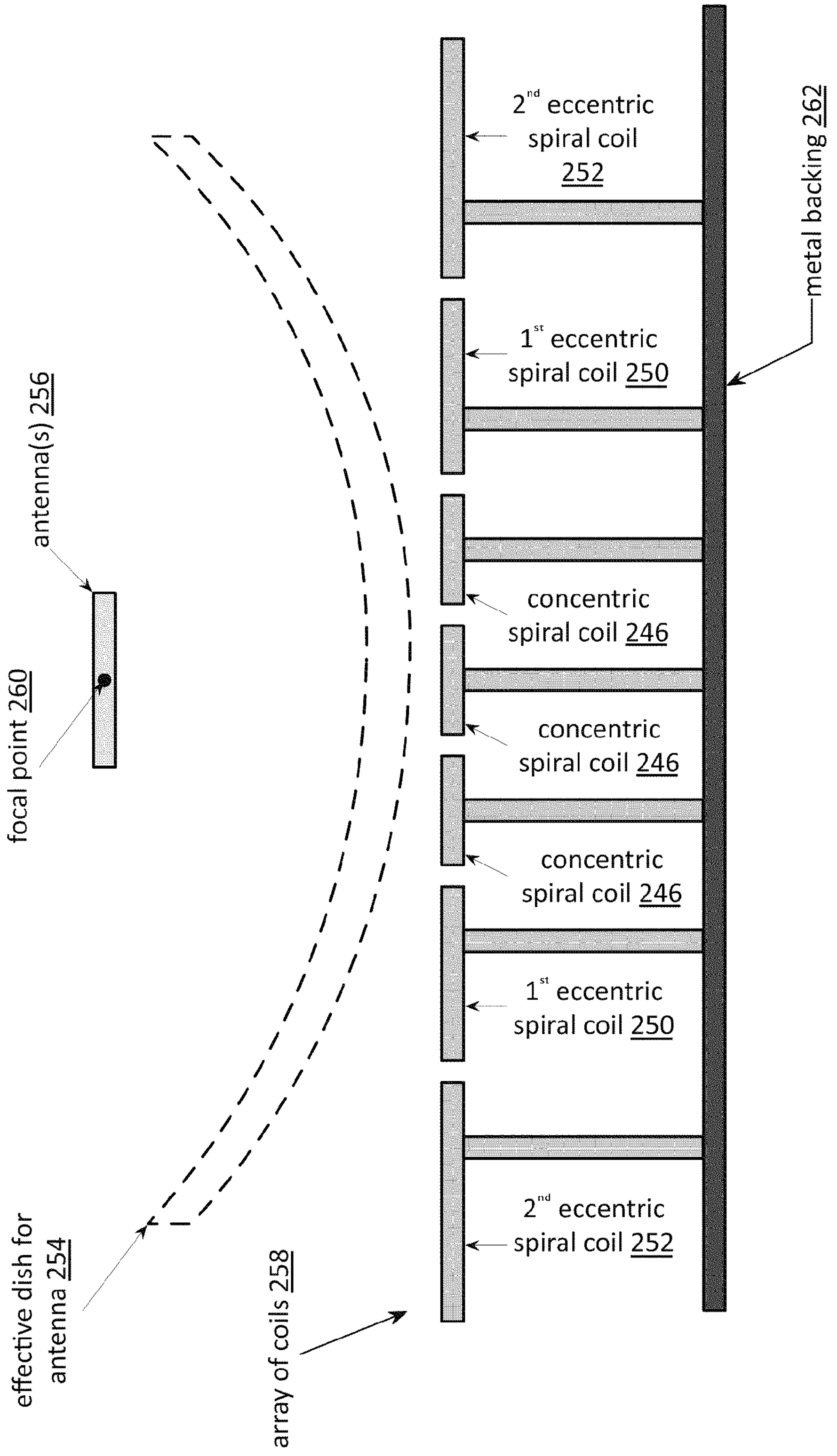
Figure 62:
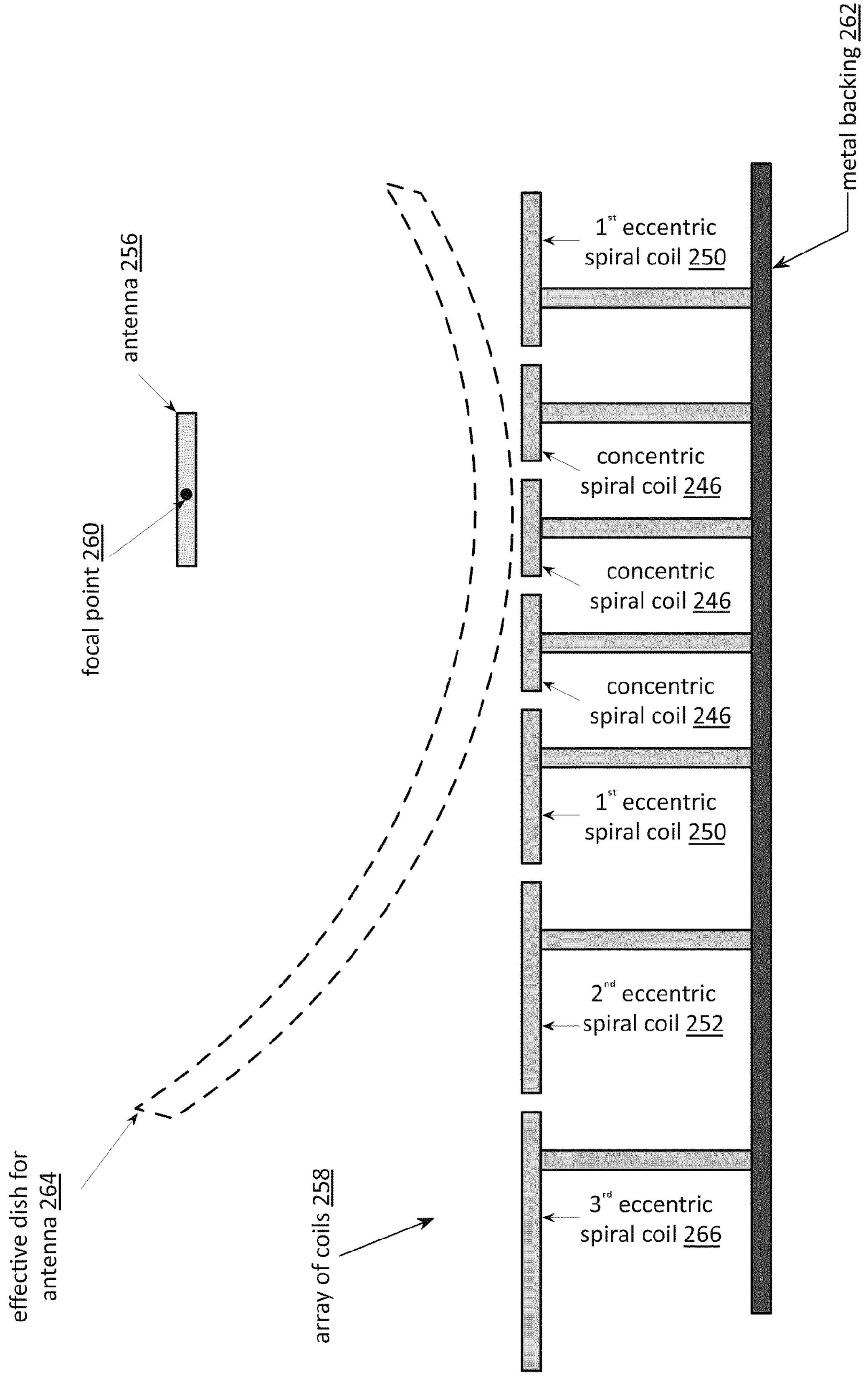
Figure 63:
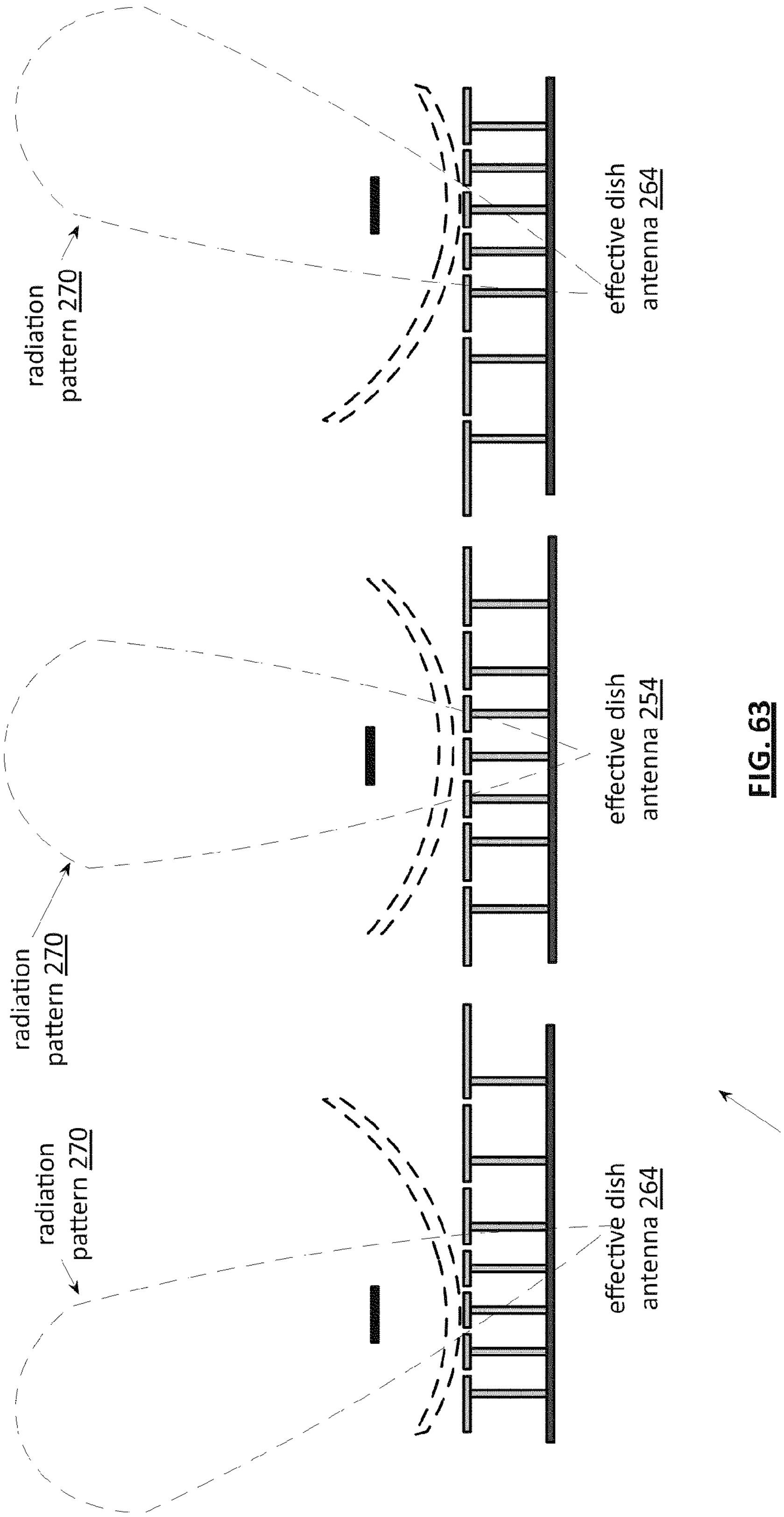
Figure 64:
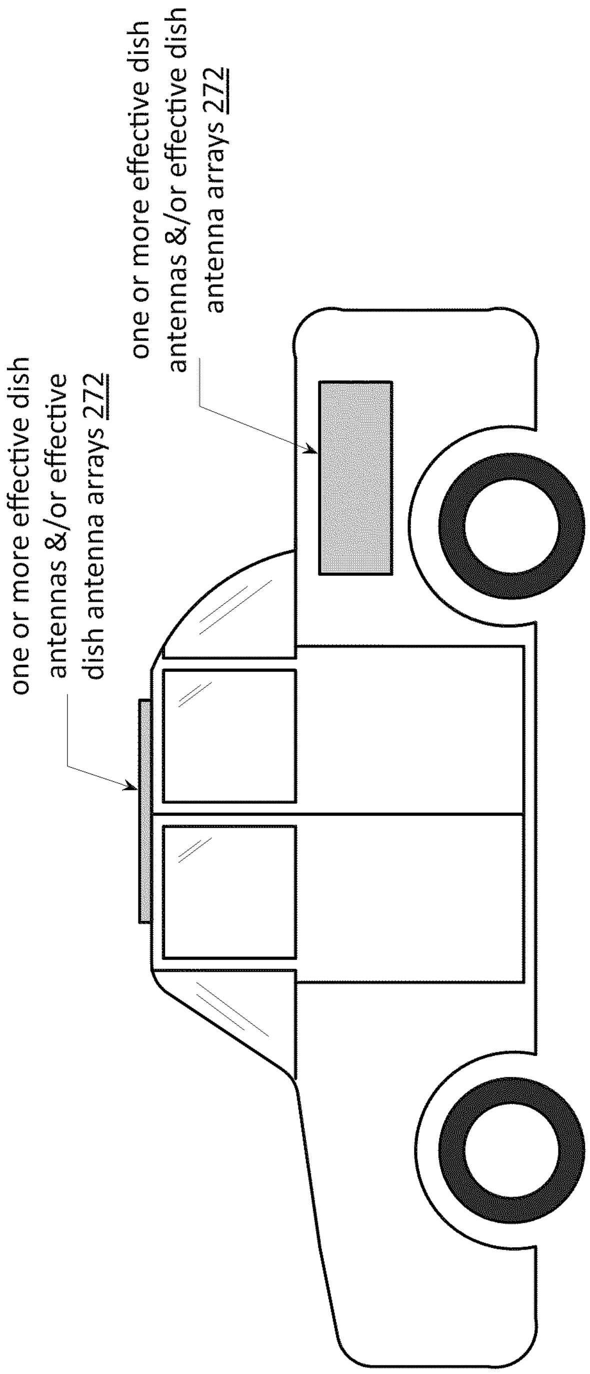
Figure 65:
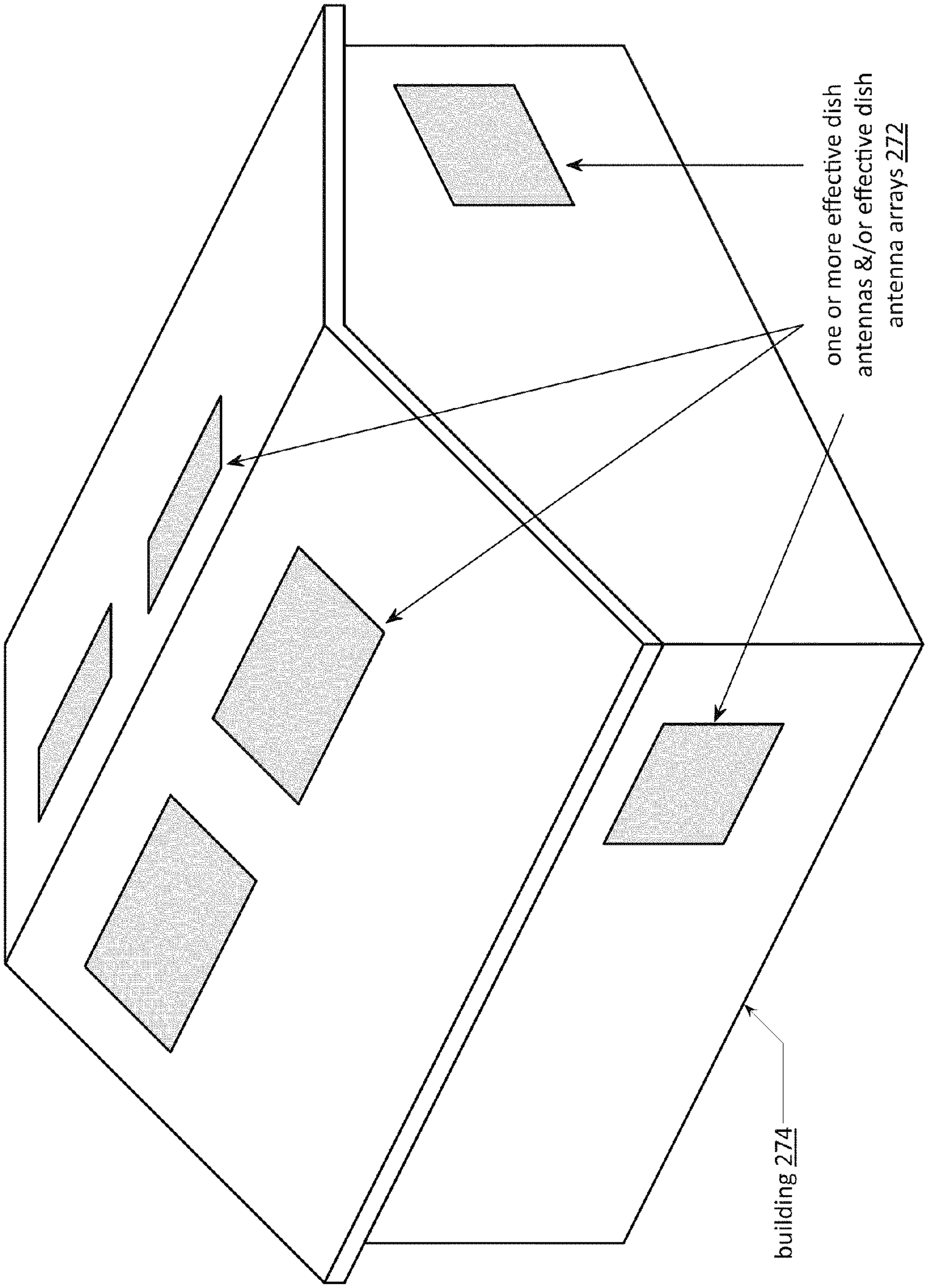
Figure 68:
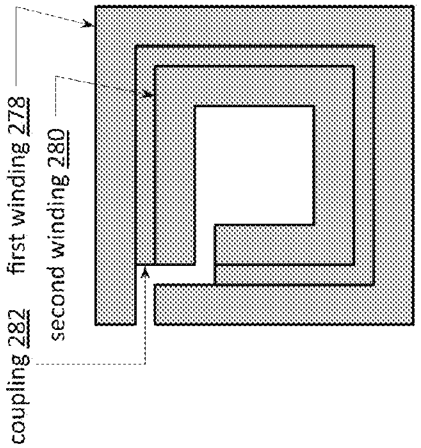
Figure 67:
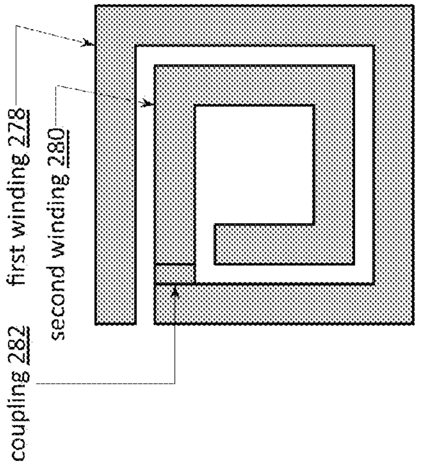
Figure 66:
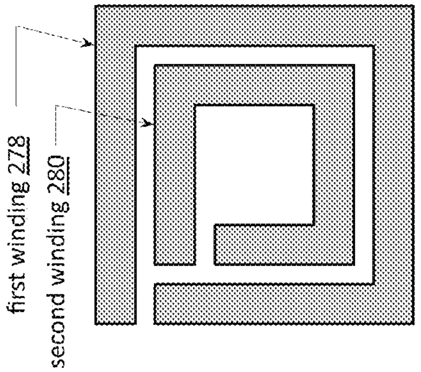
Figure 70:
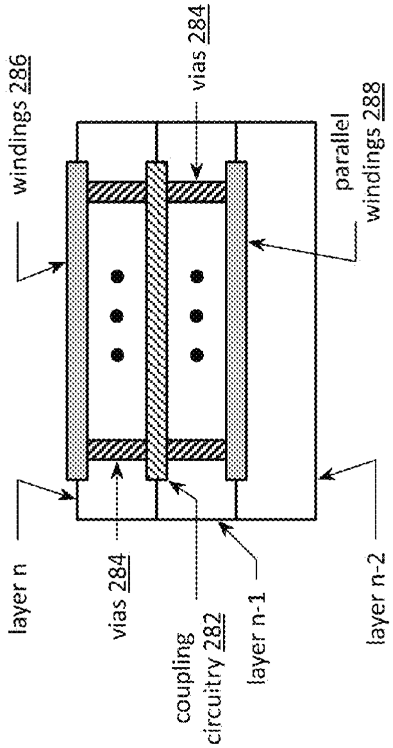
Figure 69:
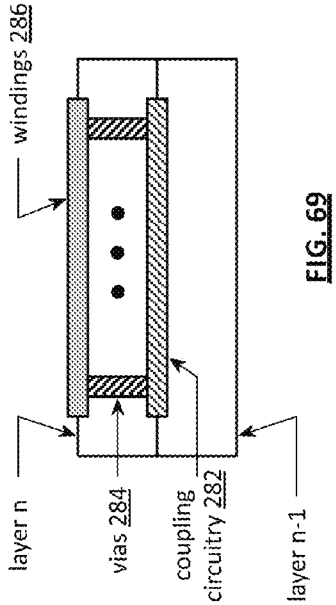
Figure 71:
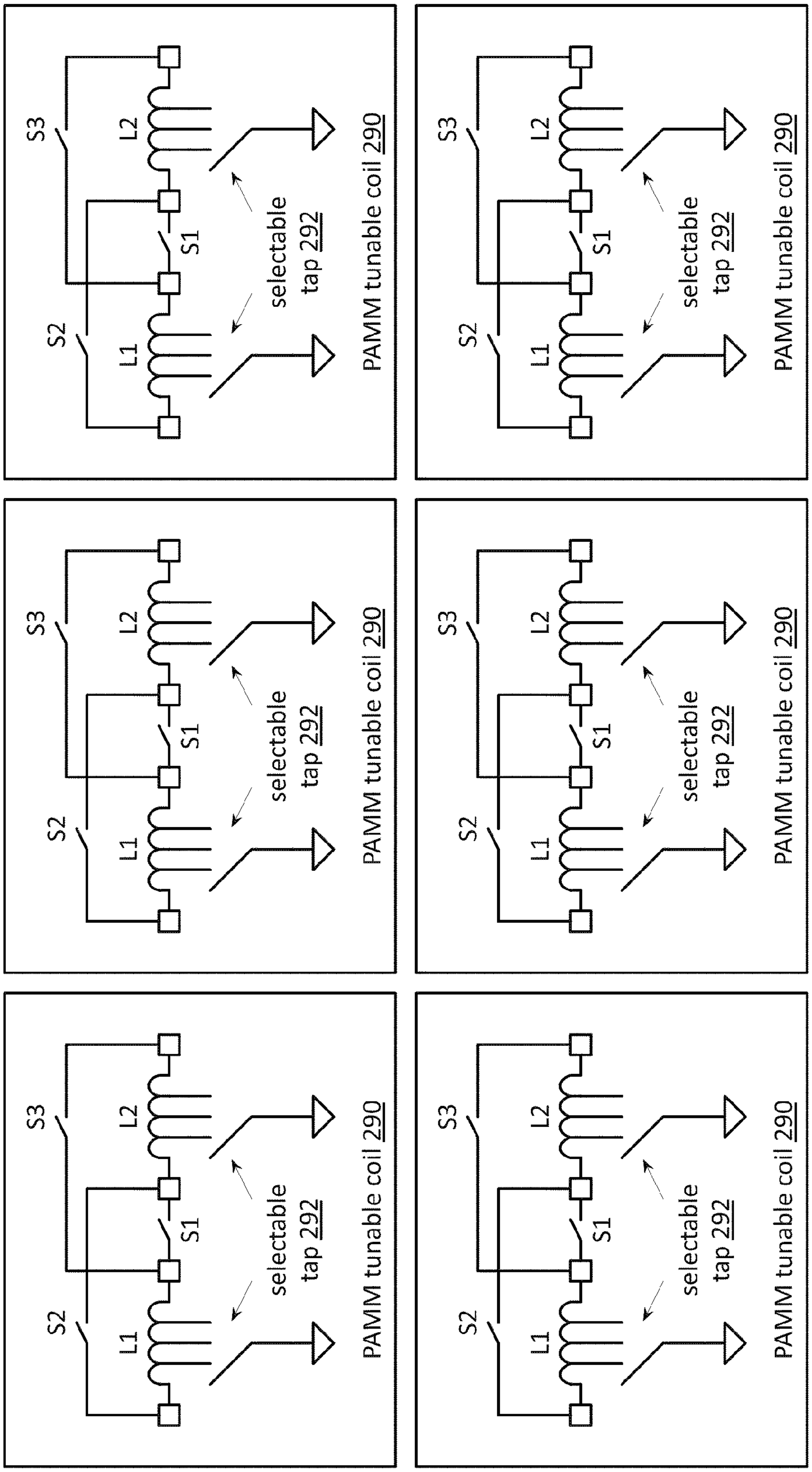
Figure 74:
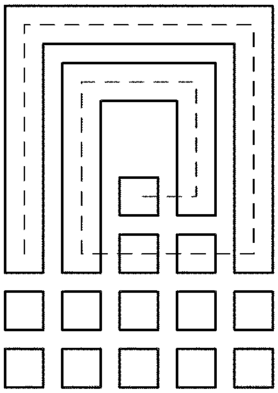
Figure 73:
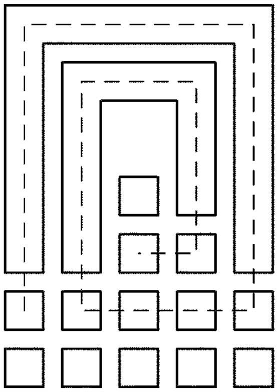
Figure 72:
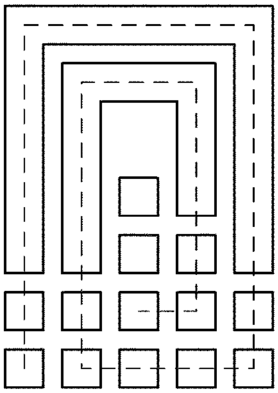
Figure 76:
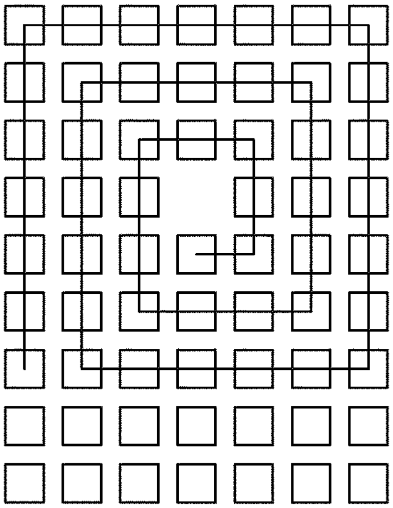
Figure 75:
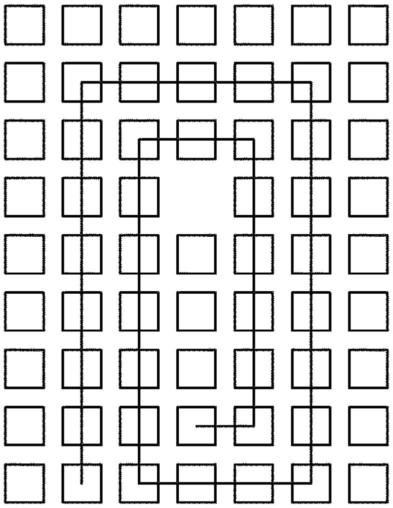
Figure 77:
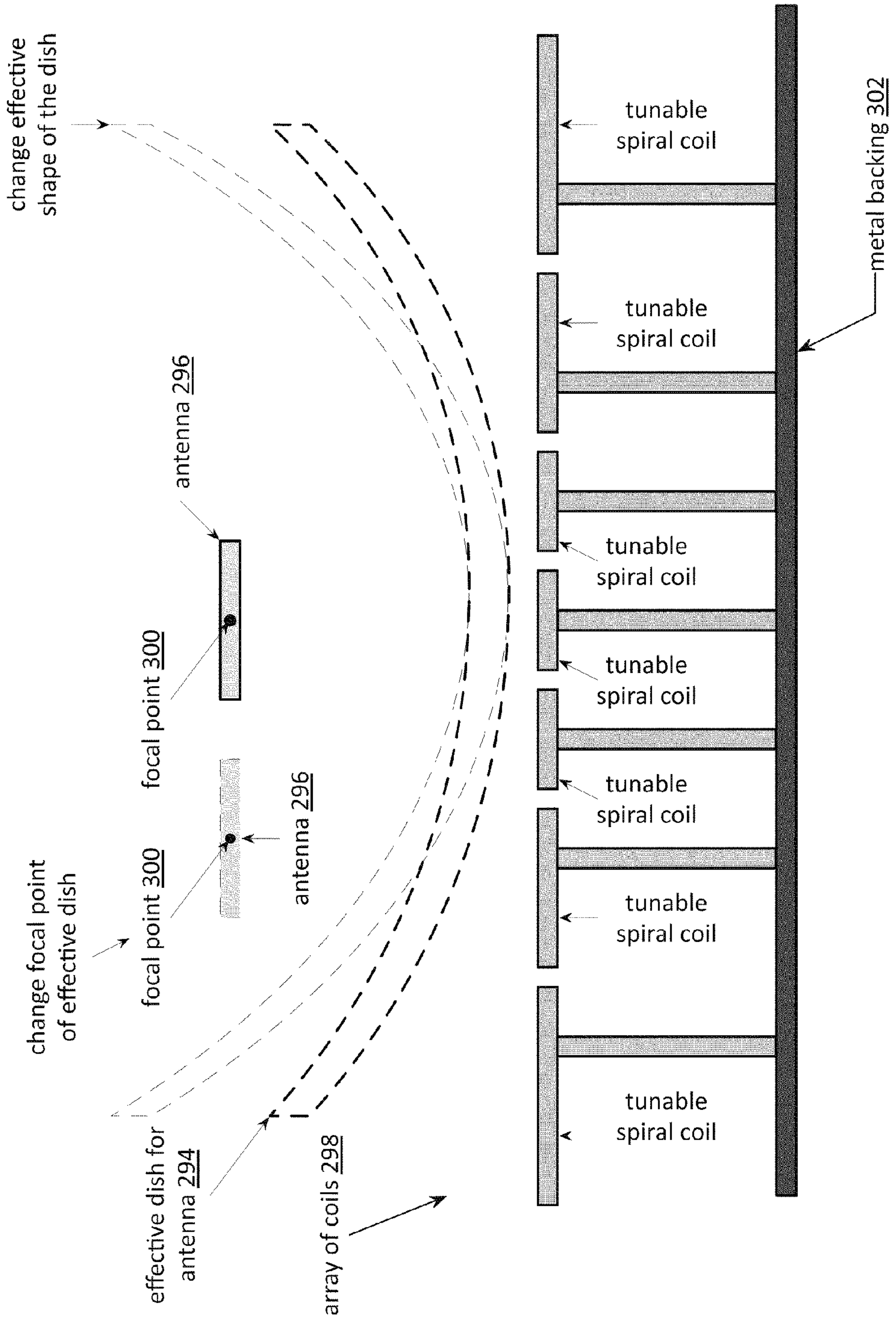
Figure 78:
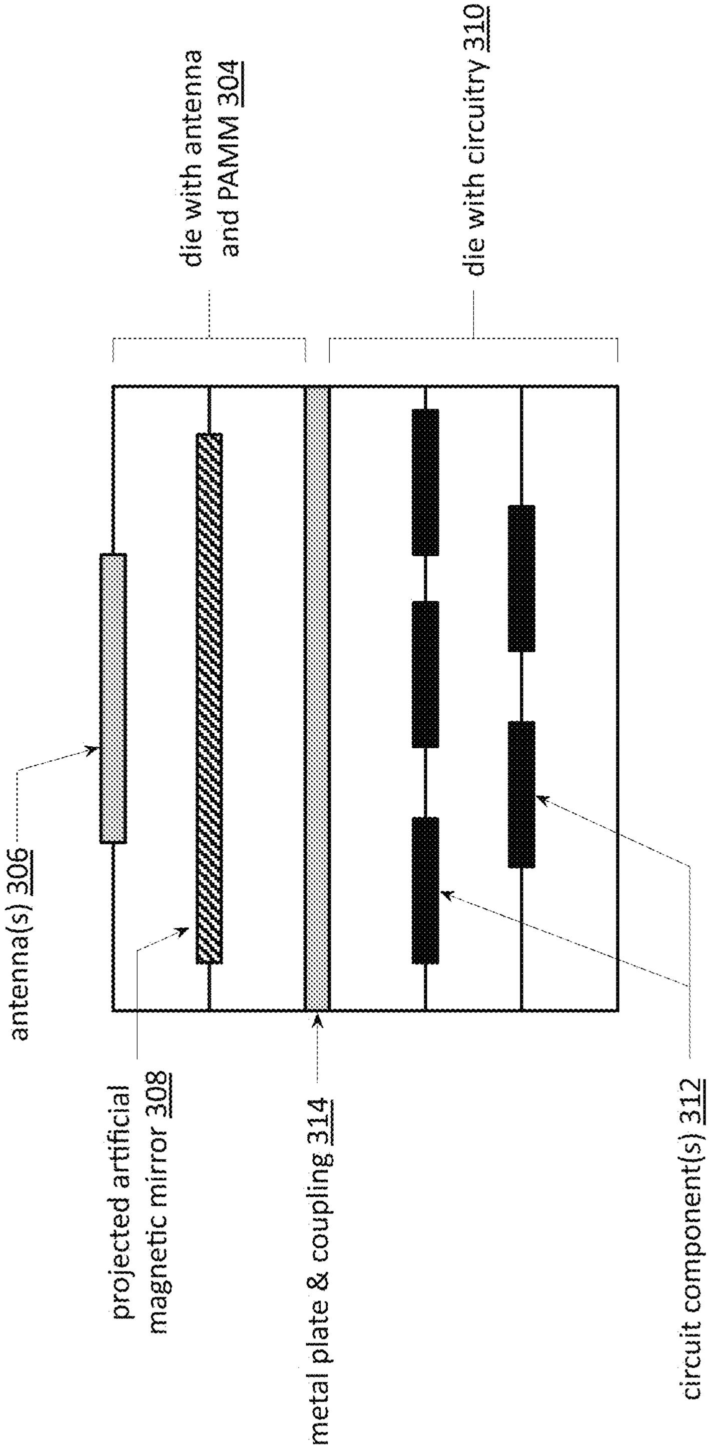
Figure 79:
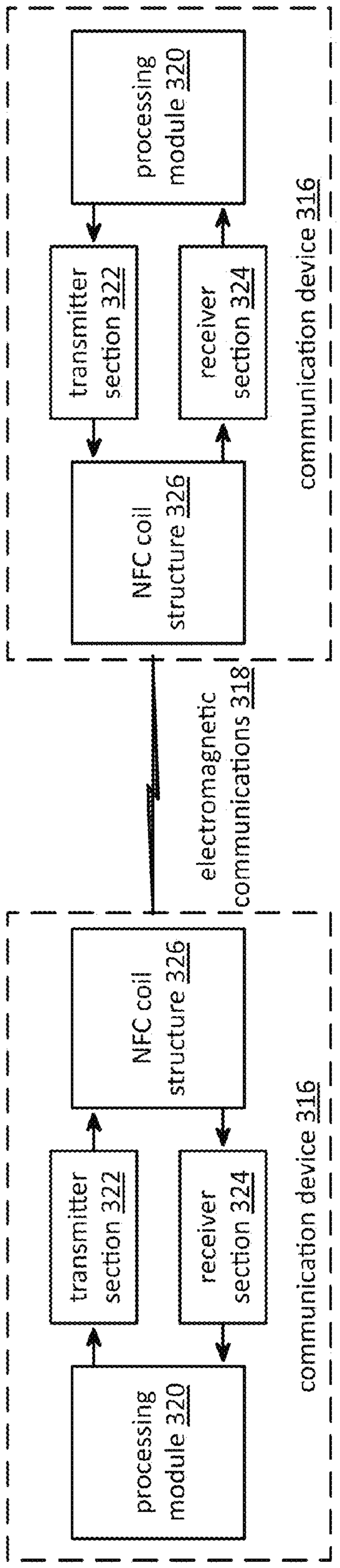
Figure 80:
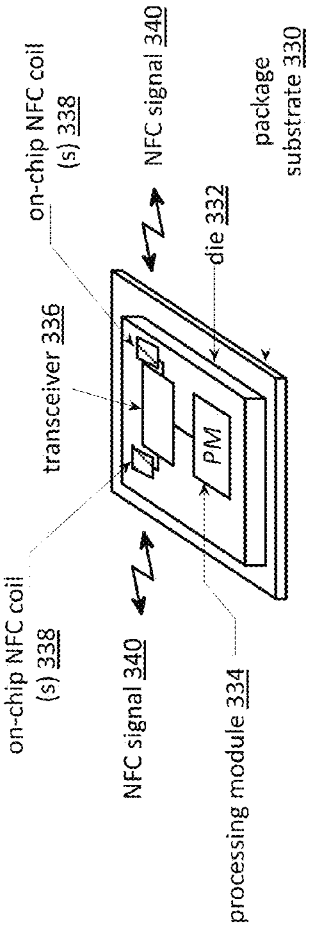
Figure 81:
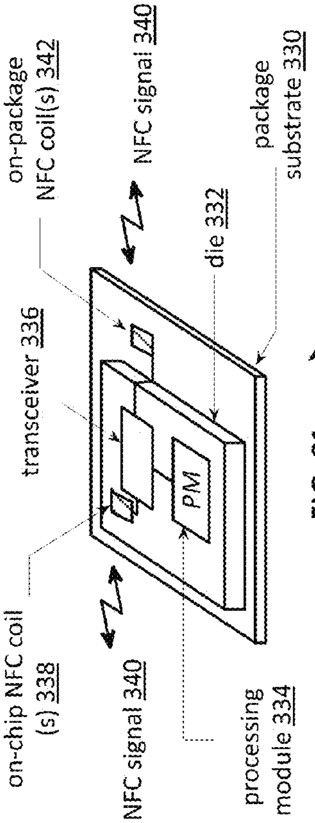
Figure 82:
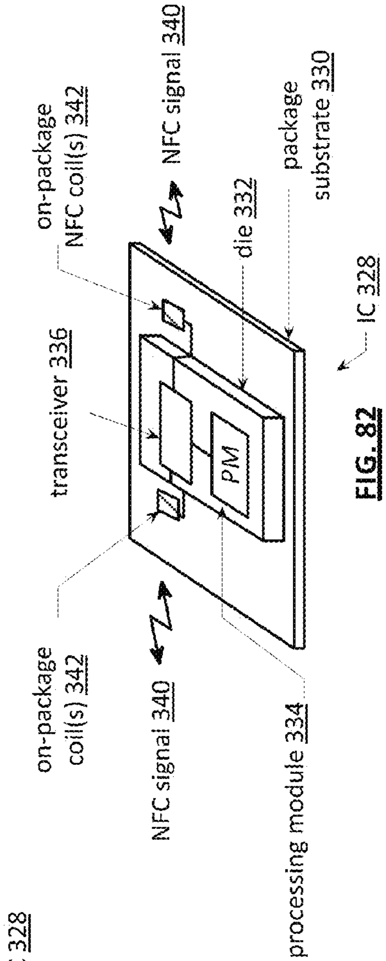
Figure 83:
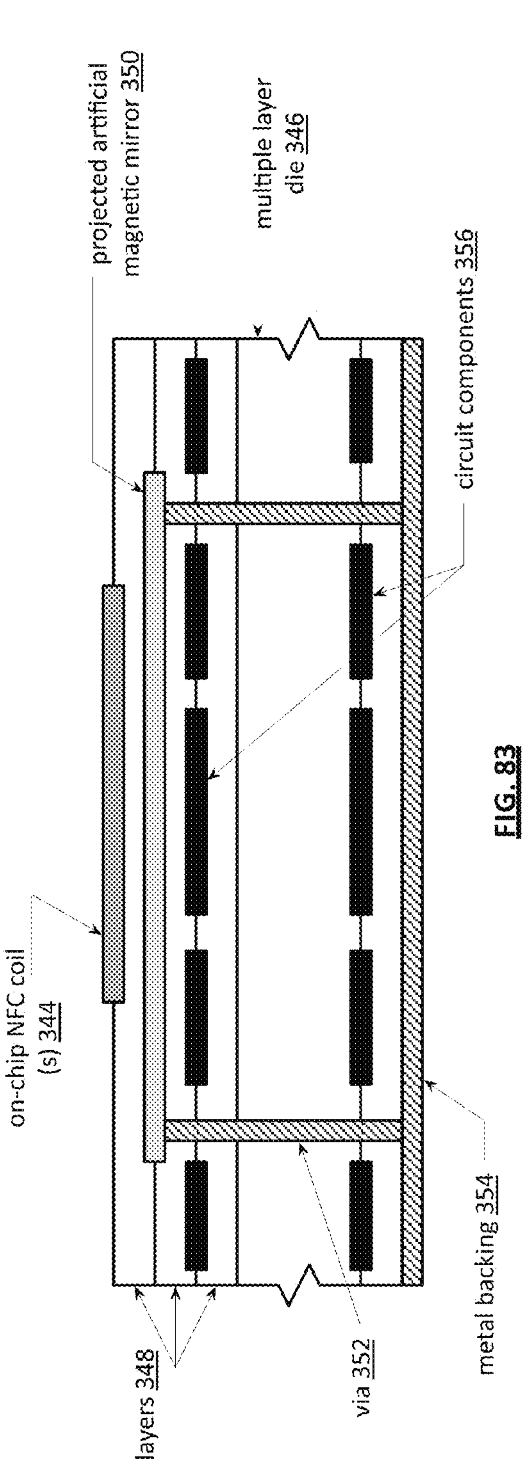
Figure 84:
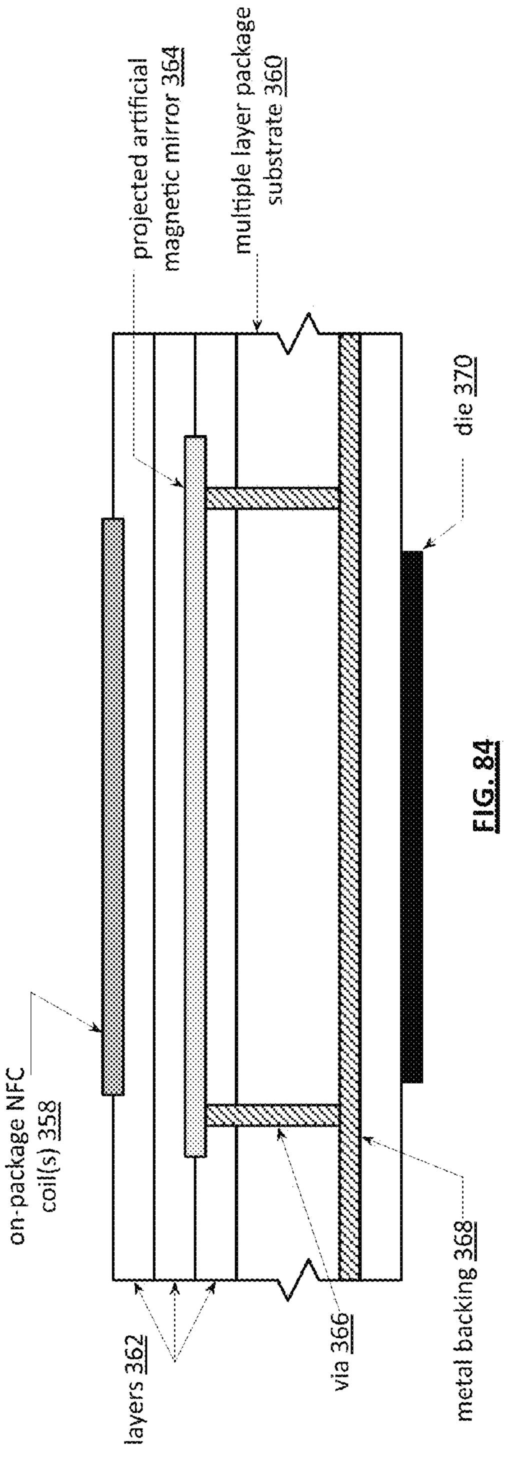
Figure 85:
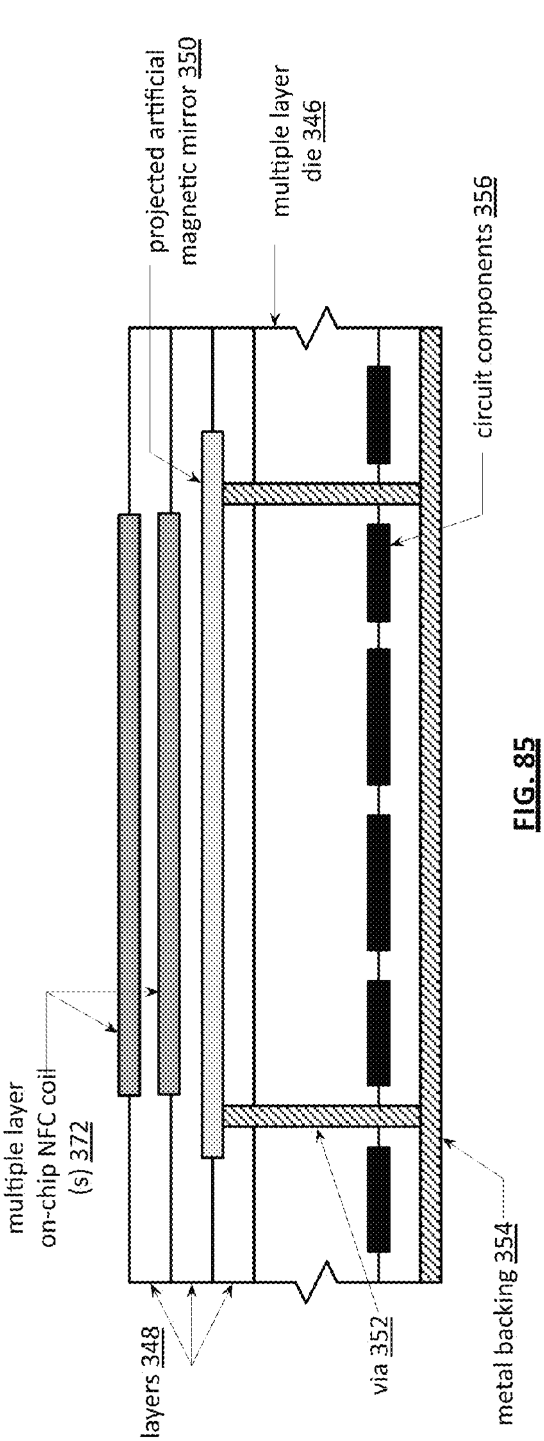
Figure 86:
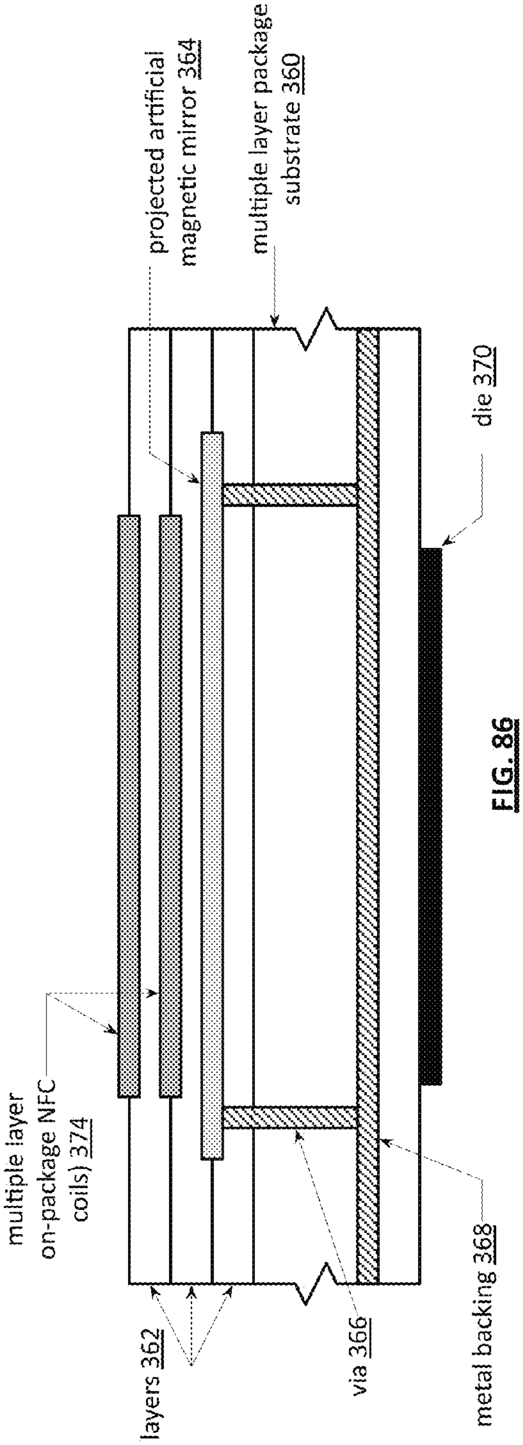
Figure 87:
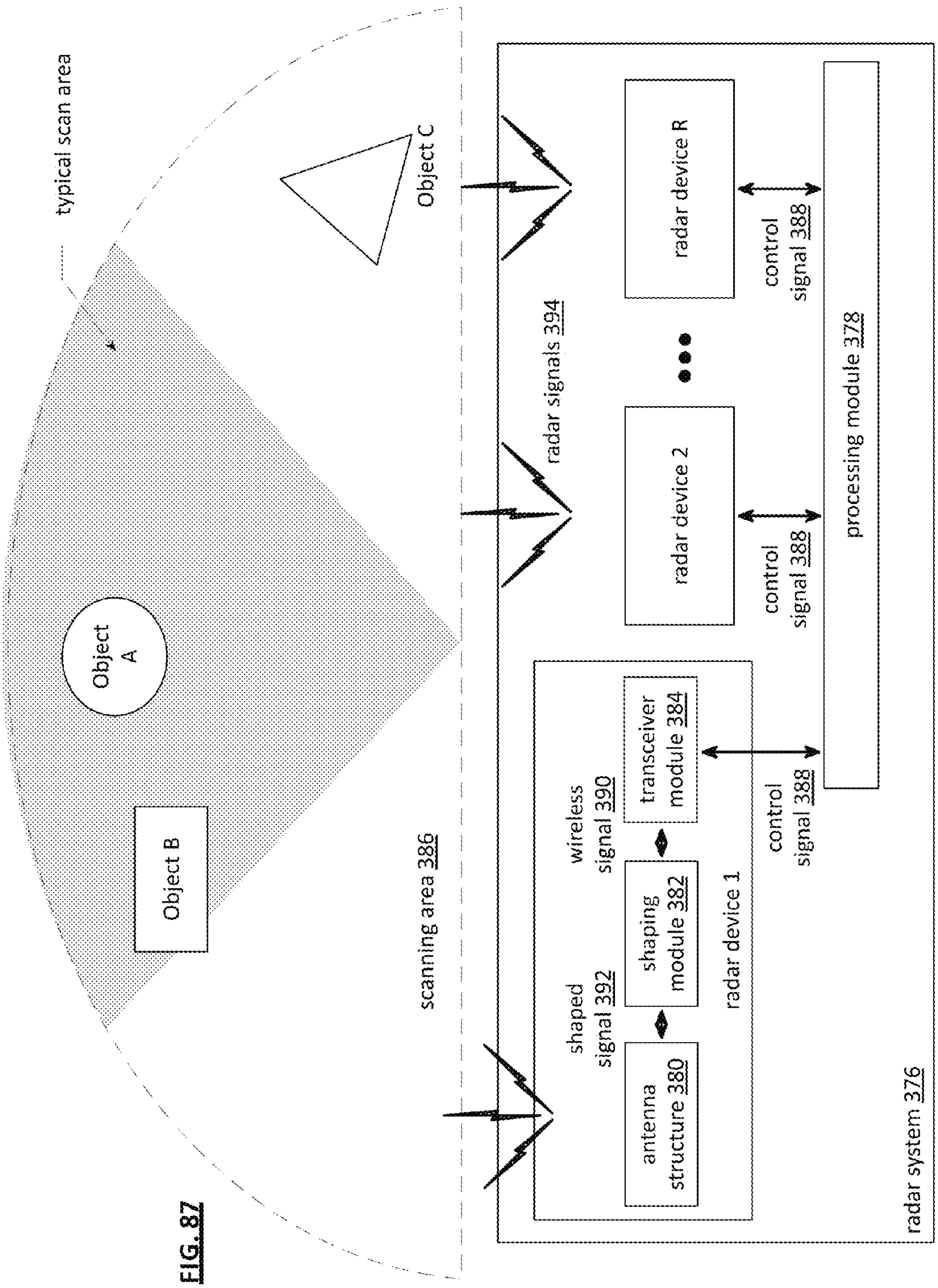
Figure 88:
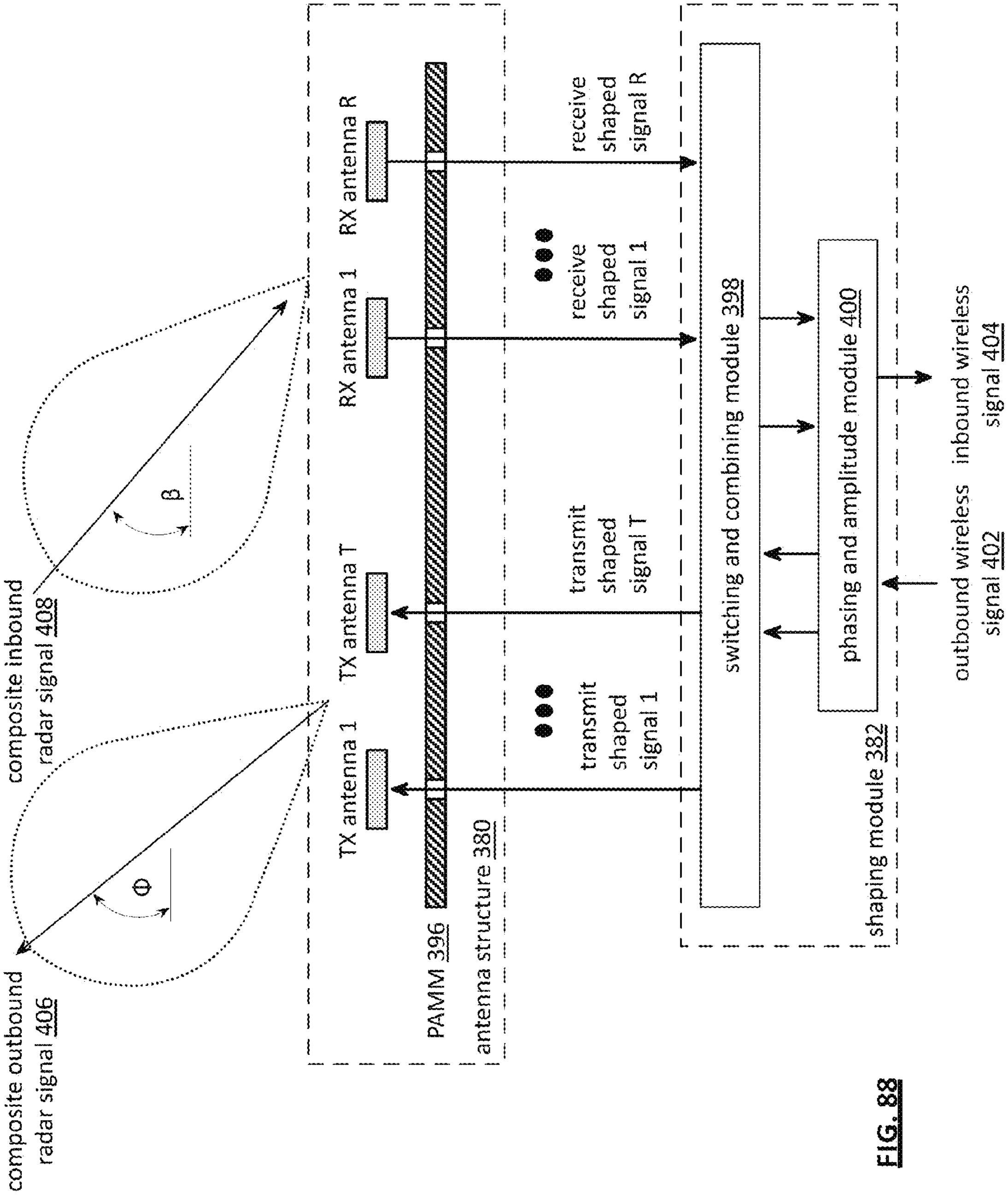
Figure 89:
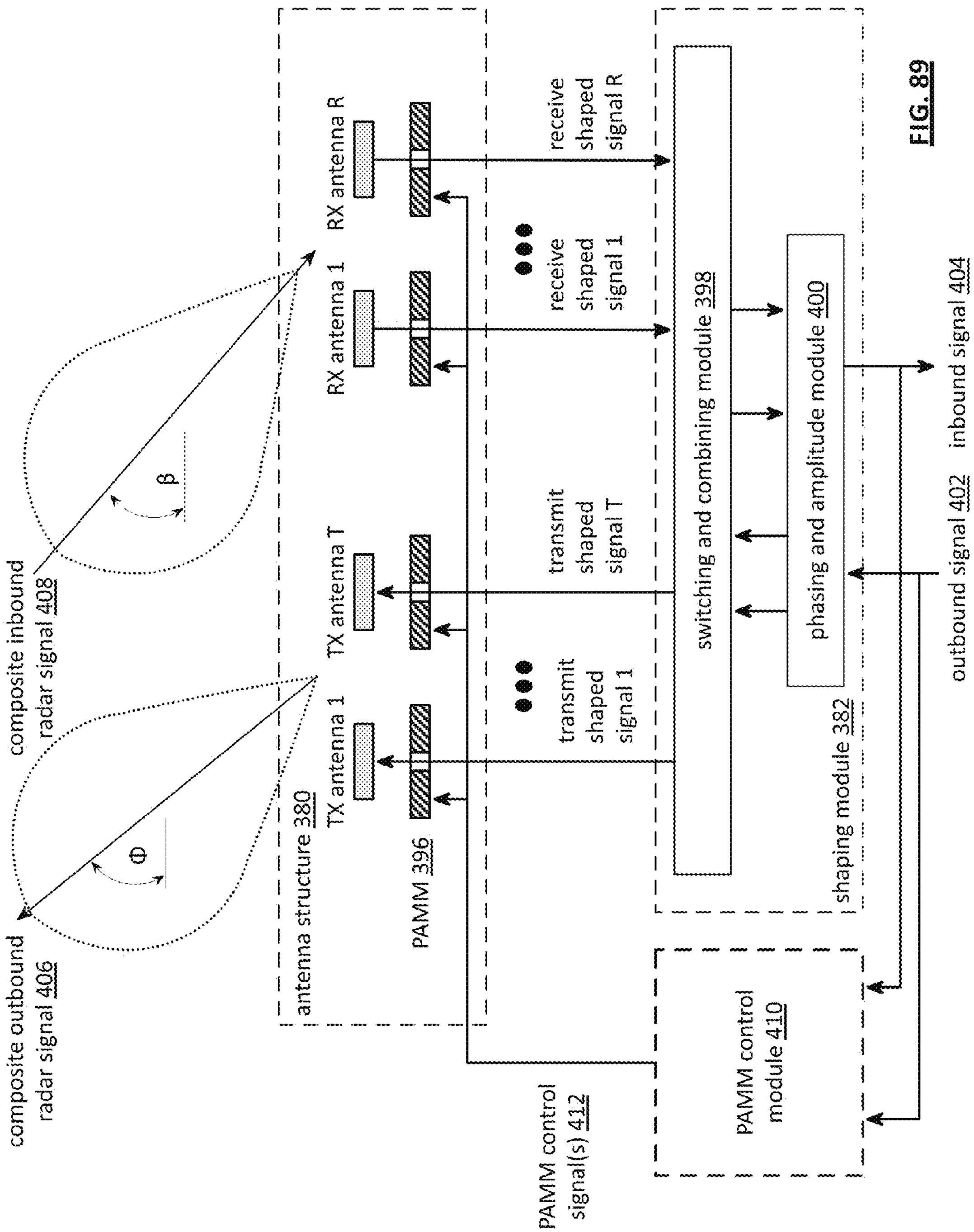
Figure 90:
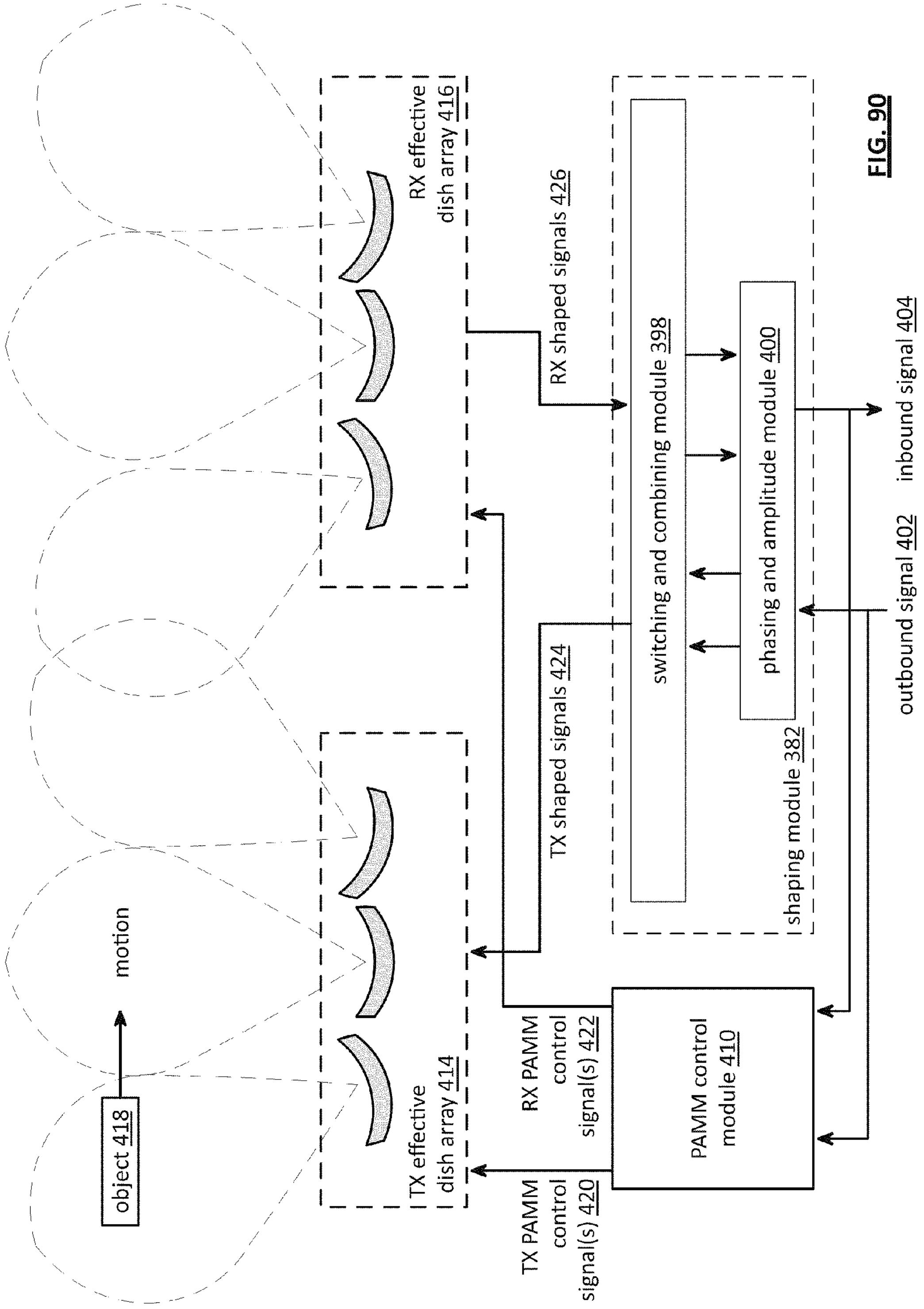
Figure 91:
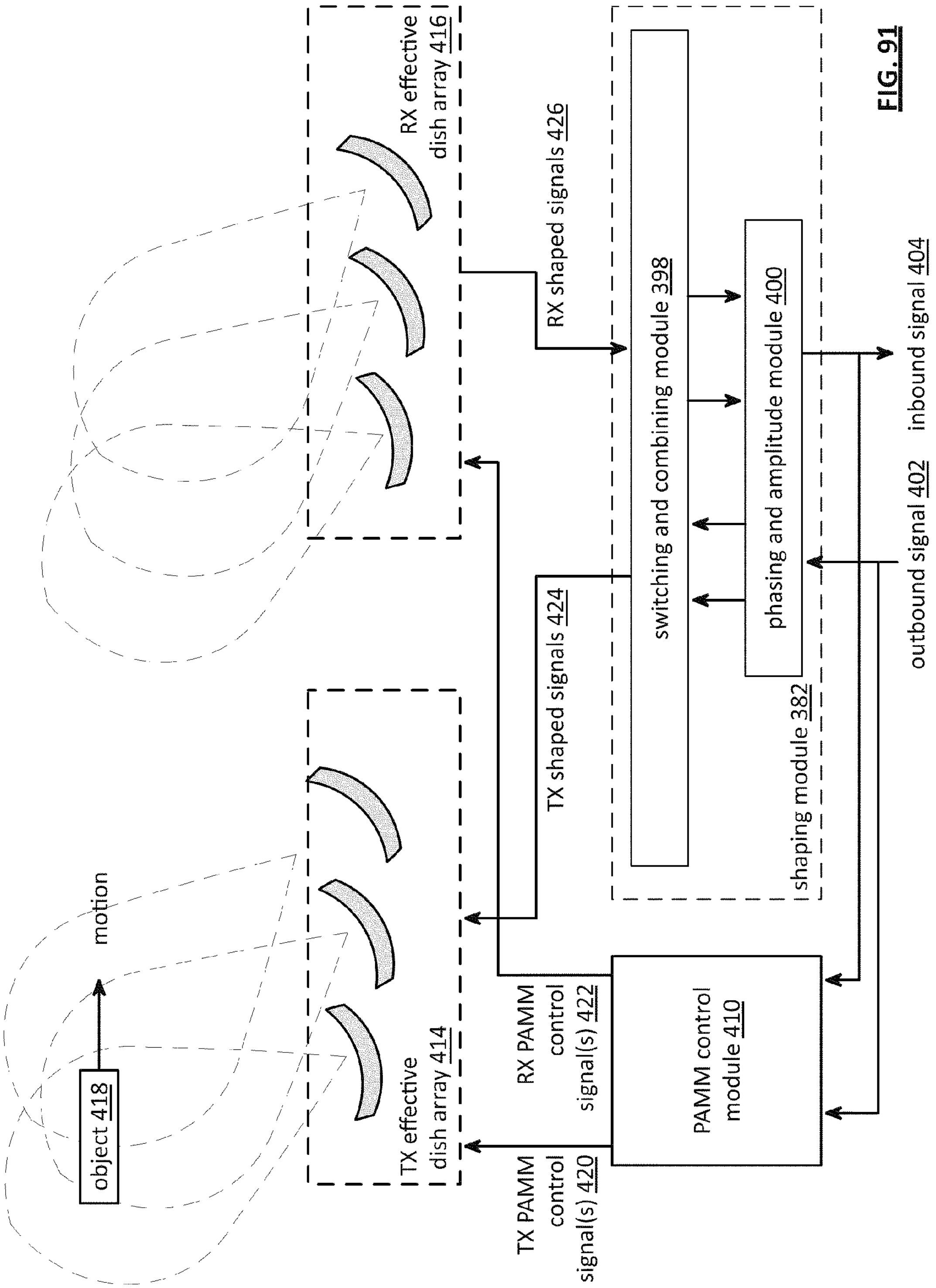
Figure 92:
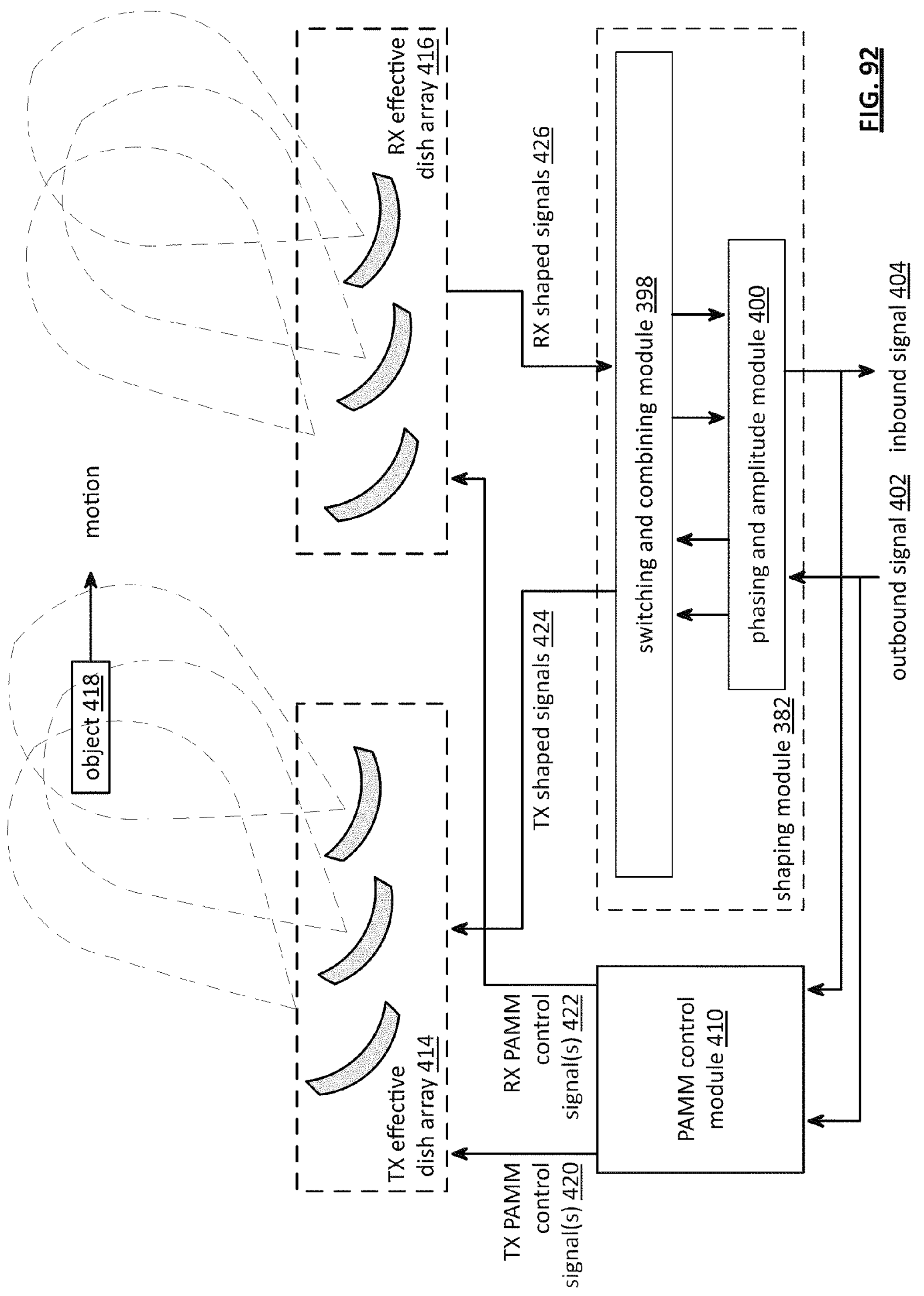
Figure 93:
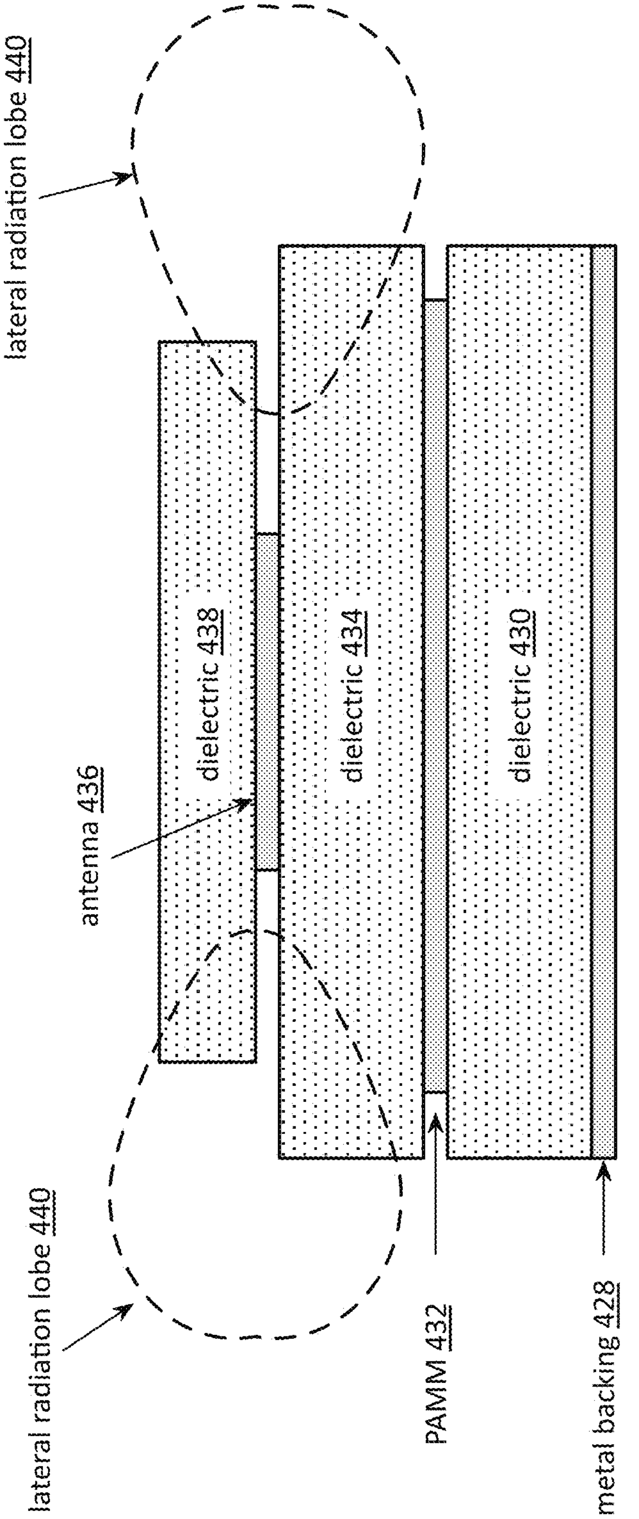
Figure 94:
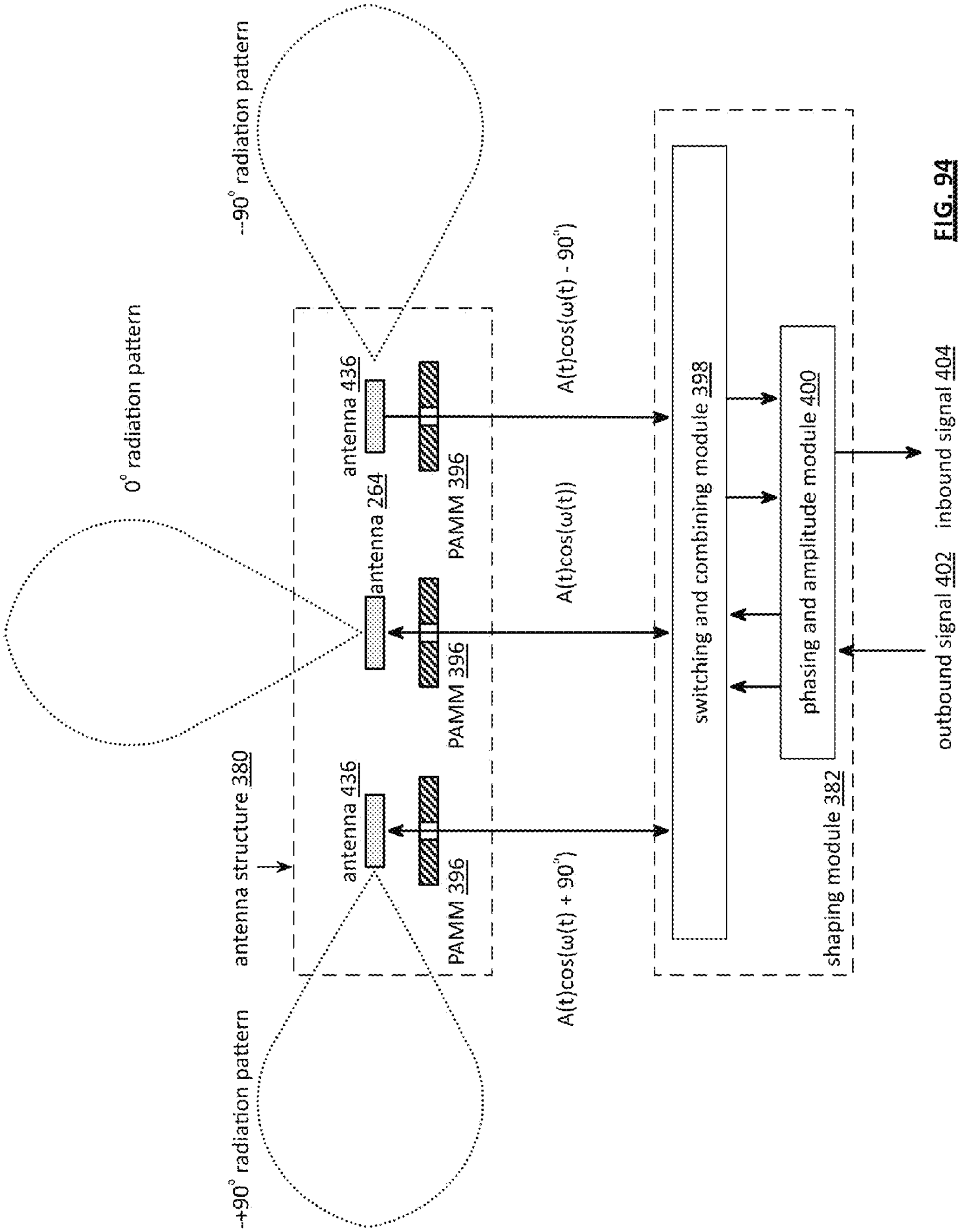
Figure 95:
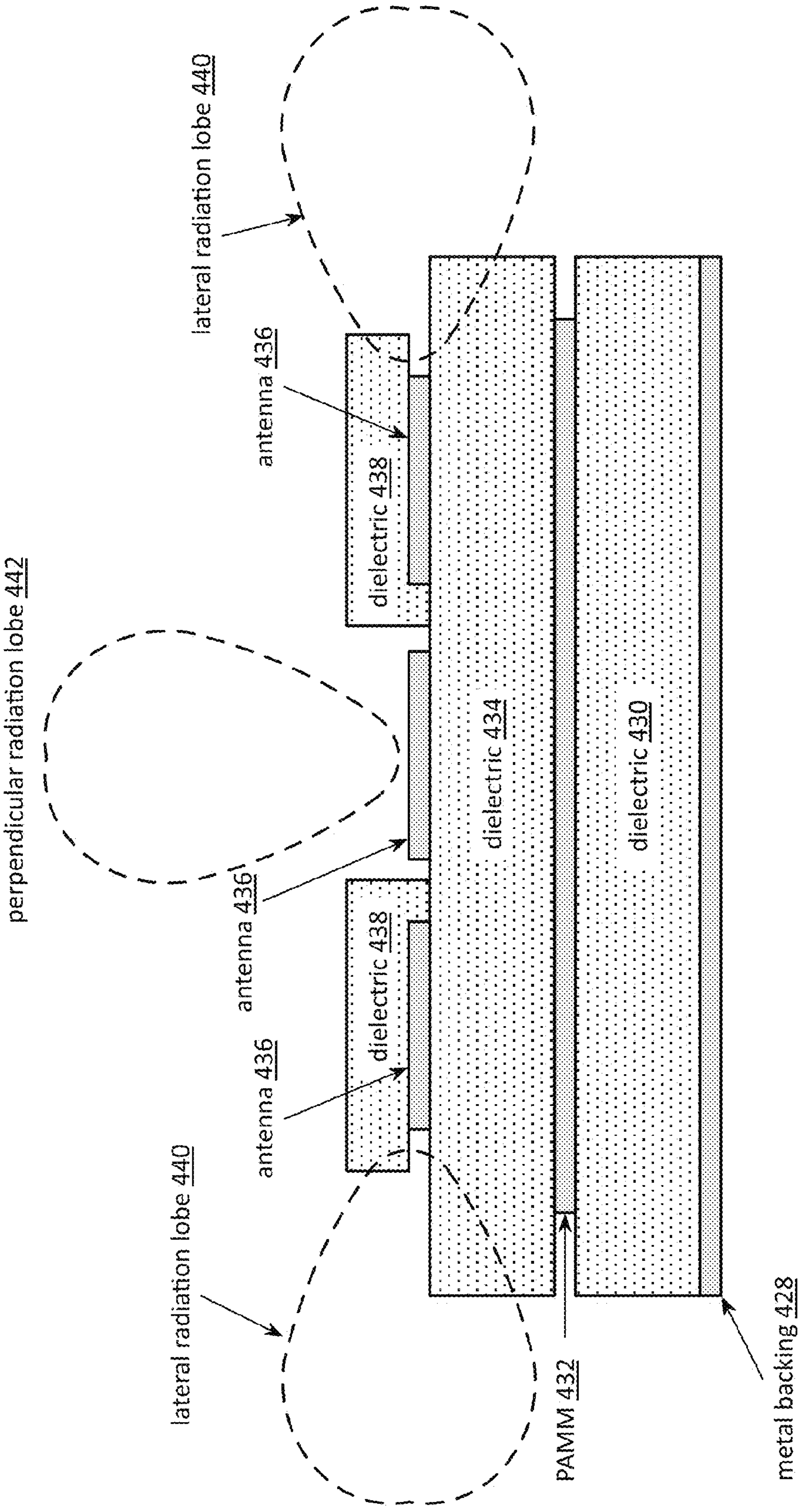
Figure 96:
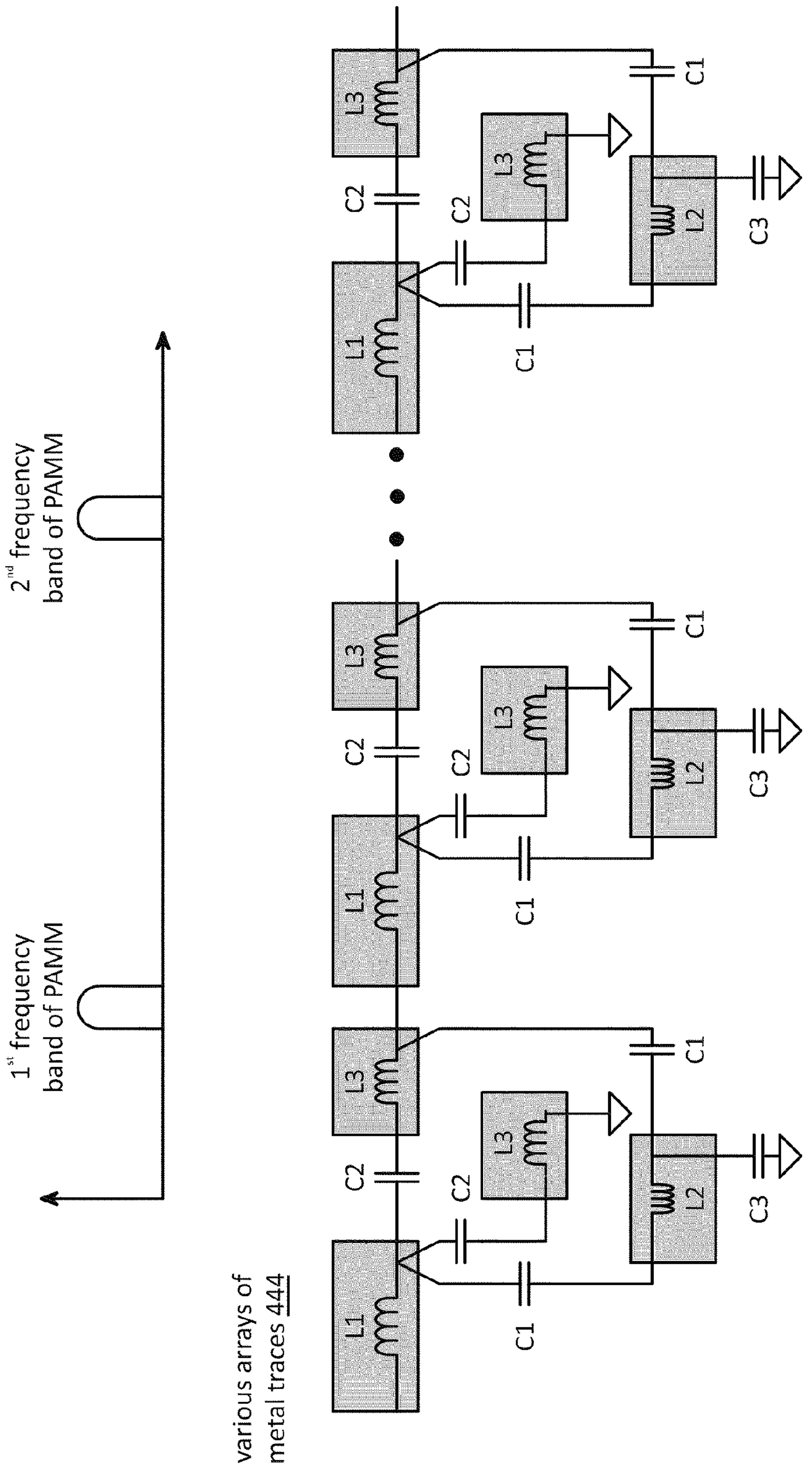
Figure 97:
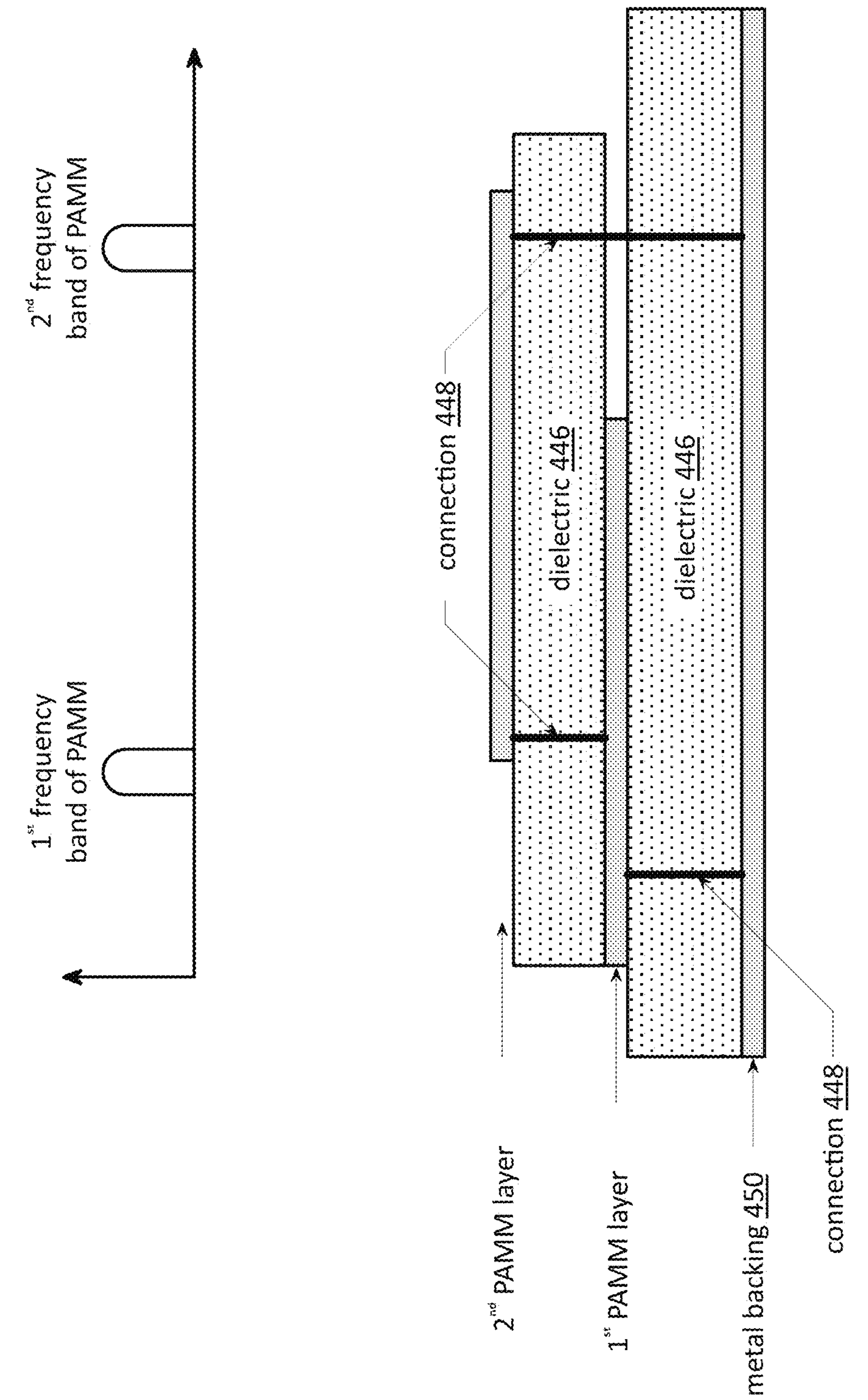
Figure 98:
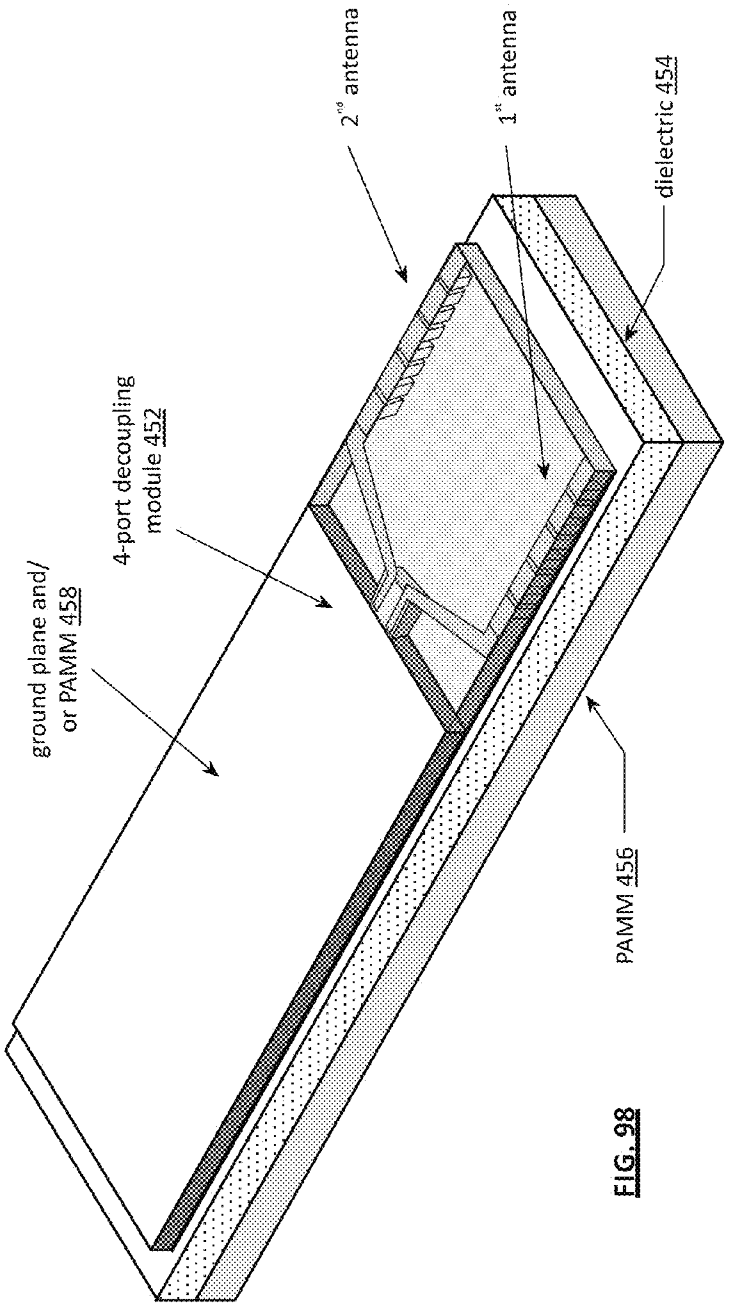
Figure 99:
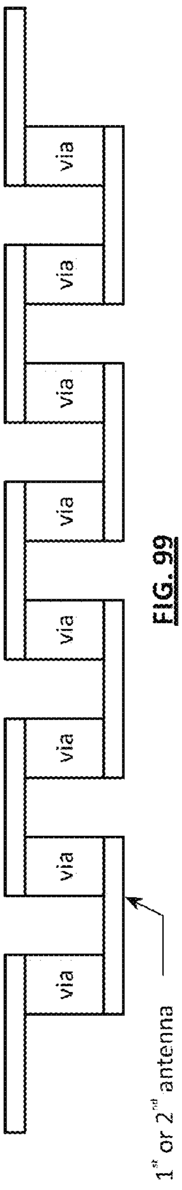
Figure 100:
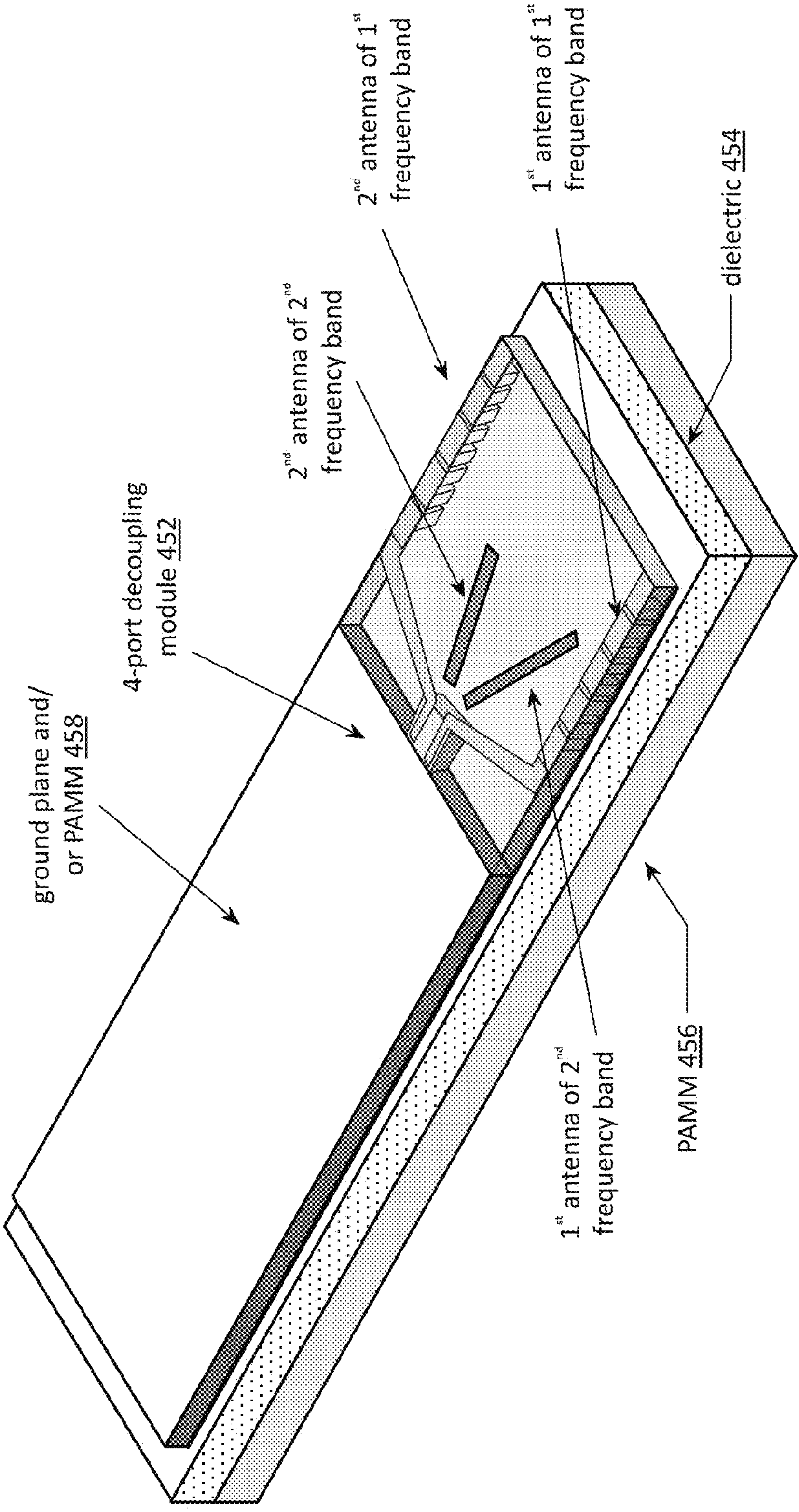
Figure 101:
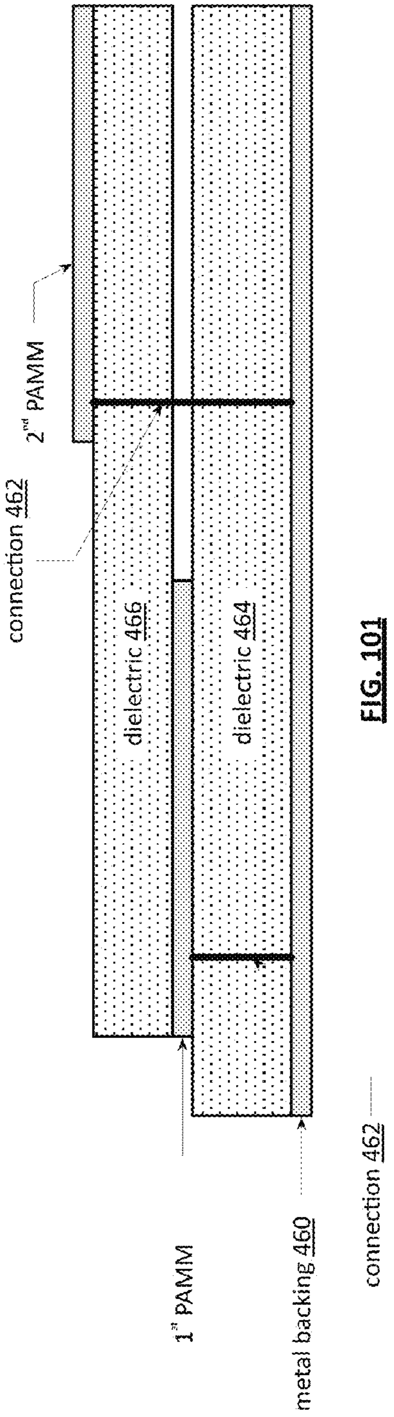
Figure 102:
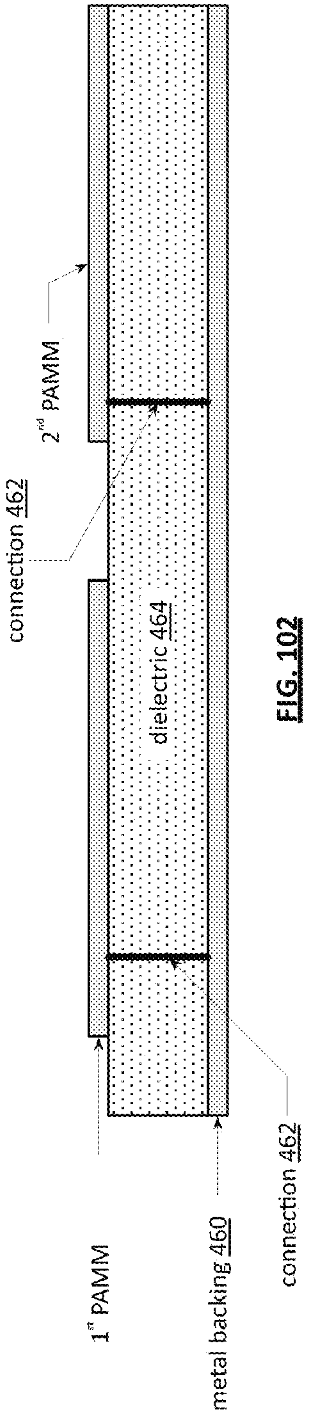
Figure 104:
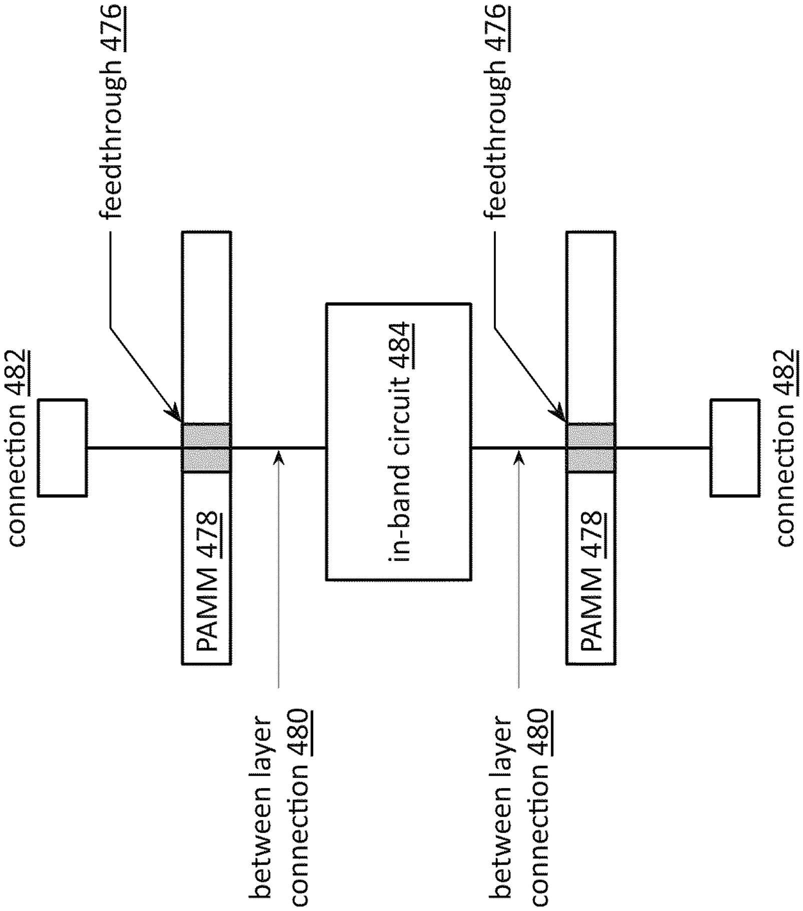
Figure 105:
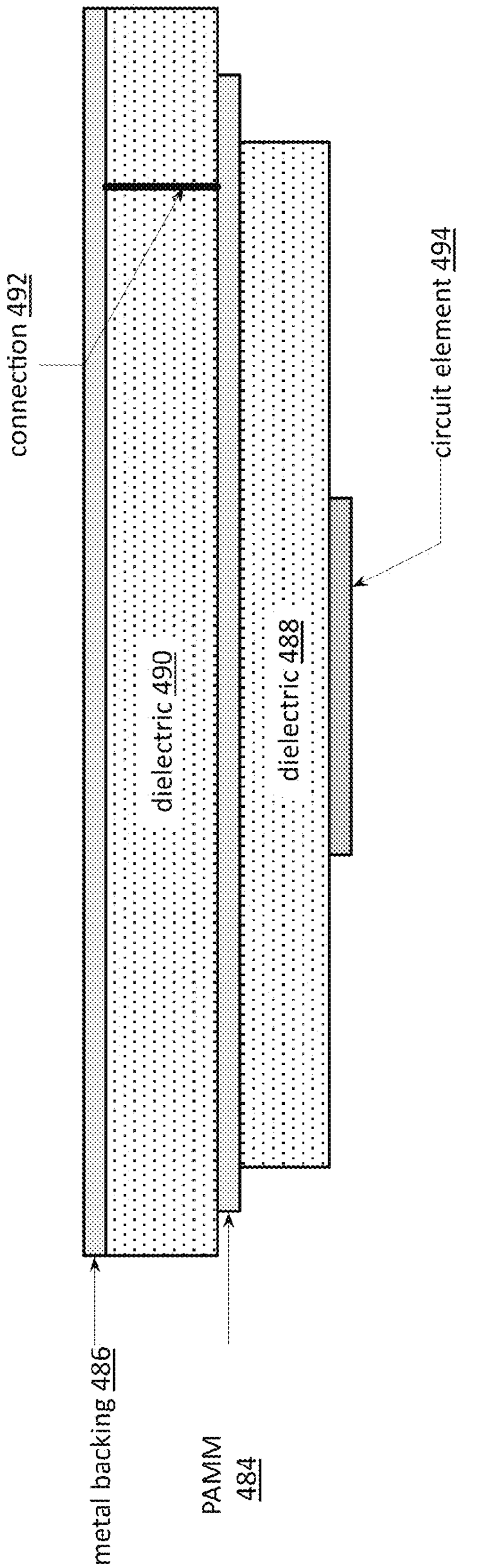
Figure 106:
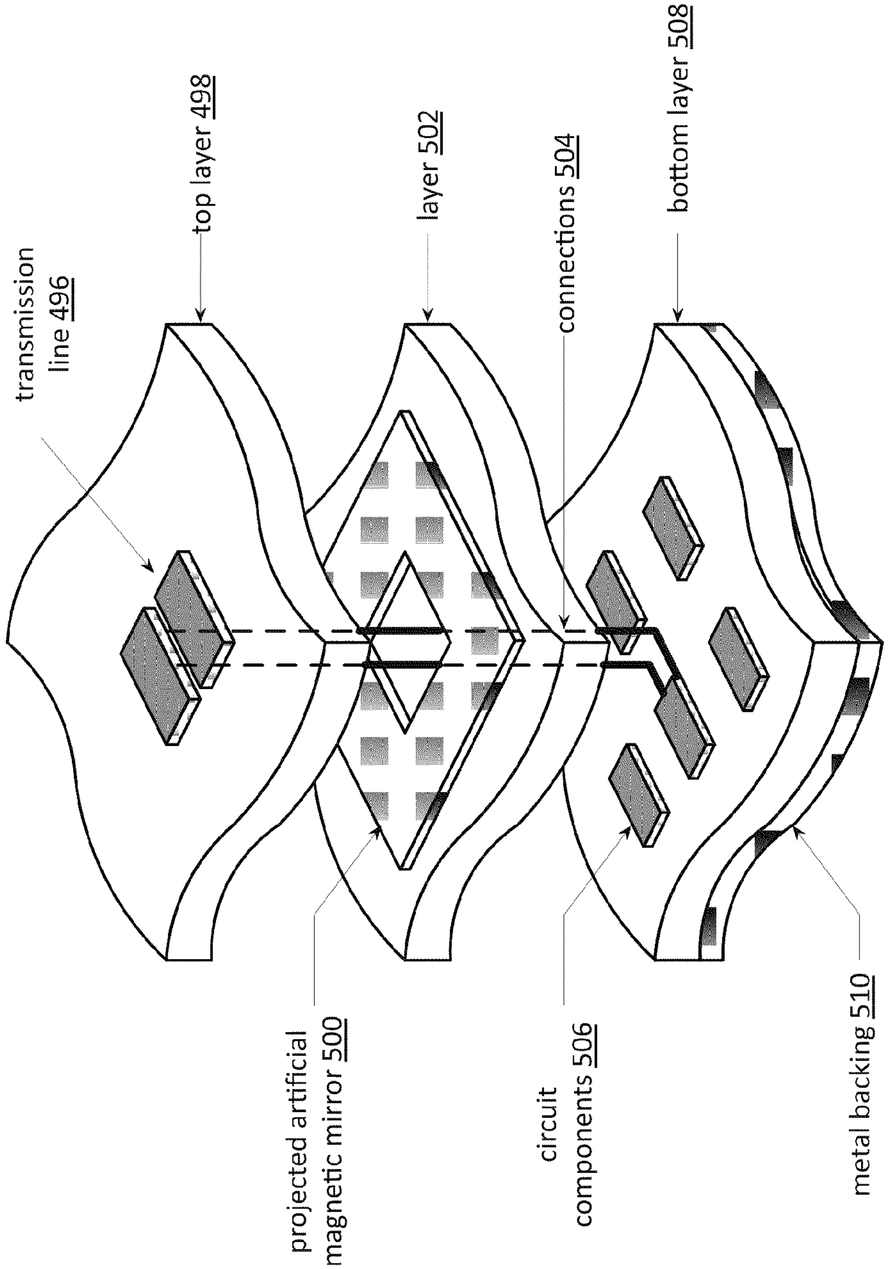
Figure 107:
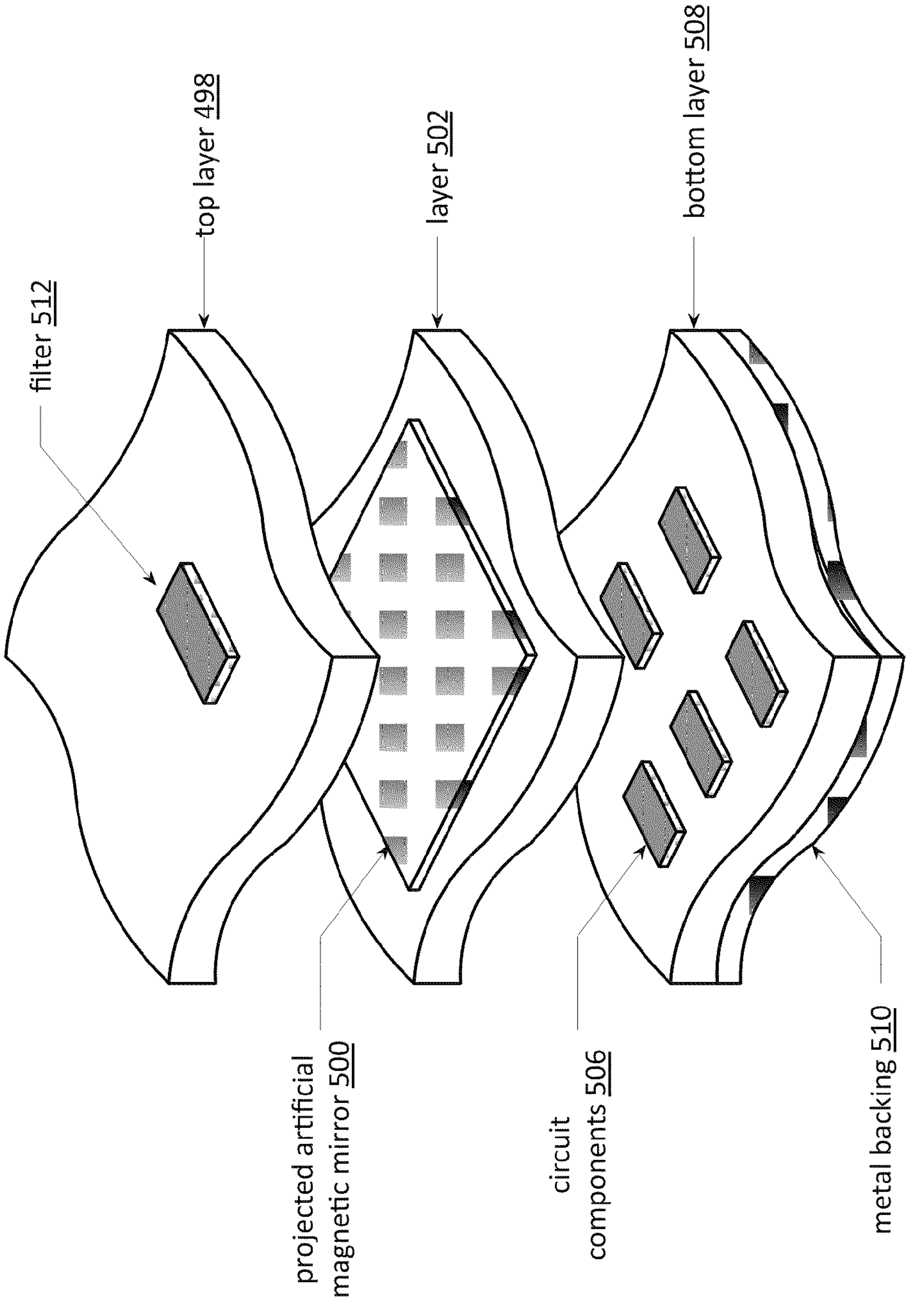
Figure 108:
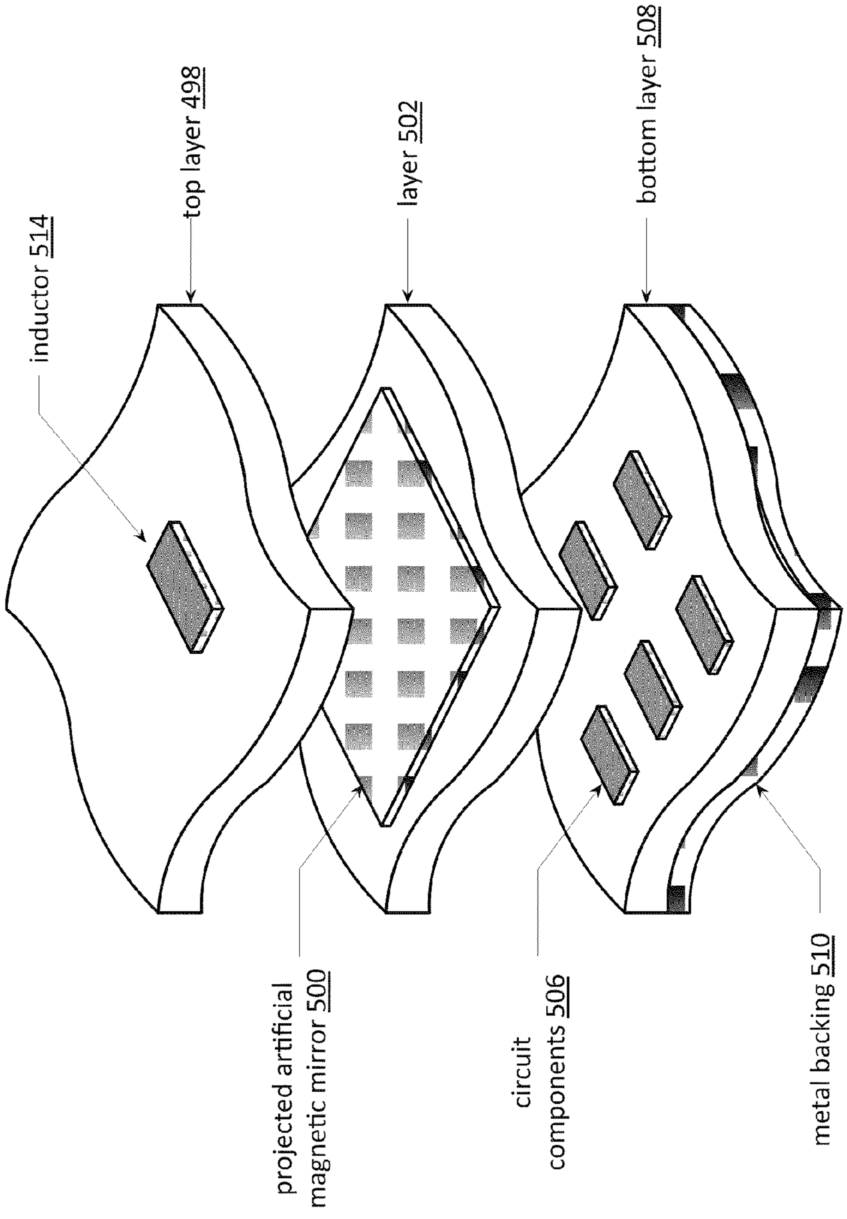
Figure 109:
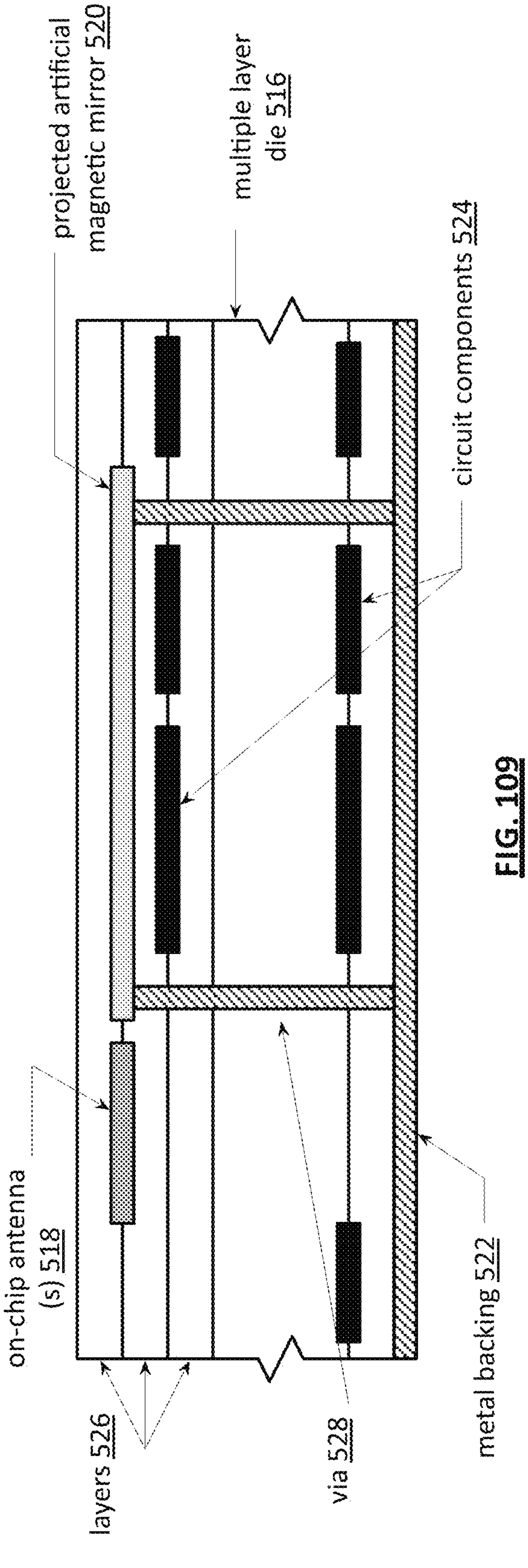

FIGS. 38*a*-38*e* are diagrams of example modified Polya curves with varying n values in accordance with the present invention;

FIGS. 39*a*-39*c* are diagrams of example modified Polya curves with varying s values in accordance with the present invention;

FIGS. 40*a*-40*b* are diagrams of embodiments of antenna structures having a modified Polya curve shape in accordance with the present invention;

FIGS. 41*a*-41*h* are diagrams of example shapes in which a modified Polya curve is confined in accordance with the present invention;

FIG. 42 is a diagram of an example of programmable modified Polya curves in accordance with the present invention;

FIG. 43 is a diagram of an embodiment of an antenna having a projected artificial magnetic mirror having modified Polya curve traces in accordance with the present invention;

FIG. 44 is a diagram of another embodiment of a projected artificial magnetic minor in accordance with the present invention;

FIG. 45 is a cross sectional diagram of an embodiment of a projected artificial magnetic minor in accordance with the present invention;

FIG. 46 is a schematic block diagram of an embodiment of a projected artificial magnetic mirror in accordance with the present invention;

FIG. 47 is a cross sectional diagram of another embodiment of a projected artificial magnetic mirror in accordance with the present invention;

FIG. 48 is a schematic block diagram of another embodiment of a projected artificial magnetic mirror in accordance with the present invention;

FIG. 49 is a cross sectional diagram of another embodiment of a projected artificial magnetic mirror in accordance with the present invention;

FIG. 50 is a schematic block diagram of another embodiment of a projected artificial magnetic mirror in accordance with the present invention;

FIG. 51 is a cross sectional diagram of another embodiment of a projected artificial magnetic mirror in accordance with the present invention;

FIG. 52 is a diagram of an embodiment of an antenna having a projected artificial magnetic mirror having spiral traces in accordance with the present invention;

FIG. 53 is a diagram of an example radiation pattern of a spiral coil in accordance with the present invention;

FIG. 54 is a diagram of an example radiation pattern of a projected artificial magnetic minor having a plurality of spiral coils in accordance with the present invention;

FIG. 55 is a diagram of an example radiation pattern of a conventional dipole antenna in accordance with the present invention;

FIG. 56 is a diagram of an example radiation pattern of a dipole antenna with a projected artificial magnetic minor in accordance with the present invention;

FIG. 57 is a diagram of an example radiation pattern of an eccentric spiral coil in accordance with the present invention;

FIG. 58 is a diagram of an example radiation pattern of a projected artificial magnetic minor having some eccentric and concentric spiral coils in accordance with the present invention;

FIG. 59 is a diagram of another example radiation pattern of a projected artificial magnetic mirror having some eccentric and concentric spiral coils in accordance with the present invention;

FIG. 60 is a diagram of a projected artificial magnetic mirror having some eccentric and concentric spiral coils in accordance with the present invention;

FIG. 61 is a diagram of an embodiment of an effective dish antenna in accordance with the present invention;

FIG. 62 is a diagram of another embodiment of an effective dish antenna in accordance with the present invention;

FIG. 63 is a diagram of an embodiment of an effective dish antenna array in accordance with the present invention;

FIG. 64 is a diagram of an example application of an effective dish antenna array in accordance with the present invention;

FIG. 65 is a diagram of an example application of an effective dish antenna array in accordance with the present invention;

FIG. 66 is a diagram of another example of an adjustable coil for use in a projected artificial magnetic minor in accordance with the present invention;

FIG. 67 is a diagram of another example of an adjustable coil for use in a projected artificial magnetic minor in accordance with the present invention;

FIG. 68 is a diagram of another example of an adjustable coil for use in a projected artificial magnetic minor in accordance with the present invention;

FIG. 69 is a cross sectional diagram of an example of an adjustable coil for use in a projected artificial magnetic minor in accordance with the present invention;

FIG. 70 is a cross sectional diagram of another example of an adjustable coil for use in a projected artificial magnetic mirror in accordance with the present invention;

FIG. 71 is a schematic block diagram of a projected artificial magnetic minor having adjustable coils in accordance with the present invention;

FIG. 72 is a diagram of another example of an adjustable coil for use in a projected artificial magnetic minor in accordance with the present invention;

FIG. 73 is a diagram of another example of an adjustable coil for use in a projected artificial magnetic minor in accordance with the present invention;

FIG. 74 is a diagram of another example of an adjustable coil for use in a projected artificial magnetic minor in accordance with the present invention;

FIG. 75 is a diagram of another example of an adjustable coil for use in a projected artificial magnetic minor in accordance with the present invention;

FIG. 76 is a diagram of another example of an adjustable coil for use in a projected artificial magnetic minor in accordance with the present invention;

FIG. 77 is a diagram of an embodiment of an adjustable effective dish antenna array in accordance with the present invention;

FIG. 78 is a diagram of an embodiment of flip-chip connection having a projected artificial magnetic minor in accordance with the present invention;

FIG. 79 is a schematic block diagram of an embodiment of communication devices communicating using electromagnetic communications in accordance with the present invention;

FIG. 80 is a diagram of an embodiment of transceiver of a communication device that communicates using electromagnetic communications in accordance with the present invention;

FIG. 81 is a diagram of another embodiment of transceiver of a communication device that communicates using electromagnetic communications in accordance with the present invention;

FIG. 82 is a diagram of another embodiment of transceiver of a communication device that communicates using electromagnetic communications in accordance with the present invention;

FIG. 83 is a cross sectional diagram of an embodiment of an NFC coil having a projected artificial magnetic minor in accordance with the present invention;

FIG. 84 is a cross sectional diagram of another embodiment of an NFC coil having a projected artificial magnetic minor in accordance with the present invention;

FIG. 85 is a cross sectional diagram of another embodiment of an NFC coil having a projected artificial magnetic minor in accordance with the present invention;

FIG. 86 is a cross sectional diagram of another embodiment of an NFC coil having a projected artificial magnetic minor in accordance with the present invention;

FIG. 87 is a schematic block diagram of an embodiment of a radar system having antenna structures that include a projected artificial magnetic minor in accordance with the present invention;

FIG. 88 is a schematic block diagram of another embodiment of a radar system having antenna structures that include a projected artificial magnetic minor in accordance with the present invention;

FIG. 89 is a schematic block diagram of another embodiment of a radar system having antenna structures that include a projected artificial magnetic minor in accordance with the present invention;

FIG. 90 is a schematic block diagram of an example of a radar system having antenna structures that include a projected artificial magnetic minor tracking an object in accordance with the present invention;

FIG. 91 is a schematic block diagram of another example of a radar system having antenna structures that include a projected artificial magnetic minor tracking an object in accordance with the present invention;

FIG. 92 is a schematic block diagram of another example of a radar system having antenna structures that include a projected artificial magnetic minor tracking an object in accordance with the present invention;

FIG. 93 is a cross sectional diagram of an embodiment of a lateral antenna having a projected artificial magnetic minor and a superstrate dielectric layer in accordance with the present invention;

FIG. 94 is a schematic block diagram of another embodiment of a radar system having antenna structures that include a projected artificial magnetic minor in accordance with the present invention;

FIG. 95 is a cross section diagram of an embodiment of a radar system having antenna structures that include a projected artificial magnetic minor in accordance with the present invention;

FIG. 96 is a schematic block diagram of an embodiment of a multiple frequency band projected artificial magnetic minor in accordance with the present invention;

FIG. 97 is a cross sectional diagram of an embodiment of a multiple frequency band projected artificial magnetic minor in accordance with the present invention;

FIG. 98 is a diagram of an embodiment of a MIMO antenna having a projected artificial magnetic minor in accordance with the present invention;

FIG. 99 is a diagram of an embodiment of an antenna of a MIMO antenna having a multiple frequency band projected artificial magnetic minor in accordance with the present invention;

FIG. 100 is a diagram of an embodiment of a dual band MIMO antenna having a projected artificial magnetic minor in accordance with the present invention;

FIG. 101 is a cross sectional diagram of an embodiment of a multiple projected artificial magnetic minors on a common substrate in accordance with the present invention;

FIG. 102 is a cross sectional diagram of an embodiment of a multiple projected artificial magnetic minors on a common substrate in accordance with the present invention;

FIGS. 103 *a-d* are diagrams of embodiments of a projected artificial magnetic minor waveguide in accordance with the present invention;

FIG. 104 is a diagram of an embodiment of an-chip projected artificial magnetic mirror interface for in-band communications in accordance with the present invention;

FIG. 105 is a cross sectional diagram of an embodiment of a projected artificial magnetic mirror to a lower layer in accordance with the present invention;

FIG. 106 is a diagram of an embodiment of a transmission line having a projected artificial magnetic minor in accordance with the present invention;

FIG. 107 is a diagram of an embodiment of a filter having a projected artificial magnetic mirror in accordance with the present invention;

FIG. 108 is a diagram of an embodiment of an inductor having a projected artificial magnetic mirror in accordance with the present invention; and FIG. 109 is a cross sectional diagram of an embodiment of an antenna having a coplanar projected artificial magnetic mirror in accordance with the present invention.

DETAILED DESCRIPTION OF THE INVENTION

Figure 1:
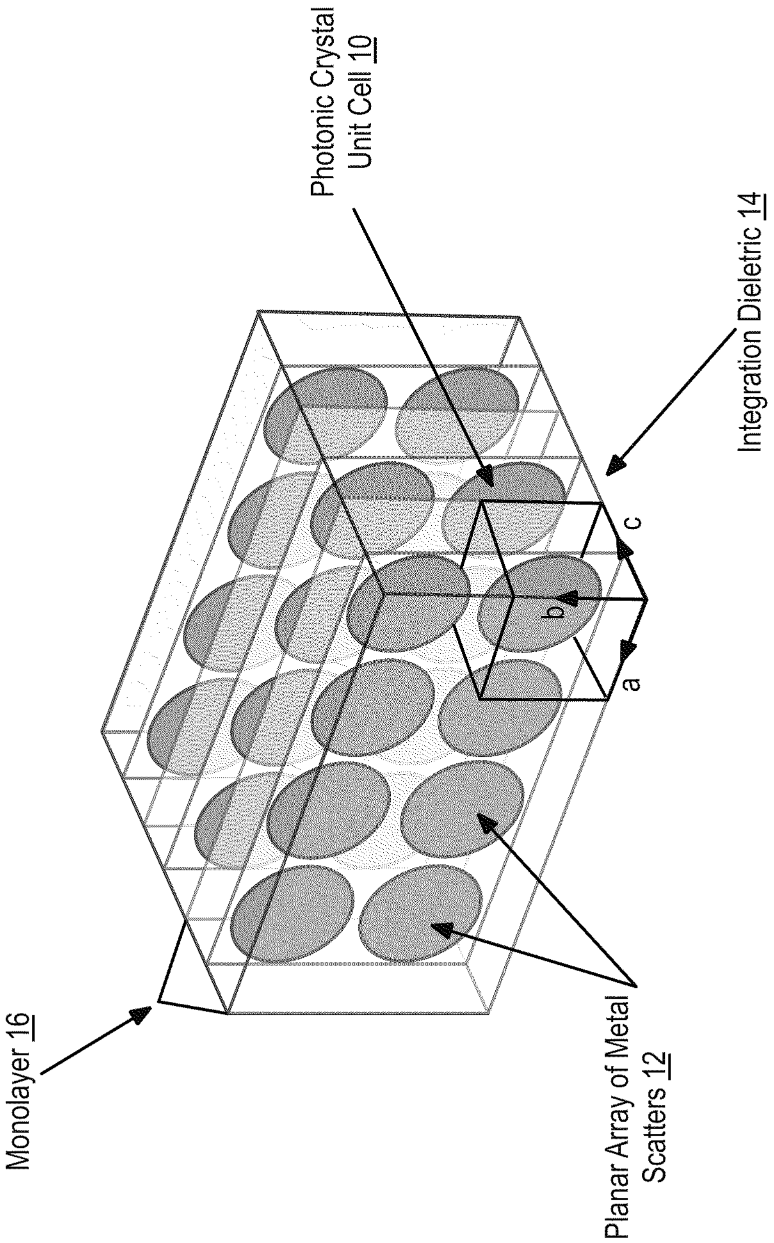
FIG. 1 is a diagram of an embodiment of a plurality of photonic crystal unit cells in accordance with the present invention.

FIG. 1 is a diagram of an embodiment of a plurality of photonic crystal unit cells 10 that includes layers of planar arrays of metal scatters 12. Each layer of metal scatters 12 includes an integration (dielectric) layer 14 and a plurality of photonic crystal unit cells 10 (e.g., metal discs). A monolayer 16 of photonic crystal unit cells 10 may be configured as shown.

Figure 2:
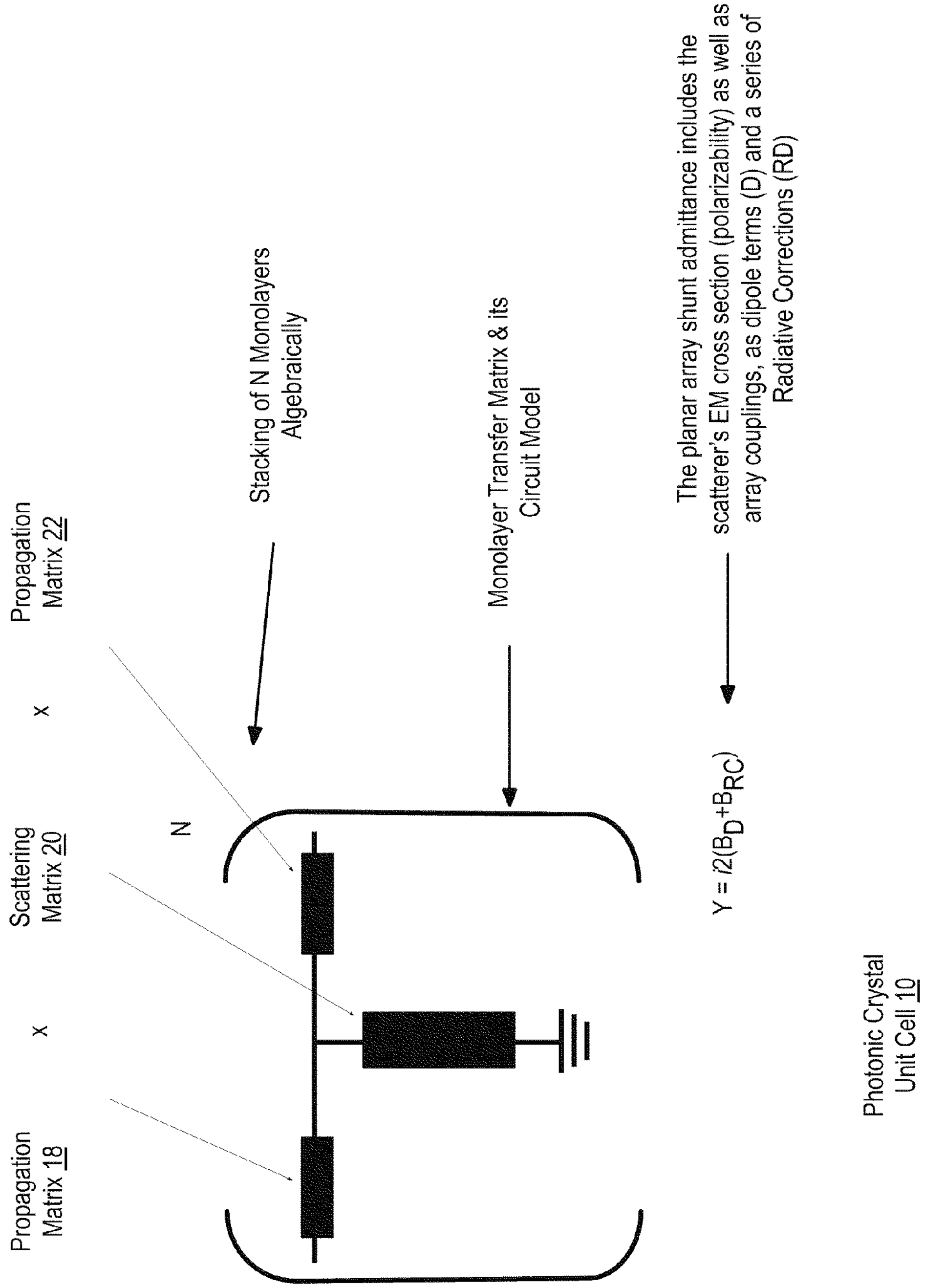
FIG. 2 is a diagram of a theoretical representation of a crystal unit cell in accordance with the present invention.

FIG. 2 is a diagram of a theoretical representation of a crystal unit cell 10 having a propagation matrix 18, a scatter matrix 20, and a second propagation matrix 22. An analytical solution for the disc medium may be expressed as follows:

$$B_D^D = \frac{16}{3}\left(\frac{r}{a}\right)^2 \frac{kr}{\cos\theta_d}\left[\frac{1}{1-\frac{8}{3}\left(\frac{r}{a}\right)^3 C_e} - \frac{\sin^2\theta_d}{2}\frac{1}{1-\frac{4}{3}\left(\frac{r}{a}\right)^3 C_m}\right]$$

where kr is a scatter electromagnetic size, θd is the incidence angle in the dielectric, a is the scatter size with respect to UC (approximate filling fraction), Cc and Cm are electric and magnetic coupling constants.

$$B_{RC}^D = \frac{16}{3}\left(\frac{r}{a}\right)^2 \frac{kr}{\cos\theta_d}(kr)^2\left[\frac{8}{15} - \frac{\sin^2\theta_d}{6} - \frac{\sin^4\theta_d}{150}\right]$$

where the parenthetic term corresponds to the quadrupole radioactive corrections.

This analytical solution is valid for any angle of incidence and any polarization. Such a solution may also be applied for cylindrical excitations and modal excitations in rectangular or circular waveguides. Further, the solution may have a validity range within dominant propagating mode with possible extensions.

Continuing the preceding equations, Electric & Magnetic couplings of a square planar array may be expressed as:

$$C_e = \frac{1}{\pi}[1.2 - 8\pi^2 K_0(2\pi)] + \frac{(ka)^2}{2\pi}\left[-\ln 4\pi + \frac{1}{2} + \frac{(ka)^2}{48} - i\left(\left(\frac{ka}{3}\right) - \frac{\pi}{ka\cos\theta_d}\right) + \pi\sum_{l=1}^{\infty}\left(\frac{1}{a\Gamma_l} + \frac{1}{a\Gamma_{-l}} - \frac{1}{l\pi}\right)\right] + (ka)^2\left[\left(\frac{2}{\pi} + 4\pi\sin^2\theta_d\right)K_0(2\pi) - 2K_1(2\pi)\right]$$

$$C_m = -\frac{1}{2\pi}\left[1.2 + \frac{\pi^2}{3} - 8\pi K_1(2\pi)\right] - \frac{(ka)^2}{4\pi}\left[1 - \gamma + (1-\cos ka)\ln\left(\frac{8\pi}{(ka)^2}\right) + \frac{(ka)^2}{48} - 2i\left(\left(\frac{ka}{3}\right) - \frac{\pi\sin^2\theta_d}{ka\cos\theta_d}\right) - 2\pi\sum_{l=1}^{\infty}\left(\frac{1}{a\Gamma_l} + \frac{1}{a\Gamma_{-l}} - \frac{1}{2l\pi} + \frac{a\Gamma_l + a\Gamma_{-l} - 4l\pi}{(ka)^2}\right)\right] + \frac{(ka)^2}{\pi}[2K_0(2\pi) - K_2(2\pi)]$$

Reconstructing the S-Parameters Yields:

$$S_{11}^{(i)} = \frac{\Psi_i\left(\frac{1-[\xi_i]^N}{2\tau_i\zeta_i}\right)\left(\eta_-^{(i)} - \eta_+^{(i)}\frac{Y_i}{2\Psi_i}\right)}{1 + [\xi_i]^N + \Psi_i\left(\frac{1-[\xi_i]^N}{2\tau_i\zeta_i}\right)\left(\eta_+^{(i)} - \eta_-^{(i)}\frac{Y_i}{2\Psi_i}\right)},$$

$$S_{21}^{(i)} = \frac{\left(\frac{2}{(1+\zeta_i)^N\tau_i^N}\right)}{1 + [\xi_i]^N + \Psi_i\left(\frac{1-[\xi_i]^N}{2\tau_i\zeta_i}\right)\left(\eta_+^{(i)} - \eta_-^{(i)}\frac{Y_i}{2\Psi_i}\right)}$$

$$\Psi_i = j\sin(k_0 cn\cos(\theta_d)) + \cos(k_0 cn\cos(\theta_d))Y_i$$

$$\tau_i = \cos(k_0 cn\cos(\theta_d)) + j\sin(k_0 cn\cos(\theta_d))Y_i$$

$$\zeta_i = \frac{\Psi_i}{\tau_i}\sqrt{1 - \left(\frac{Y_i}{\Psi_i}\right)^2},\ \xi_i = \frac{1-\zeta_i}{1+\zeta_i},\ \eta_\pm^i = \frac{\eta_a^i}{\eta_d^i} \pm \frac{\eta_d^i}{\eta_a^i}$$

-continued $$\eta_\alpha^i = \frac{\eta_\alpha}{\cos^i\theta_\alpha},\ \eta_\alpha = \sqrt{\frac{\mu_\alpha}{\varepsilon_\alpha}},\ \alpha \in \{a = \text{air},\ d = \text{dielectric}\},\ i \in \{1, -1\},$$

where cn corresponds to a host refractive index, na corresponds to a wave impedance, and i corresponds to polarization.

Figure 3:
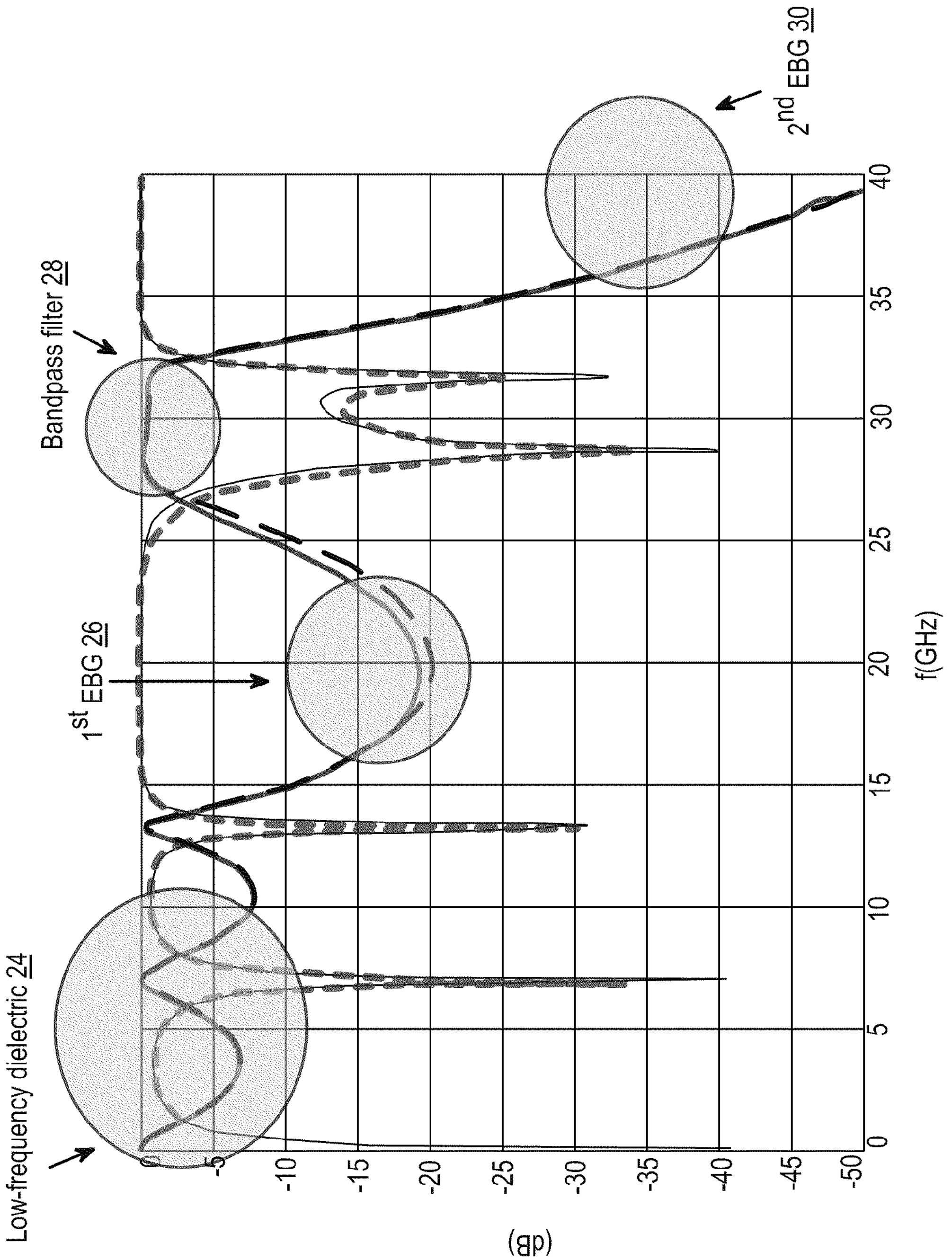
FIG. 3 is a diagram of an example frequency response of a plurality of photonic crystal unit cells in accordance with the present invention.

FIG. 3 is a diagram of an example frequency response of a plurality of photonic crystal unit cells. In a first frequency band, the photonic crystal cells provide a low-frequency dielectric 24; in a second frequency band, the photonic crystal cells provide a first electromagnetic band gap (EBG) 26; in a third frequency band, the photonic crystal cells provide a bandpass filter 28; and in a fourth frequency band, the photonic crystal cells provide a second EBG 30.

In this example, the photonic crystal cells are designed to provide the above-mentioned characteristics in a frequency range up to 40 GHz. With a different design, the photonic crystal cells may provide one or more of the above-mentioned characteristics at other frequencies. For example, it may be desirable to have the photonic crystal cells provide a bandpass filter at 60 GHz, an electromagnetic band gap (EBG) at 60 GHz, etc. As another example, it may be desirable to have the photonic crystal cells provide one or more of the above-mentioned characteristics at other microwave frequencies (e.g., 3 GHz to 300 GHz).

Figure 4:
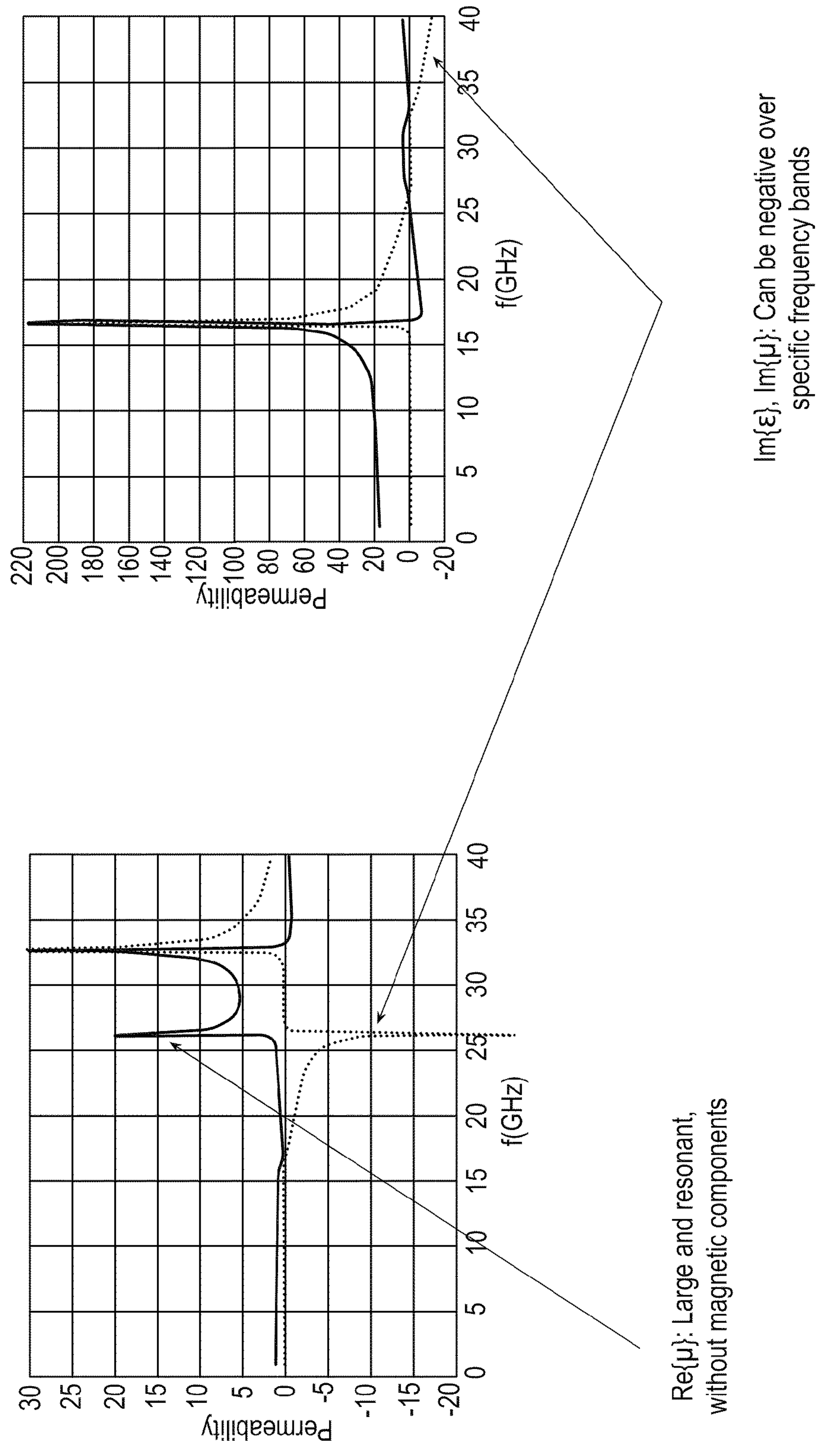
FIG. 4 is a diagram of another example frequency response of a plurality of photonic crystal unit cells in accordance with the present invention.

FIG. 4 is a diagram of another example frequency response of a plurality of photonic crystal unit cells. For instance, the graphs illustrate effective response functions and the development of resonant magnetization for the photonic crystal cells, respectively.

With reference to the graphs, artificial magnetism develops in non-magnetic metalo-dielectric Photonic Crystals from stacking alternating current sheets in the Photonic Crystal to create a strong magnetic dipole density for specific frequency bands. The corresponding magnetization for the k+1-pair of monolayers is parallel to the total magnetic field at that location and is given by:

$$M^{(k+1)} = \frac{1}{2}J_s^{(2k+1)}\hat{x}$$

where $J_s^{(2k+1)}$ is the surface current density at one monolayer of the pair. The adjacent monolayer of the pair has the opposite current density. This sheet of magnetic dipoles gives rise to a total magnetic dipole moment and the corresponding artificial magnetization. It only occurs inside Electromagnetic Band Gaps. This creates the phenomenon of Artificial Magnetic Conductors (AMC's) in the Photonic Crystals.

Figure 5:
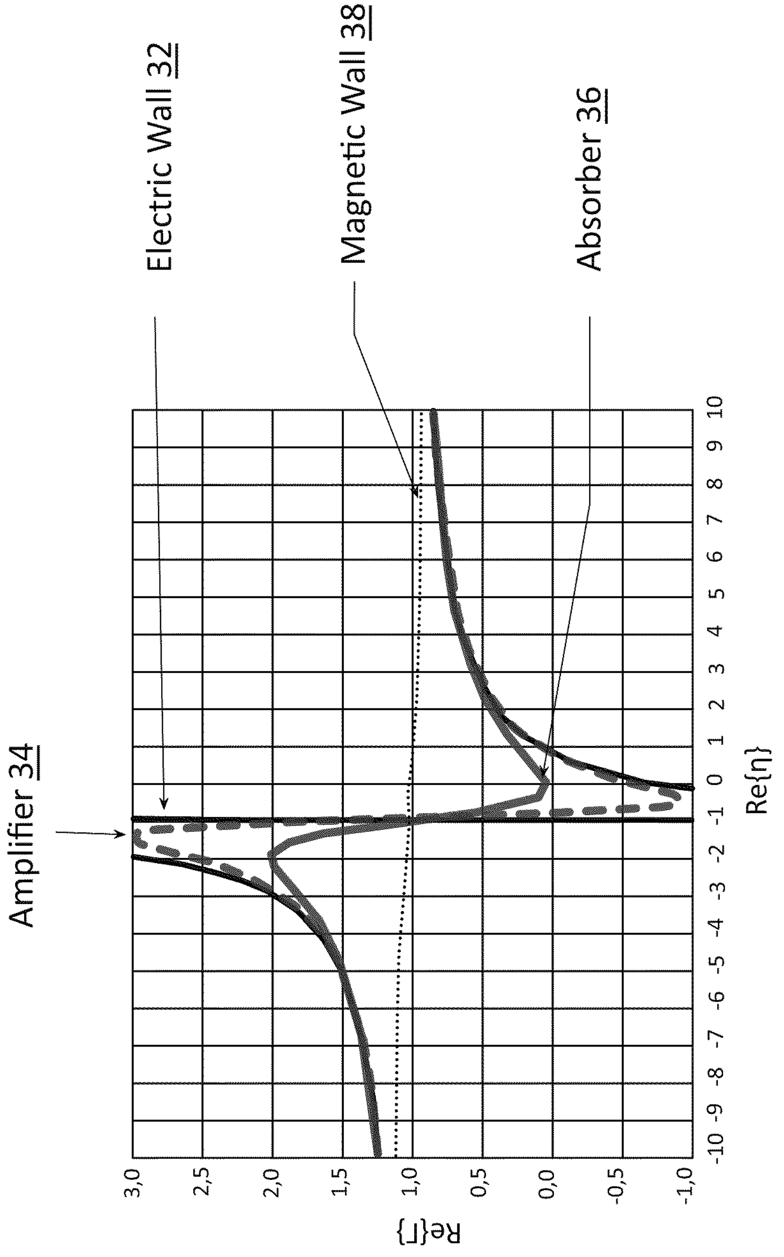
FIG. 5 is a diagram of another example frequency response of a plurality of photonic crystal unit cells in accordance with the present invention.

FIG. 5 is a diagram of another example frequency response of a plurality of photonic crystal unit cells. This graph illustrates various properties of metamorphic materials, such as the photonic crystals. In such materials, the reflection coefficient for a semi-infinite medium only depends on the complex wave impedance, which may be expressed as:

$$\Gamma = \frac{\eta - 1}{\eta + 1},\ \eta = \sqrt{\frac{\mu}{\varepsilon}}$$

Varying the n term, the various properties of the material are exhibited. For example, setting n to +/−0.1 produces the property of an electric wall 32; setting n to +/−0.5 produces the property of an amplifier 34; setting n to +/−1 produces the property of an absorber 36; and setting n to +/−10 produces the property of a magnetic wall 38.

Figure 6:
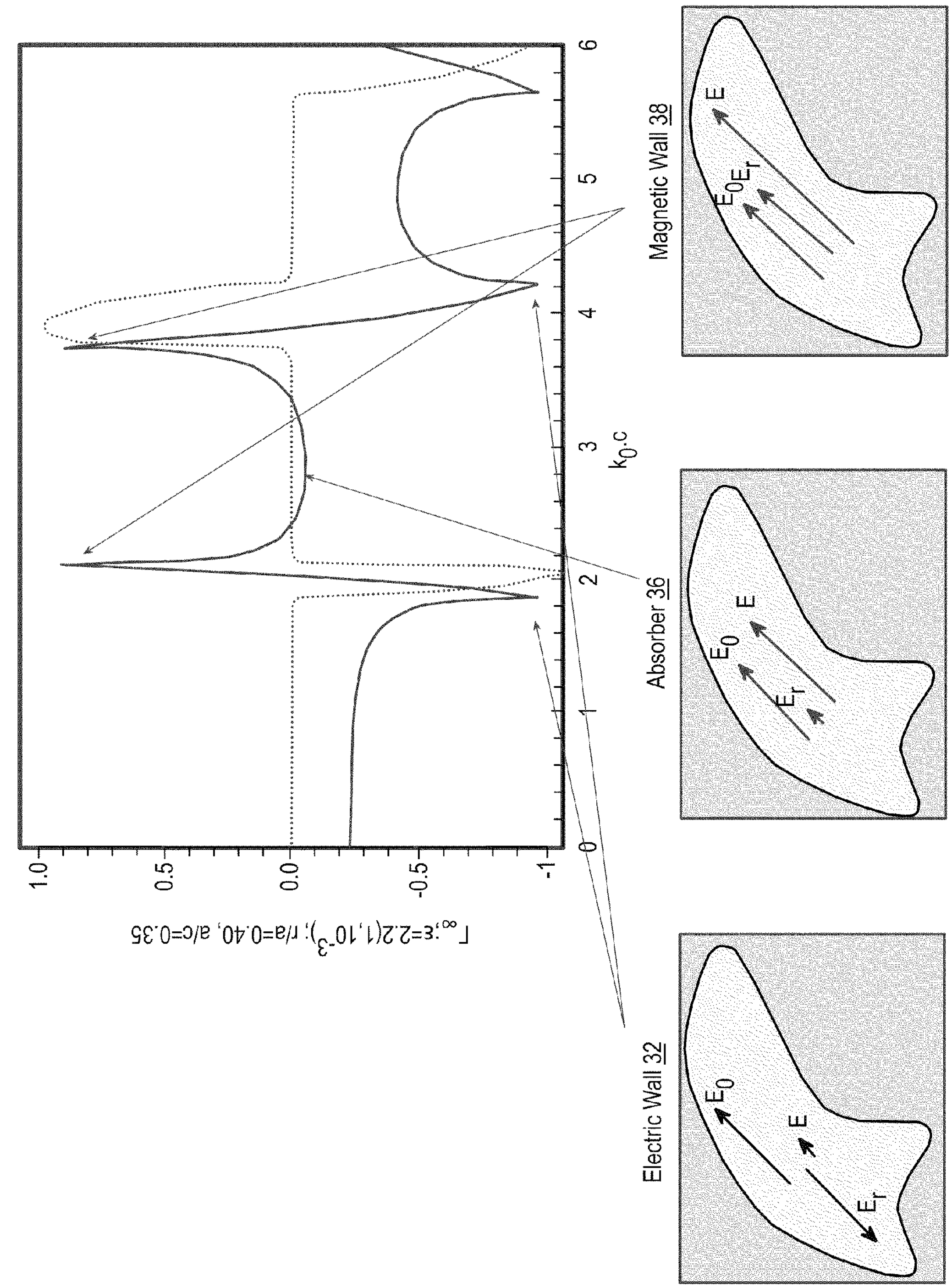
FIG. 6 is a diagram of another example frequency response of a plurality of photonic crystal unit cells in accordance with the present invention.

FIG. 6 is a diagram of another example frequency response of a plurality of photonic crystal unit cells. In particular, this diagram illustrates the various properties of the metamorphic material over various conditions (e.g., varying $k_0c$).

Figure 7:
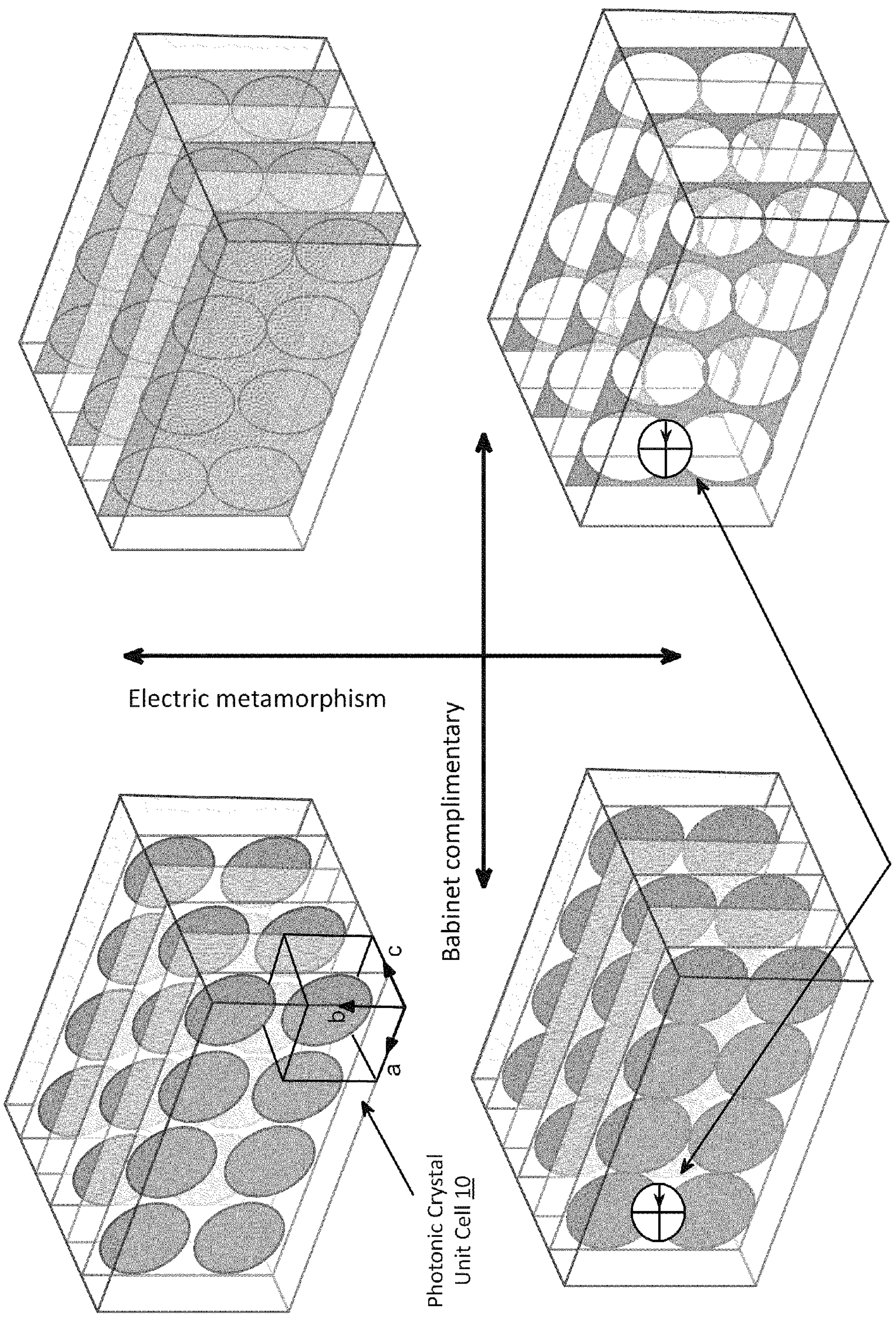
FIG. 7 is a diagram of another embodiment of a plurality of photonic crystal unit cells in accordance with the present invention.

FIG. 7 is a diagram of another embodiment of a plurality of photonic crystal unit cells 10. In this diagram, the metamorphic material is reconfigurable to achieve electromagnetic transitions at approximately the same frequency. Each of the cells includes one or more switches 40 (e.g., diodes and/or MEMS switches) to couple the cells to produce a photonic crystal or the complement thereof.

Figure 8:
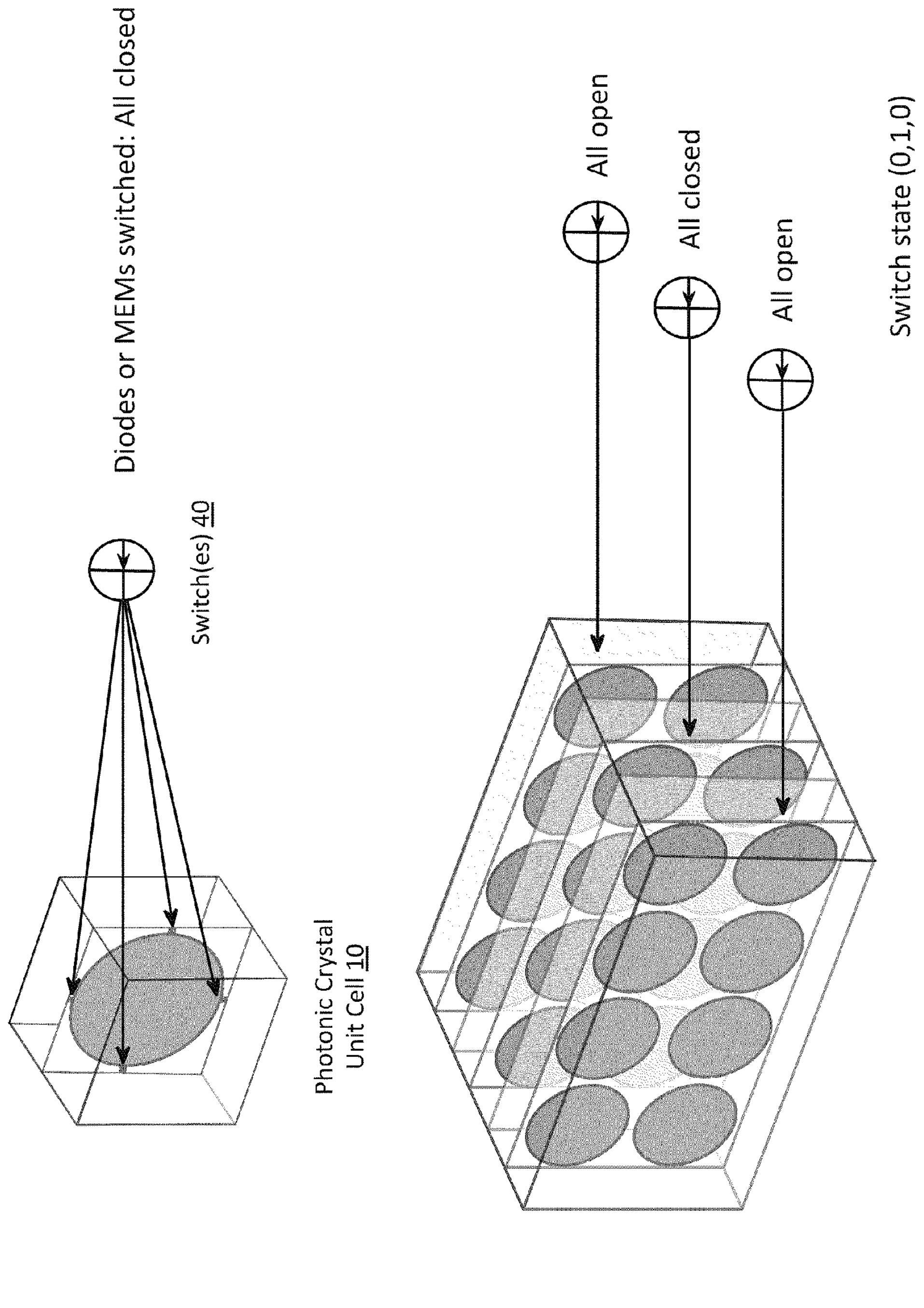
FIG. 8 is a diagram of another embodiment of a plurality of photonic crystal unit cells in accordance with the present invention.

FIG. 8 is a diagram of another embodiment of a plurality of photonic crystal unit cells 10. In this example, the first and third layers of cells have their respective switches 40 opened while the cells on the second layer have their respective switches 40 closed. In this configuration, the first and third layers provide similar current sheets and the second layer provides a complimentary current sheet.

Figure 9:
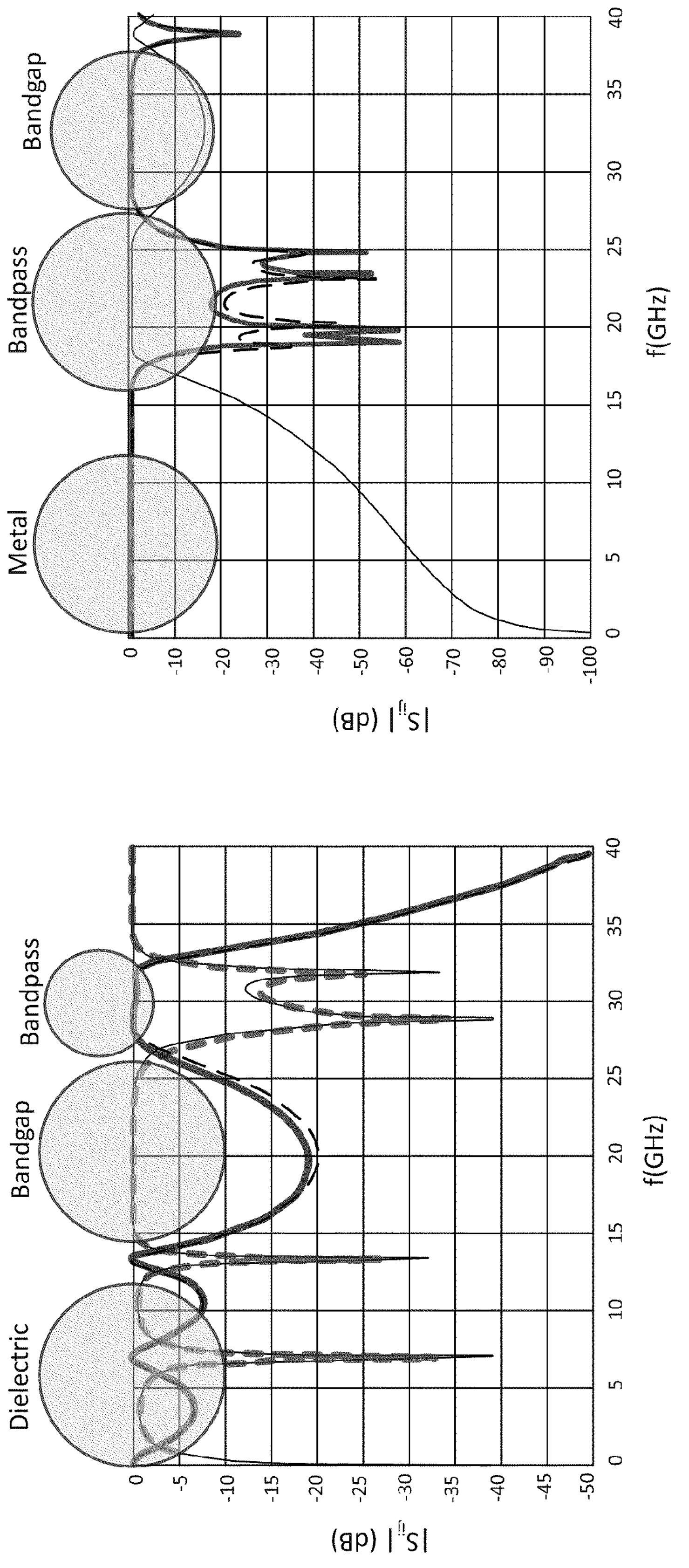
FIG. 9 is a diagram of another example frequency response of a plurality of photonic crystal unit cells in accordance with the present invention.

FIG. 9 is a diagram of another example frequency response of a plurality of photonic crystal unit cells. With reference to this diagram, the analytical solution for Babinet's principle of complimentary screens can be formalized in Booker's relation. In this regard, the metamorphic material (e.g., the photonic crystal) may be tuned to provide the capacitive based characteristics as shown in graph on the left of the figure and the inductive based characteristics as shown in the graph on the right of the figure.

Figure 10:
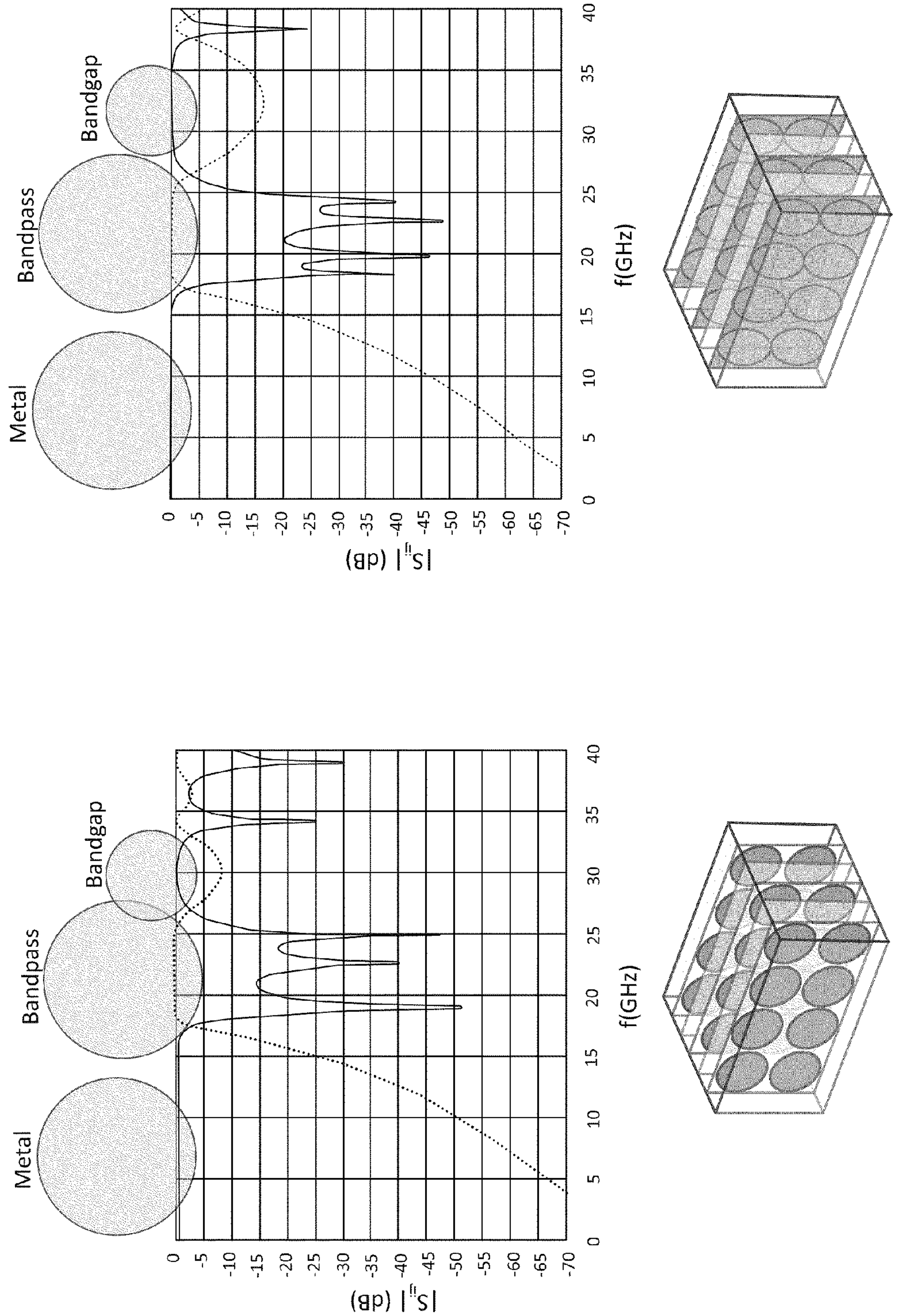
FIG. 10 is a diagram of another example frequency response for corresponding pluralities of photonic crystal unit cells in accordance with the present invention.

FIG. 10 is a diagram of another example frequency response for corresponding pluralities of photonic crystal unit cells. In this diagram, the graph on the left corresponds to the photonic crystal shown below it (e.g., the switches of the cells on each layer are open). The graph on the right of the diagram illustrates the characteristics of the photonic crystal when the switches of the cells on each layer are closed.

Figure 11:
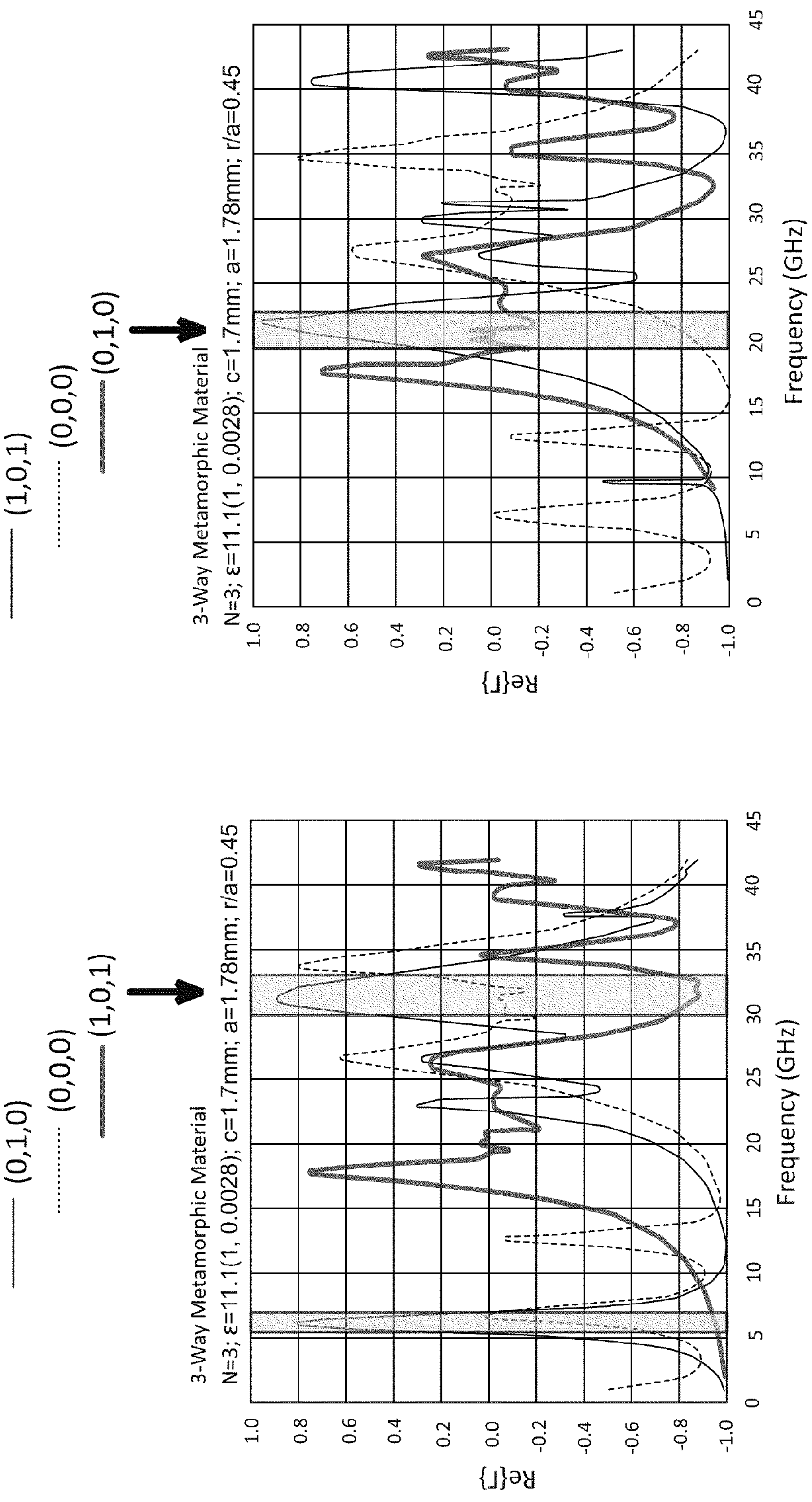
FIG. 11 is a diagram of another example frequency response of a plurality of photonic crystal unit cells in accordance with the present invention.

FIG. 11 is a diagram of another example frequency response of a plurality of photonic crystal unit cells. In this diagram, the opening and closing of switches on the various layers is adjusted. For the graph on the left, the solid thin line represents characteristics on the photonic crystal when the switches on the first and third layers are open and the switches on the second layer are closed; the dash line corresponds to the characteristics when the switches on the layers are open; and the solid thick line corresponds to the characteristics when the switches on the layers are closed.

For the graph on the right, the solid thin line represents characteristics on the photonic crystal when the switches on the first and third layers are closed and the switches on the second layer are open; the dash line corresponds to the characteristics when the switches on the layers are open; and the solid thick line corresponds to the characteristics when the switches on the layers are closed.

Figure 12:
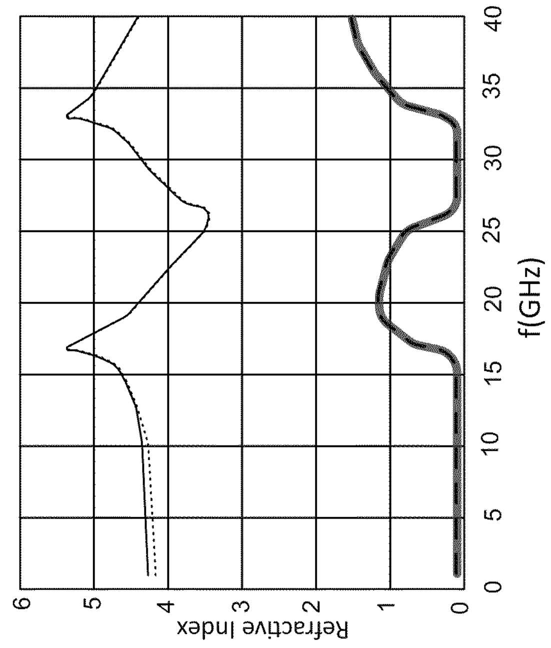
FIG. 12 is a diagram of another example frequency response of a plurality of photonic crystal unit cells in accordance with the present invention.

FIG. 12 is a diagram of another example frequency response of a plurality of photonic crystal unit cells. In this diagram, the refractive index is plotted over frequency and corresponds to the effective response functions through resonant inverse scattering. As such, the photonic crystals may be characterized as homogenized metamaterials through the S-parameters and an analytical inverse scattering method. This leads to the derivation of complex functions $\{\in(\omega), \mu(\omega)\}$ or equivalently $\{n(\omega), \eta(\omega)\}$, which are valid for resonant frequency regions. Mathematically, this may be expressed as:

$$\eta = \frac{1+A}{1-A} = \pm\sqrt{\frac{V+1}{V-1}},$$

$$A = V \pm \sqrt{V^2 - 1},$$

where n is the complex wave impedance;

$$\mathrm{Re}(n) = \frac{\arccos(\mathrm{Re}\{x\}/|x|)}{k_0 d},\ \mathrm{Im}(n) = -\frac{\ln|x|}{k_0 d},$$

where Re(n) and Im(n) are complex refractive index;

$$V = \frac{1 + S_{11}^2 - S_{21}^2}{2S_{11}},\ x = \frac{S}{1 + R - ASR},$$

$$S = S_{11} + S_{21},\ R = \frac{S_{11}}{S_{21}}$$

$$\{\varepsilon(\omega), \mu(\omega)\} = \left\{\frac{n(\omega)}{\eta(\omega)}, n(\omega)\cdot\eta(\omega)\right\}$$

Figure 13:
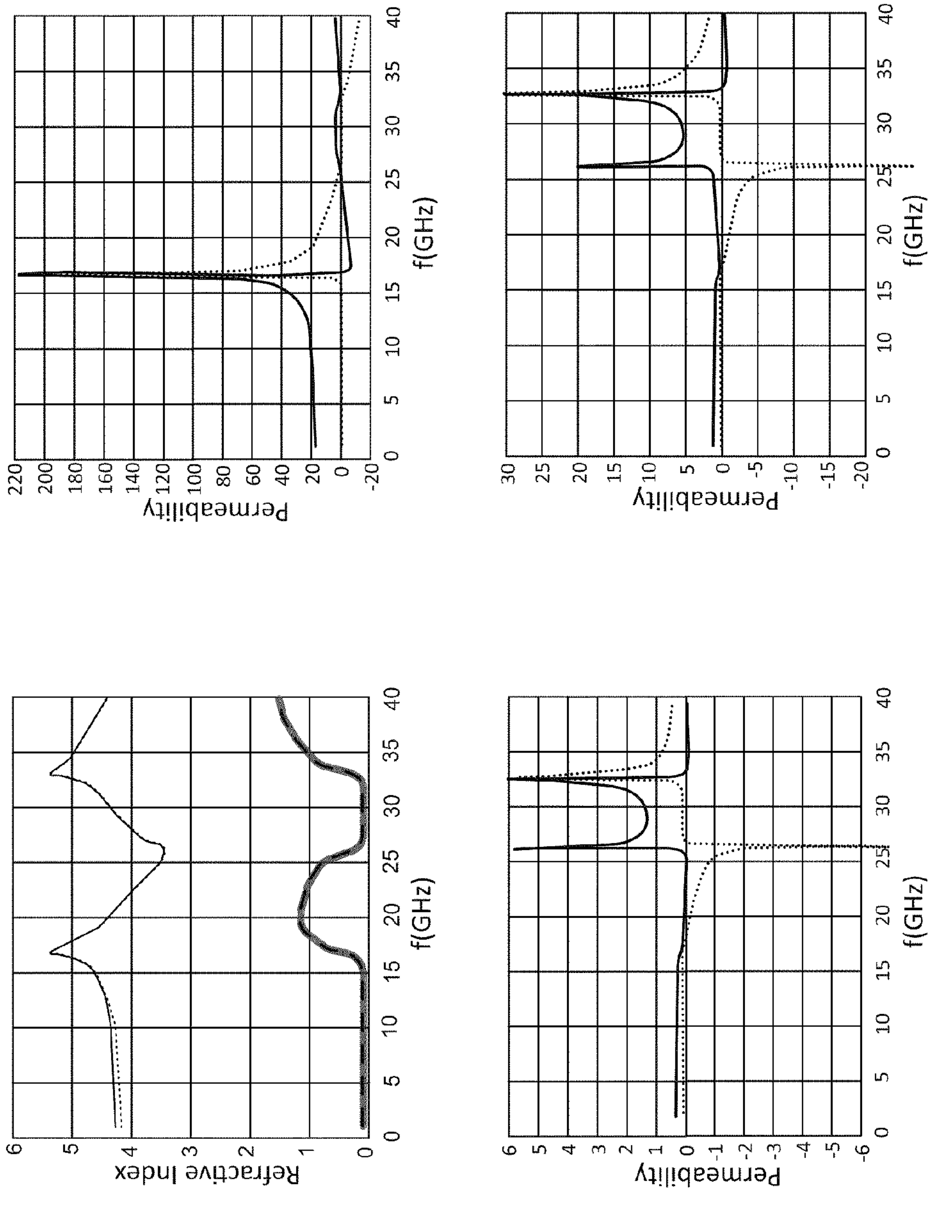
FIG. 13 is a diagram of additional example frequency responses of a plurality of photonic crystal unit cells in accordance with the present invention.

FIG. 13 is a diagram of additional example frequency responses of a plurality of photonic crystal unit cells. These graphs represent the impedance characterization for a photonic sample and illustrate that the complex functions $\{\in(\omega), \mu(\omega)\}$, $\{n(\omega), \eta(\omega)\}$ are independent of the photonic crystal thickness, which provides proof of the validity of the homogenized description.

Figure 14:
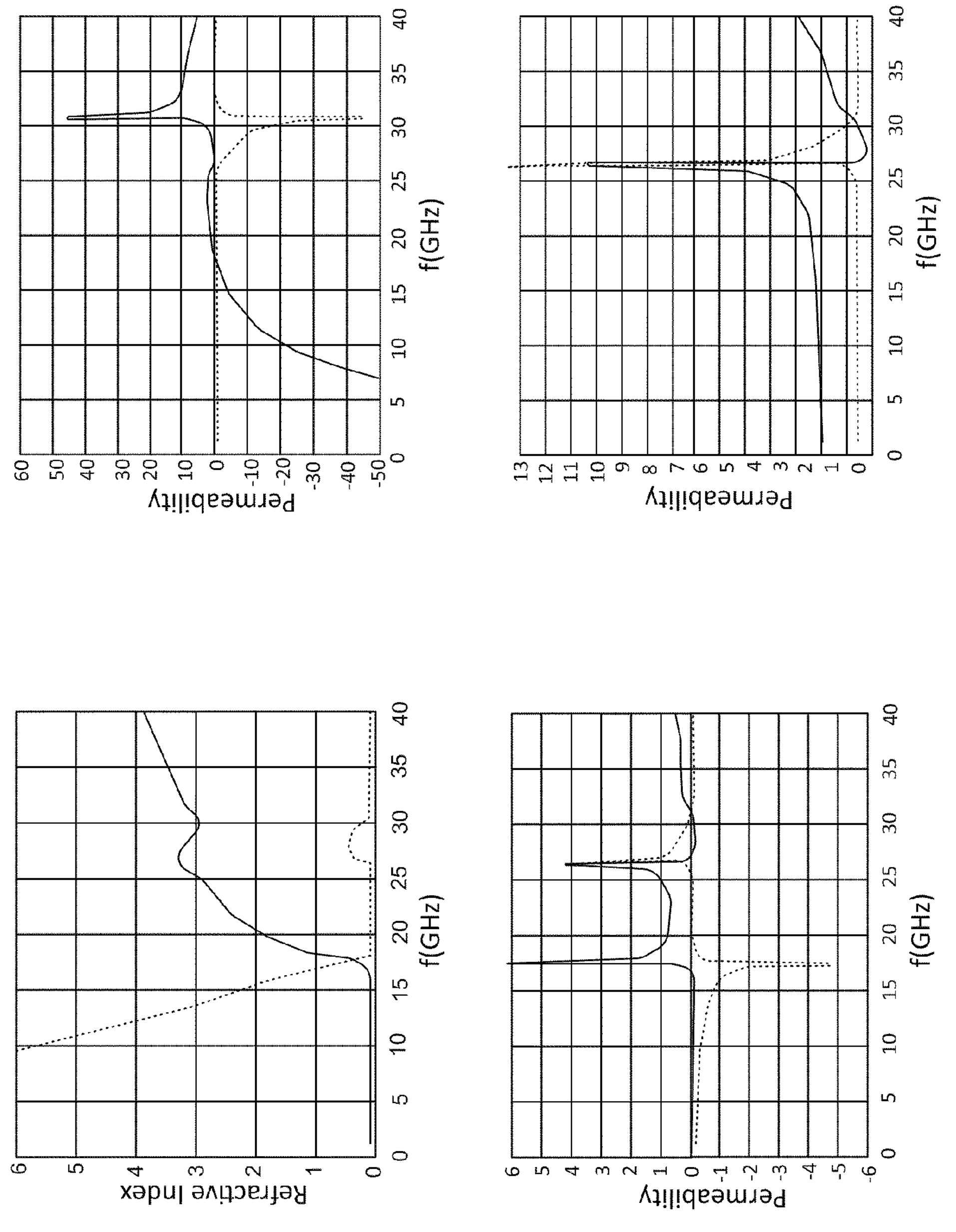
FIG. 14 is a diagram of additional example frequency responses of a plurality of photonic crystal unit cells in accordance with the present invention.

FIG. 14 is a diagram of additional example frequency responses of a plurality of photonic crystal unit cells. These graphs represent the impedance characterization for a photonic sample having a shorted disk medium.

Figure 15:
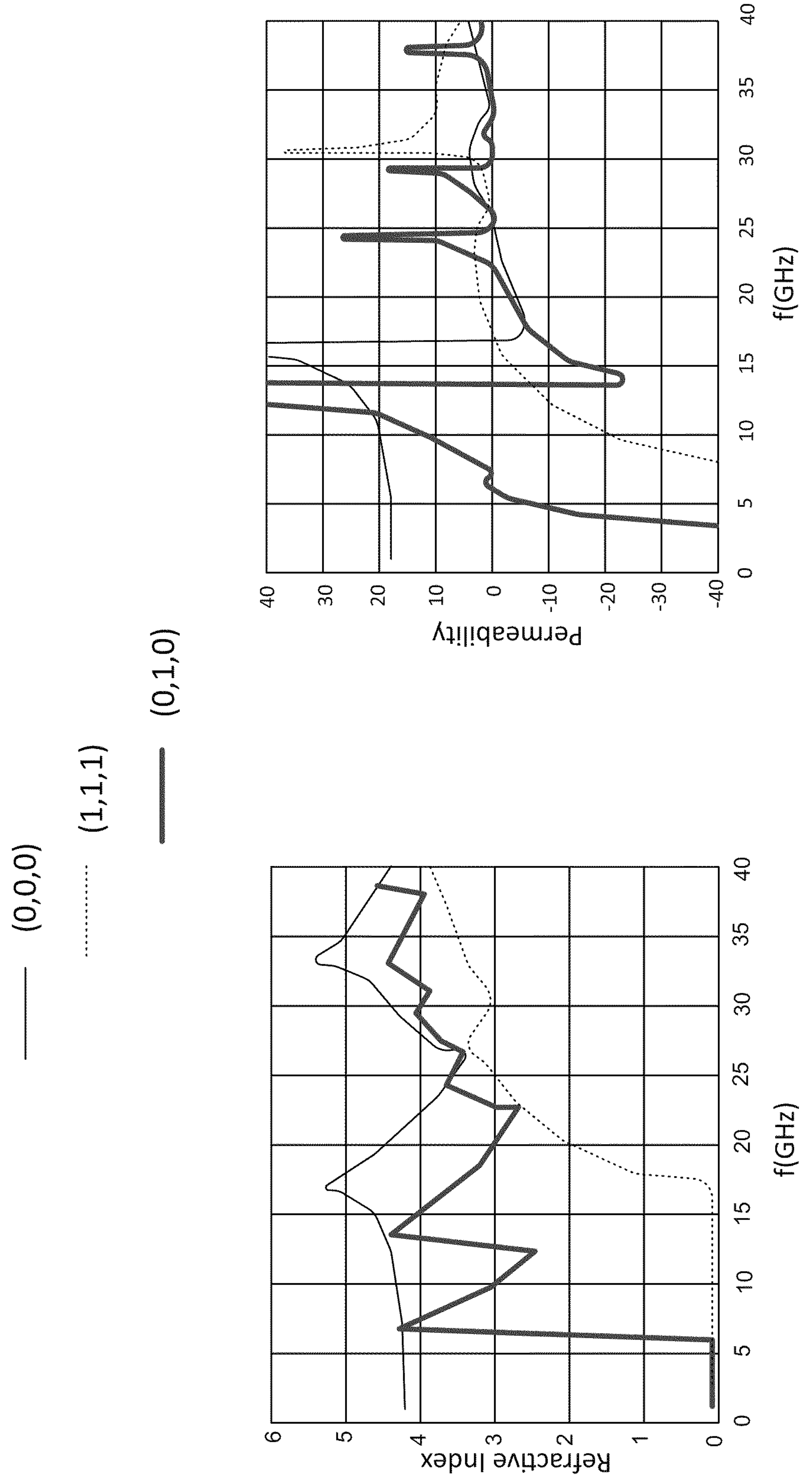
FIG. 15 is a diagram of additional example frequency responses of a plurality of photonic crystal unit cells in accordance with the present invention.

FIG. 15 is a diagram of additional example frequency responses of a plurality of photonic crystal unit cells. In particular, the graph on the left illustrates the refractive index over frequency for various switch configurations of the layers of the photonic crystal and the graph on the right illustrates the permittivity over frequency for various switch configurations of the layers of the photonic crystal.

In both graphs, the solid thin line corresponds to having the switches open on each of the layers; the dash line corresponds to the switches being closed on each of the layers; and the solid thick line corresponds to the switches on the first and third layers being open and the switches on the second layer being closed.

Figure 16:
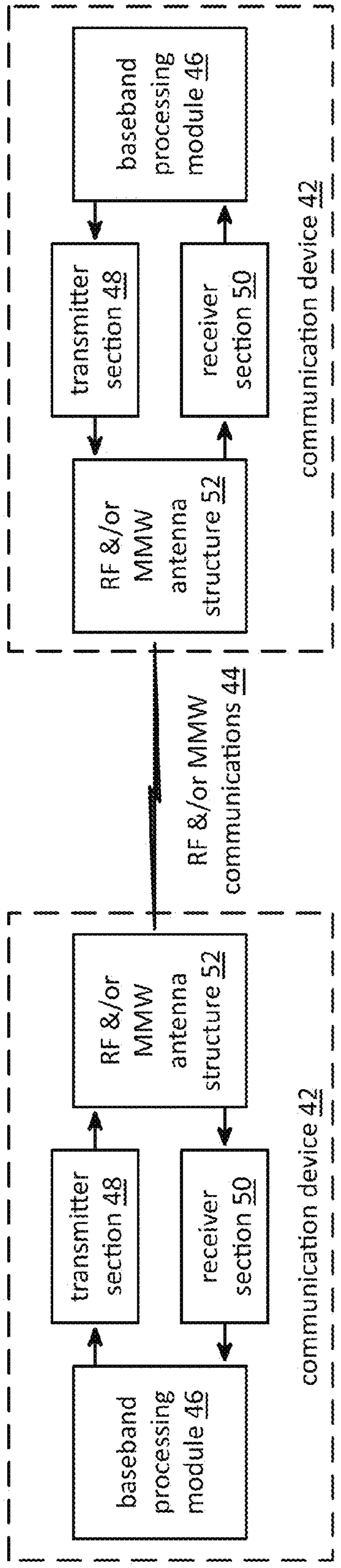
FIG. 16 is a schematic block diagram of an embodiment of communication devices in accordance with the present invention.

FIG. 16 is a schematic block diagram of an embodiment of communication devices 42 communicating via radio frequency (RF) and/or millimeter wave (MMW) communication mediums 44. Each of the communication devices 42 includes a baseband processing module 46, a transmitter section 48, a receiver section 50, and an RF &/or MMW antenna structure 52 (e.g., a wireless communication structure). The RF &/or MMW antenna structure 52 will be described in greater detail with reference to one or more of FIGS. 17-78. Note that a communication device 42 may be a cellular telephone, a wireless local area network (WLAN) client, a WLAN access point, a computer, a video game console, a location device, a radar device, and/or player unit, etc.

The baseband processing module 46 may be implemented via a processing module that may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 16-78.

In an example of operation, one of the communication devices 42 has data (e.g., voice, text, audio, video, graphics, etc.) to transmit to the other communication device 42. In this instance, the baseband processing module 46 receives the data (e.g., outbound data) and converts it into one or more outbound symbol streams in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the baseband processing module 46 converts the outbound data into a single outbound symbol stream for Single Input Single Output (SISO) communications and/or for Multiple Input Single Output (MISO) communications and converts the outbound data into multiple outbound symbol streams for Single Input Multiple Output (SIMO) and Multiple Input Multiple Output (MIMO) communications.

The transmitter section 48 converts the one or more outbound symbol streams into one or more outbound RF signals that has a carrier frequency within a given frequency band (e.g., 2.4 GHz, 5 GHz, 57-66 GHz, etc.). In an embodiment, this may be done by mixing the one or more outbound symbol streams with a local oscillation to produce one or more up-converted signals. One or more power amplifiers and/or power amplifier drivers amplifies the one or more up-converted signals, which may be RF bandpass filtered, to produce the one or more outbound RF signals. In another embodiment, the transmitter section 48 includes an oscillator that produces an oscillation. The outbound symbol stream(s) provides phase information (e.g., +/−$\Delta\theta$ [phase shift] and/or $\theta(t)$ [phase modulation]) that adjusts the phase of the oscillation to produce a phase adjusted RF signal(s), which is transmitted as the outbound RF signal(s). In another embodiment, the outbound symbol stream(s) includes amplitude information (e.g., $A(t)$ [amplitude modulation]), which is used to adjust the amplitude of the phase adjusted RF signal(s) to produce the outbound RF signal(s).

In yet another embodiment, the transmitter section 48 includes an oscillator that produces an oscillation(s). The outbound symbol stream(s) provides frequency information (e.g., +/−$\Delta f$ [frequency shift] and/or $f(t)$ [frequency modulation]) that adjusts the frequency of the oscillation to produce a frequency adjusted RF signal(s), which is transmitted as the outbound RF signal(s). In another embodiment, the outbound symbol stream(s) includes amplitude information, which is used to adjust the amplitude of the frequency adjusted RF signal(s) to produce the outbound RF signal(s). In a further embodiment, the transmitter section 48 includes an oscillator that produces an oscillation(s). The outbound symbol stream (s) provides amplitude information (e.g., +/−$\Delta A$ [amplitude shift] and/or $A(t)$ [amplitude modulation) that adjusts the amplitude of the oscillation(s) to produce the outbound RF signal(s).

The RF &/or MMW antenna structure 52 receives the one or more outbound RF signals and transmits it. The RF &/or MMW antenna structure 52 of the other communication devices 42 receives the one or more RF signals and provides it to the receiver section 50.

The receiver section 50 amplifies the one or more inbound RF signals to produce one or more amplified inbound RF signals. The receiver section 50 may then mix in-phase (I) and quadrature (Q) components of the amplified inbound RF signal(s) with in-phase and quadrature components of a local oscillation(s) to produce one or more sets of a mixed I signal and a mixed Q signal. Each of the mixed I and Q signals are combined to produce one or more inbound symbol streams. In this embodiment, each of the one or more inbound symbol streams may include phase information (e.g., +/−$\Delta\theta$ [phase shift] and/or $\theta(t)$ [phase modulation]) and/or frequency information (e.g., +/−$\Delta f$ [frequency shift] and/or $f(t)$ [frequency modulation]). In another embodiment and/or in furtherance of the preceding embodiment, the inbound RF signal(s) includes amplitude information (e.g., +/−$\Delta A$ [amplitude shift] and/or $A(t)$ [amplitude modulation]). To recover the amplitude information, the receiver section 50 includes an amplitude detector such as an envelope detector, a low pass filter, etc.

The baseband processing module 46 converts the one or more inbound symbol streams into inbound data (e.g., voice, text, audio, video, graphics, etc.) in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the baseband processing module converts a single inbound symbol stream into the inbound data for Single Input Single Output (SISO) communications and/or for Multiple Input Single Output (MISO) communications and converts the multiple inbound symbol streams into the inbound data for Single Input Multiple Output (SIMO) and Multiple Input Multiple Output (MIMO) communications.

Figure 17:
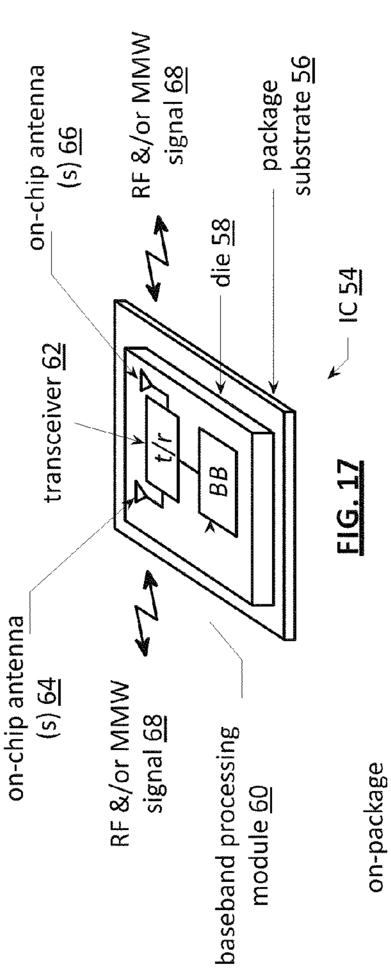
FIG. 17 is a diagram of an embodiment of a transceiver section of a communication device in accordance with the present invention.

FIG. 17 is a diagram of an embodiment of an integrated circuit (IC) 54 that includes a package substrate 56 and a die 58. The die 58 includes a baseband processing module 60, an RF transceiver 62, a local antenna structure 64, and a remote antenna structure 66. Such an IC 54 may be used in the communication devices 42 of FIG. 16 and/or for other wireless communication devices.

In an embodiment, the IC 54 supports local and remote communications, where local communications are of a very short range (e.g., less than 0.5 meters) and remote communications are of a longer range (e.g., greater than 1 meter). For example, local communications may be IC to IC communications, IC to board communications, and/or board to board communications within a device and remote communications may be cellular telephone communications, WLAN communications, Bluetooth piconet communications, walkie-talkie communications, etc. Further, the content of the remote communications may include graphics, digitized voice signals, digitized audio signals, digitized video signals, and/or outbound text signals.

Figure 18:
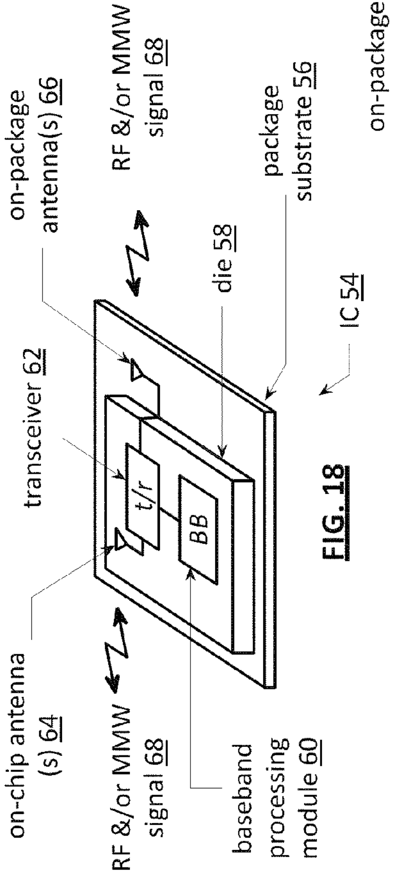
FIG. 18 is a diagram of another embodiment of a transceiver section of a communication device in accordance with the present invention.

FIG. 18 is a diagram of an embodiment of an integrated circuit (IC) 54 that includes a package substrate 56 and a die 58. This embodiment is similar to that of FIG. 17 except that the remote antenna structure 66 is on the package substrate 56. Accordingly, IC 54 includes a connection from the remote antenna structure 66 on the package substrate 56 to the RF transceiver 62 on the die 58.

Figure 19:
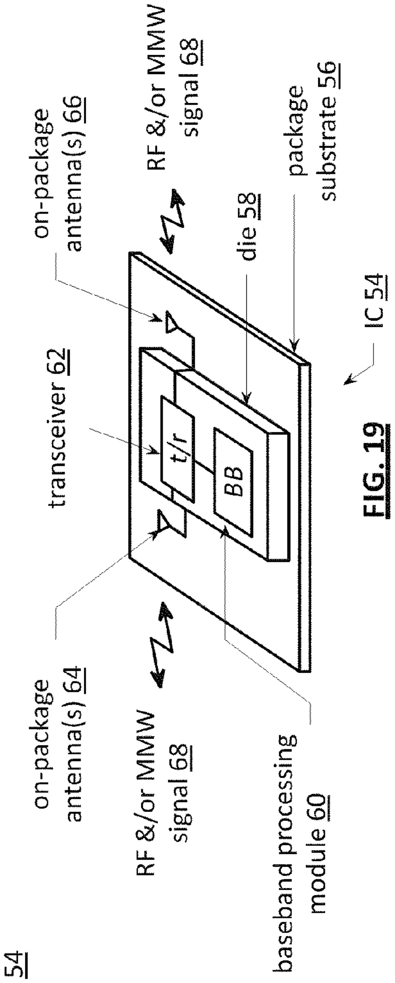
FIG. 19 is a diagram of another embodiment of a transceiver section of a communication device in accordance with the present invention.

FIG. 19 is a diagram of an embodiment of an integrated circuit (IC) 54 that includes a package substrate 56 and a die 58. This embodiment is similar to that of FIG. 17 except that both the local antenna structure 64 and the remote antenna structure 66 on the package substrate 56. Accordingly, IC 54 includes connections from the remote antenna structure 66 on the package substrate 56 to the RF transceiver 62 on the die 58 and form the local antenna structure 64 on the package substrate 56 to the RF transceiver 62 on the die 58.

Figure 20:
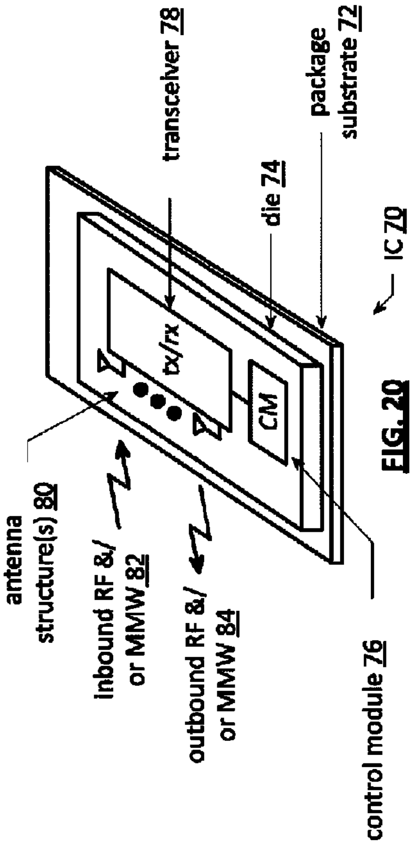
FIG. 20 is a diagram of another embodiment of a transceiver section of a communication device in accordance with the present invention.

FIG. 20 is a diagram of an embodiment of an integrated circuit (IC) 70 that includes a package substrate 72 and a die 74. The die 74 includes a control module 76, an RF transceiver 78, and a plurality of antenna structures 80. The control module 76 may be a single processing device or a plurality of processing devices (as previously defined). Note that the IC 70 may be used in the communication devices 42 of FIG. 16 and/or in other wireless communication devices.

In operation, the control module 76 configures one or more of the plurality of antenna structures 80 to provide the inbound RF signal 82 to the RF transceiver 78. In addition, the control module 76 configures one or more of the plurality of antenna structures 80 to receive the outbound RF signal 84 from the RF transceiver 78. In this embodiment, the plurality of antenna structures 80 is on the die 74. In an alternate embodiment, a first antenna structure of the plurality of antenna structures 80 is on the die 74 and a second antenna structure of the plurality of antenna structures 80 is on the package substrate 72. Note that an antenna structure of the plurality of antenna structures 80 may include one or more of an antenna, a transmission line, a transformer, and an impedance matching circuit.

The RF transceiver 78 converts the inbound RF signal 82 into an inbound symbol stream. In one embodiment, the inbound RF signal 82 has a carrier frequency in a frequency band of approximately 55 GHz to 64 GHz. In addition, the RF transceiver 78 converts an outbound symbol stream into the outbound RF signal, which has a carrier frequency in the frequency band of approximately 55 GHz to 64 GHz.

Figure 21:
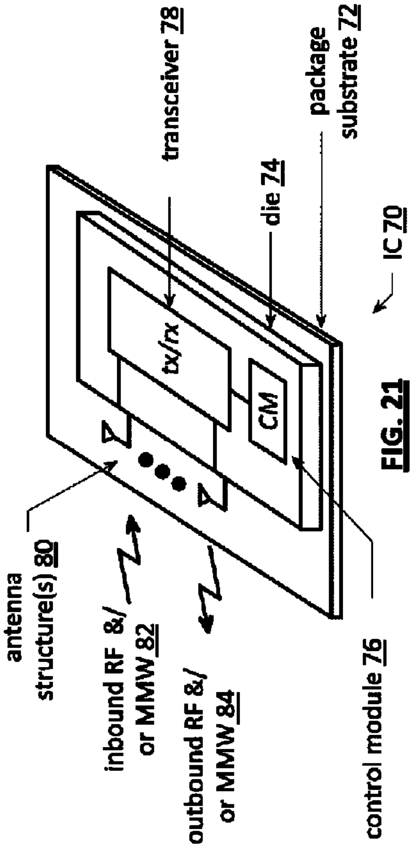
FIG. 21 is a diagram of another embodiment of a transceiver section of a communication device in accordance with the present invention.

FIG. 21 is a diagram of an embodiment of an integrated circuit (IC) 70 that includes a package substrate 72 and a die 74. This embodiment is similar to that of FIG. 20 except that the plurality of antenna structures 80 is on the package substrate 72. Accordingly, IC 70 includes a connection from the plurality of antenna structures 80 on the package substrate 72 to the RF transceiver 78 on the die 74.

Figure 22:
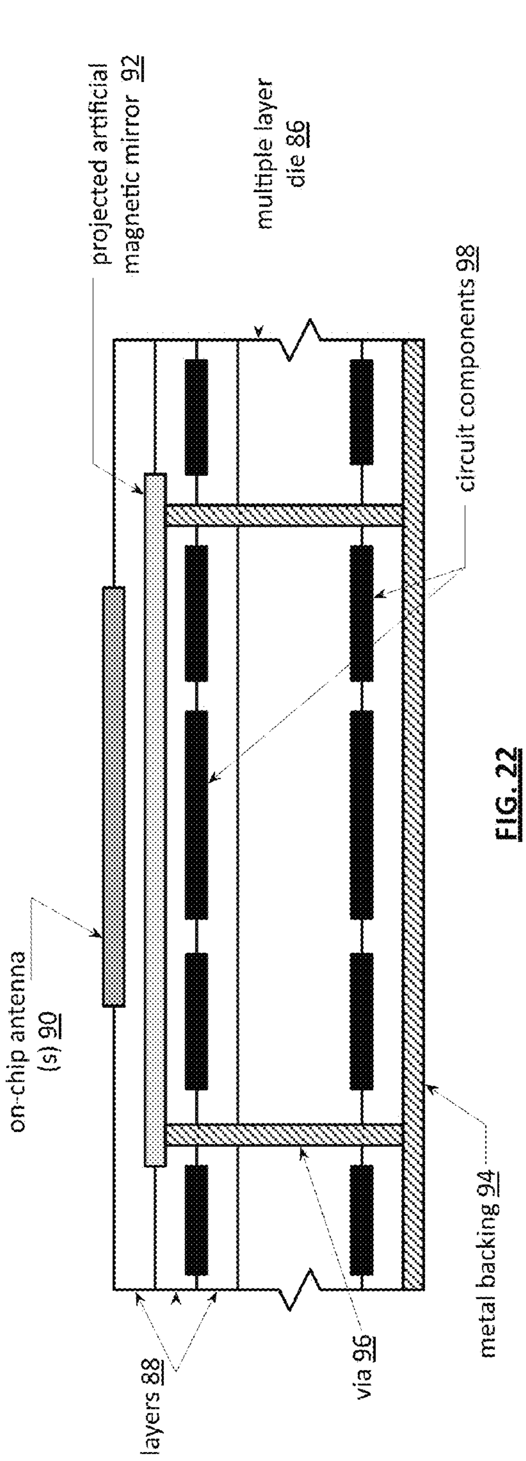
FIG. 22 is a diagram of an embodiment of an antenna structure in accordance with the present invention.

FIG. 22 is a diagram of an embodiment of an antenna structure 90 that is implemented on one or more layers 88 of a die 86 of an integrated circuit (IC). The die 86 includes a plurality of layers 88 and may be of a CMOS fabrication process, a Gallium Arsenide fabrication process, or other IC fabrication process. In this embodiment, one or more antennas 90 are fabricated as one or more metal traces of a particular length and shape based on the desired antenna properties (e.g., frequency band, bandwidth, impedance, quality factor, etc.) of the antenna(s) 90 on an outer layer of the die 86.

On an inner layer, which is a distance "d" from the layer supporting the antenna(s), a projected artificial magnetic minor (PAMM) 92 is fabricated. The PAMM 92 may be fabricated in one of a plurality of configurations as will be discussed in greater detail with reference to one or more of FIGS. 33-63. The PAMM 92 may be electrically coupled to a metal backing 94 (e.g., ground plane) of the die 86 by one or more vias 96. Alternatively, the PAMM 92 may be capacitively coupled to the metal backing 94 (i.e., is not directly coupled to the metal backing 94 by a via 96, but through the capacitive coupling of the metal elements of the PAMM 92 and the metal backing 94).

The PAMM 92 functions as an electric field reflector for the antenna(s) 90 within a given frequency band. In this manner, circuit components 98 (e.g., the baseband processor, the components of the transmitter section and receiver section, etc.) fabricated on other layers of the die 86 are substantially shielded from the RF and/or MMW energy of the antenna. In addition, the reflective nature of the PAMM 92 improves the gain of the antenna(s) 90 by 3 dB or more.

Figure 23:
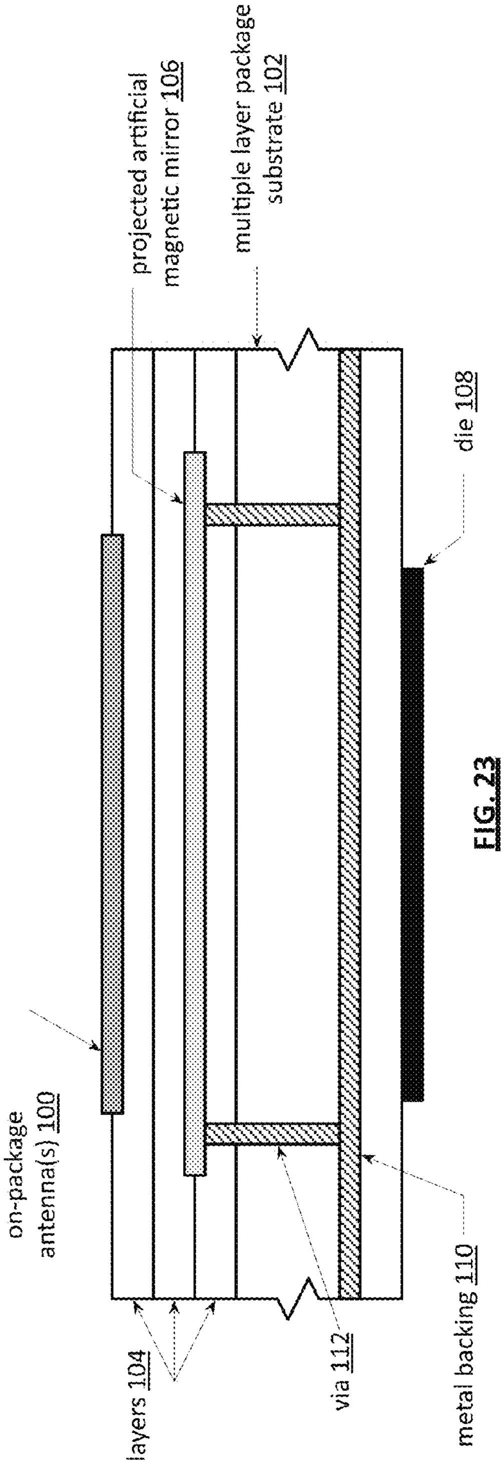
FIG. 23 is a diagram of an embodiment of an antenna structure in accordance with the present invention.

FIG. 23 is a diagram of an embodiment of an antenna structure 100 that is implemented on one or more layers of a package substrate 102 of an integrated circuit (IC). The package substrate 100 includes a plurality of layers 104 and may be a printed circuit board or other type of substrate. In this embodiment, one or more antennas 100 are fabricated as one or more metal traces of a particular length and shape based on the desired antenna properties of the antenna(s) 100 on an outer layer of the package substrate 102.

On an inner layer of the package substrate 100, a projected artificial magnetic minor (PAMM) 106 is fabricated. The PAMM 106 may be fabricated in one of a plurality of configurations as will be discussed in greater detail with reference to one or more of FIGS. 33-63. The PAMM 106 may be electrically coupled to a metal backing 110 (e.g., ground plane) of the die 108 by one or more vias 112. Alternatively, the PAMM 106 may be capacitively coupled to the metal backing 110.

Figure 24:
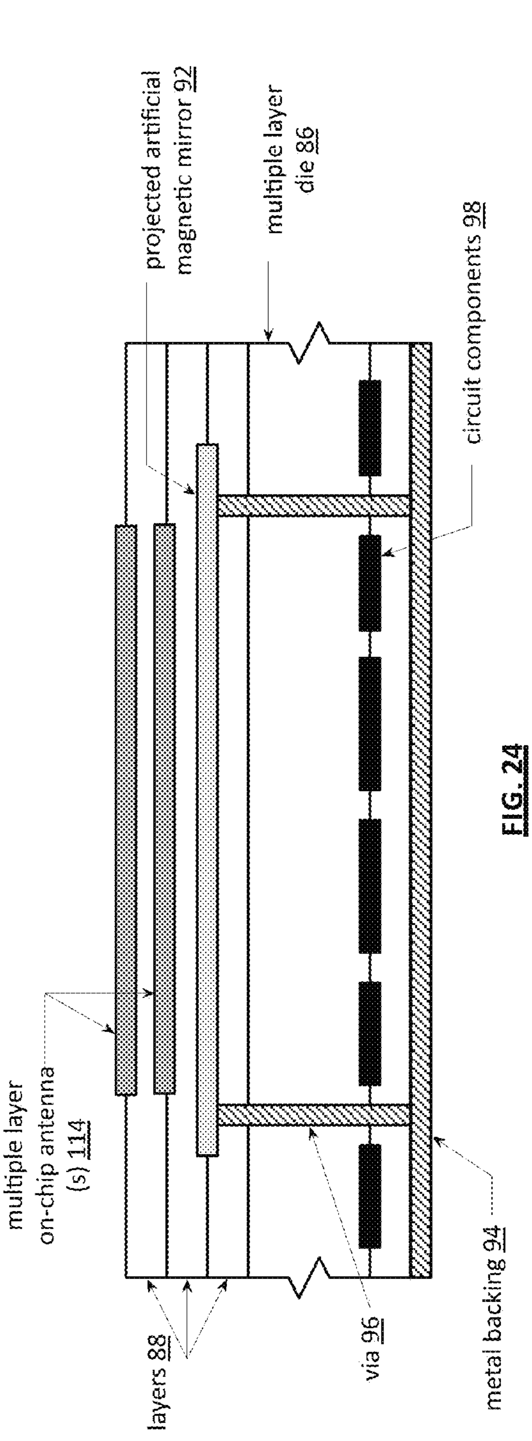
FIG. 24 is a diagram of an embodiment of an antenna structure accordance with the present invention.

FIG. 24 is a diagram of an embodiment of an antenna structure 114 that is similar to the antenna structure of FIG. 22 with the exception that the antenna(s) 114 are fabricated on two or more layers 88 of the die 86. The different layers of the antenna 114 may be coupled in a series manner and/or in a parallel manner to achieve the desired properties (e.g., frequency band, bandwidth, impedance, quality factor, etc.) of the antenna(s) 114.

Figure 25:
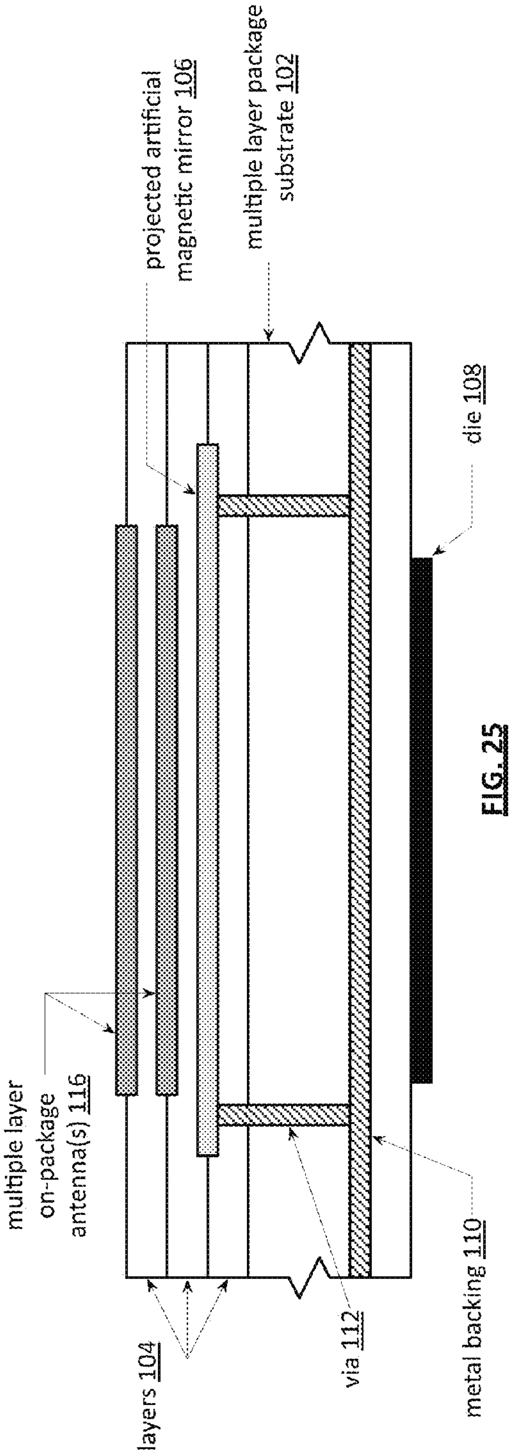
FIG. 25 is a diagram of an embodiment of an antenna structure in accordance with the present invention.

FIG. 25 is a diagram of an embodiment of an antenna structure 116 that is similar to the antenna structure of FIG. 23 with the exception that the antenna(s) 116 are fabricated on two or more layers 104 of the package substrate 102. The different layers of the antenna 116 may be coupled in a series manner and/or in a parallel manner to achieve the desired properties (e.g., frequency band, bandwidth, impedance, quality factor, etc.) of the antenna(s) 116.

Figure 26:
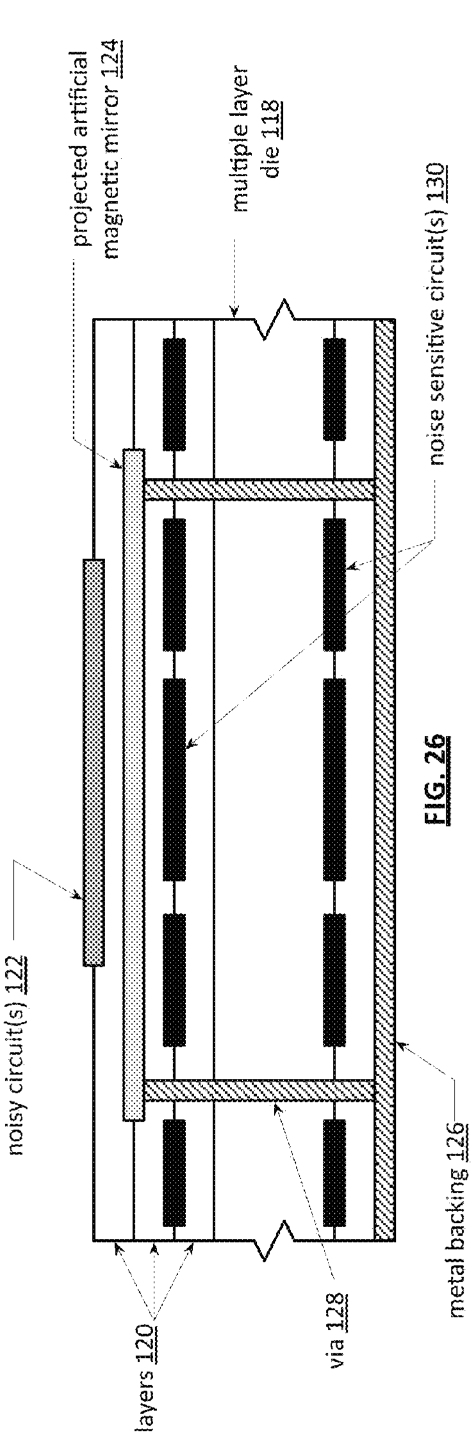
FIG. 26 is a diagram of an embodiment of an isolation structure in accordance with the present invention.

FIG. 26 is a diagram of an embodiment of an isolation structure fabricated on a die 118 of an integrated circuit (IC). The die 118 includes a plurality of layers 120 and may be of a CMOS fabrication process, a Gallium Arsenide fabrication process, or other IC fabrication process. In this embodiment, one or more noisy circuits 122 are fabricated on an outer layer of the die 118. Such noisy circuits 122 include, but are not limited to, digital circuits, logic gates, memory, processing cores, etc.

On an inner layer, which is a distance "d" from the layer supporting the noisy circuits 122, a projected artificial magnetic mirror (PAMM) 124 is fabricated. The PAMM 124 may be fabricated in one of a plurality of configurations as will be discussed in greater detail with reference to one or more of FIGS. 33-63. The PAMM 124 may be electrically coupled to a metal backing 126 (e.g., ground plane) of the die 118 by one or more vias 128. Alternatively, the PAMM 124 may be capacitively coupled to the metal backing 126 (i.e., is not directly coupled to the metal backing 126 by a via 128, but through the capacitive coupling of the metal elements of the PAMM 124 and the metal backing 126).

The PAMM 124 functions as an electric field reflector for the noisy circuits 122 within a given frequency band. In this manner, noise sensitive circuit components 130 (e.g., analog circuits, amplifiers, etc.) fabricated on other layers of the die 118 are substantially shielded from the in-band RF and/or MMW energy of the noisy circuits 130.

Figure 27:
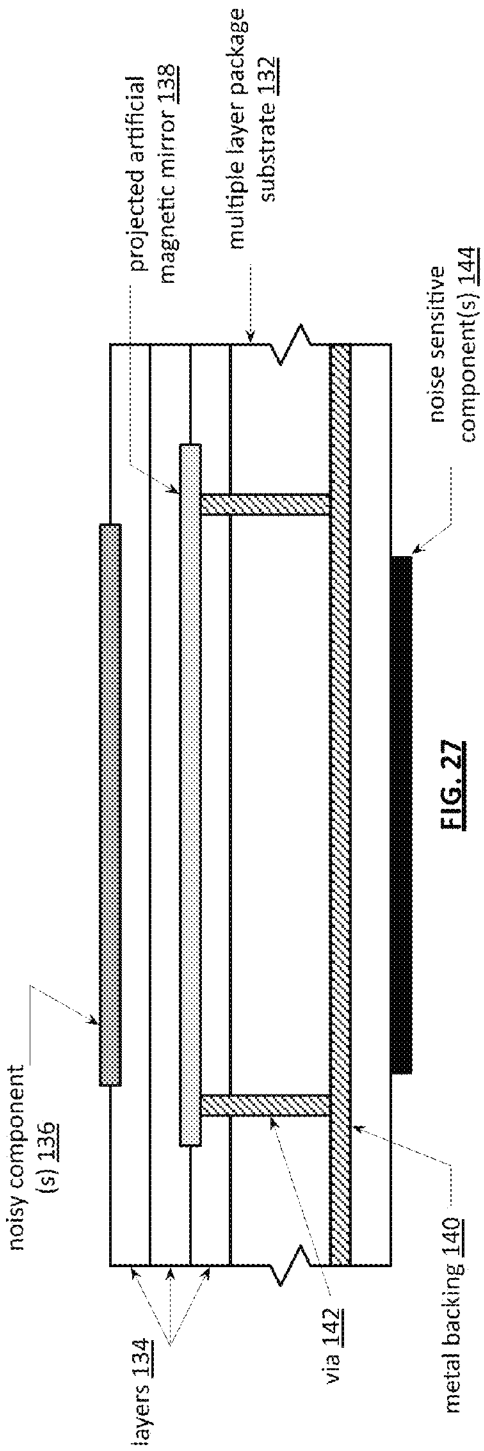
FIG. 27 is a diagram of an embodiment of an isolation structure in accordance with the present invention.

FIG. 27 is a diagram of an embodiment of an isolation structure that is implemented on one or more layers of a package substrate 132 of an integrated circuit (IC). The package substrate 132 includes a plurality of layers 134 and may be a printed circuit board or other type of substrate. In this embodiment, one or more noisy circuits 136 are fabricated on an outer layer of the package substrate 132.

On an inner layer of the package substrate 132, a projected artificial magnetic minor (PAMM) 138 is fabricated. The PAMM 138 may be fabricated in one of a plurality of configurations as will be discussed in greater detail with reference to one or more of FIGS. 33-63. The PAMM 138 may be electrically coupled to a metal backing 140 (e.g., ground plane) of the die 132 by one or more vias 142. Alternatively, the PAMM 138 may be capacitively coupled to the metal backing 140 and provides shielding for the noise sensitive components 144 from in-band RF and/or MMW energy of the noisy circuits 144.

Figure 28:
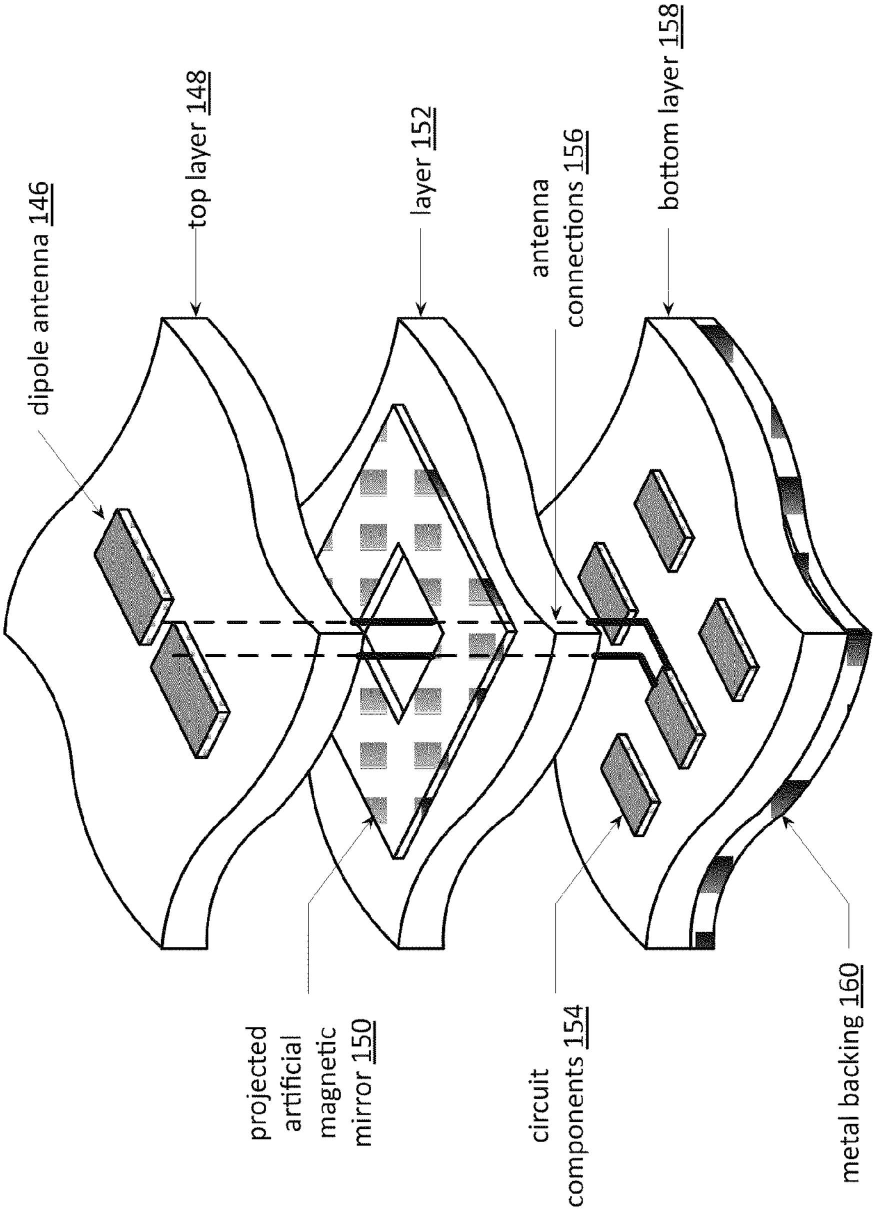
FIG. 28 is a perspective diagram of an embodiment of an antenna structure in accordance with the present invention.

FIG. 28 is a perspective diagram of an embodiment of an antenna structure coupled to one or more circuit components. The antenna structure includes a dipole antenna 146 fabricated on an outer layer 148 of a die and/or package substrate and a projected artificial magnetic mirror (PAMM) 150 fabricated on an inner layer 152 of the die and/or package substrate. The circuit components 154 are fabricated on one or more layers of the die and/or package substrate, which may be the bottom layer 158. A metal backing 160 is fabricated on the bottom layer 158. While not shown, the antenna structure may further include a transmission line and an impedance matching circuit.

The projected artificial magnetic minor (PAMM) 150 includes at least one opening to allow one or more antenna connections 156 to pass there-through, thus enabling electrical connection of the antenna to one or more of the circuit components 154 (e.g., a power amplifier, a low noise amplifier, a transmit/receive switch, an circulator, etc.). The connections may be metal vias that may or may not be insulated.

Figure 29:
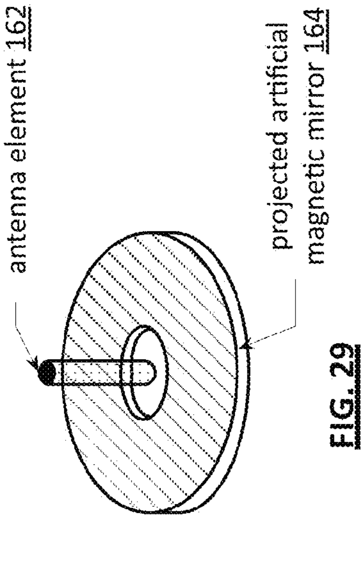
FIG. 29 is a diagram of an embodiment of an antenna structure in accordance with the present invention.

FIG. 29 is a diagram of an embodiment of an antenna structure on a die and/or on a package substrate. The antenna structure includes an antenna element 162, a projected artificial magnetic minor (PAMM) 164, and a transmission line. In this embodiment, the antenna element 162 is vertically positioned with respect to the PAMM 164 and has a length of approximately ¼ wavelength of the RF and/or MMW signals it transceives. The PAMM 164 may be circular shaped, elliptical shaped, rectangular shaped, or any other shape to provide an effective ground for the antenna element 162. The PAMM 162 includes an opening to enable the transmission line to be coupled to the antenna element 162.

Figure 30:
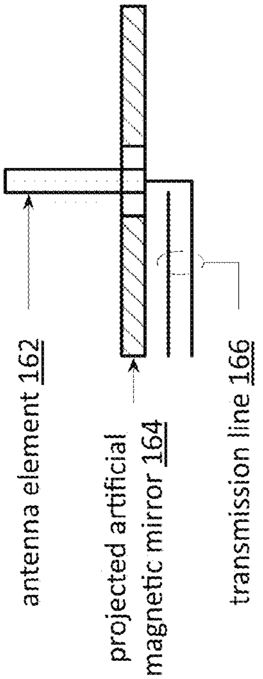
FIG. 30 is a diagram of an embodiment of an antenna structure in accordance with the present invention.

FIG. 30 is a cross sectional diagram of the embodiment of an antenna structure of FIG. 29. The antenna structure includes the antenna element 162, the PAMM 164, and the transmission line 166. In this embodiment, the antenna element 162 is vertically positioned with respect to the PAMM 164 and has a length of approximately ¼ wavelength of the RF and/or MMW signals it transceives. As shown, the PAMM 164 includes an opening to enable the transmission line to be coupled to the antenna element 162.

Figure 31:
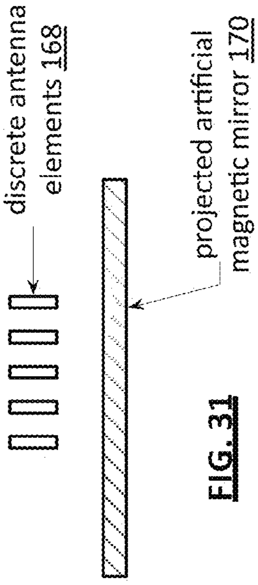
FIG. 31 is a diagram of an embodiment of an antenna structure in accordance with the present invention.

FIG. 31 is a diagram of an embodiment of an antenna structure on a die and/or on a package substrate. The antenna structure includes a plurality of discrete antenna elements 168, a projected artificial magnetic mirror (PAMM) 170, and a transmission line. In this embodiment, the plurality of discrete antenna elements 168 includes a plurality of infinitesimal antennas (i.e., have a length <=1/50 wavelength) or a plurality of small antennas (i.e., have a length <=1/10 wavelength) to provide a discrete antenna structure, which functions similarly to a continuous horizontal dipole antenna. The PAMM 170 may be circular shaped, elliptical shaped, rectangular shaped, or any other shape to provide an effective ground for the plurality of discrete antenna elements 168.

Figure 32:
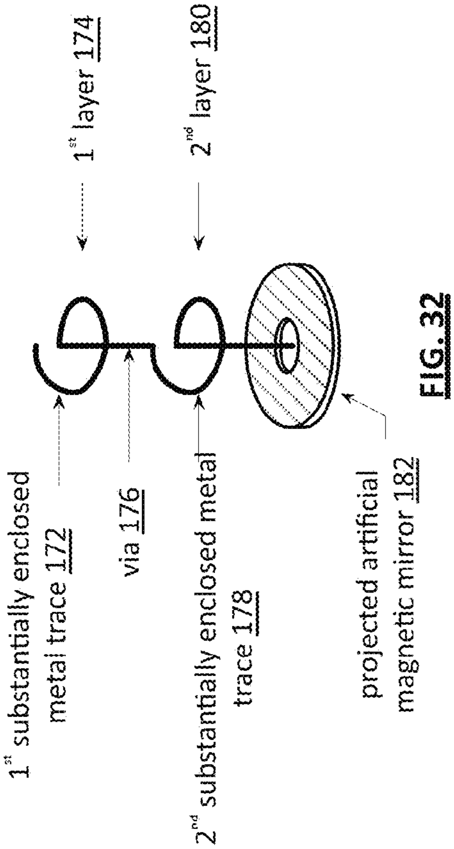
FIG. 32 is a diagram of an embodiment of an antenna structure in accordance with the present invention.

FIG. 32 is a diagram of an embodiment of an antenna structure on a die and/or on a package substrate. The antenna structure includes an antenna element, a projected artificial magnetic minor (PAMM) 182, and a transmission line. In this embodiment, the antenna element includes a plurality of substantially enclosed metal traces and vias. The substantially enclosed metal traces may have a circular shape, an elliptical shape, a square shape, a rectangular shape and/or any other shape.

In one embodiment, a first substantially enclosed metal trace 172 is on a first metal layer 174, a second substantially enclosed metal trace 178 is on a second metal layer 180, and a via 176 couples the first substantially enclosed metal trace 172 to the second substantially enclosed metal trace 178 to provide a helical antenna structure. The PAMM 182 may be circular shaped, elliptical shaped, rectangular shaped, or any other shape to provide an effective ground for the antenna element. The PAMM 182 includes an opening to enable the transmission line to be coupled to the antenna element.

FIGS. 33-51 illustrate various embodiments and/or aspects of a projected artificial magnetic mirror (PAMM), which will be subsequently discussed. In general, a PAMM 184 includes a plurality of conductive coils, a metal backing and a dielectric material. The plurality of conductive coils is arranged in an array (e.g., circular, rectangular, etc.) on a first layer of a substrate (e.g., printed circuit board, integrated circuit (IC) package substrate, and/or an IC die). The metal backing is on a second layer of the substrate. The dielectric material (e.g., material of a printed circuit board, non-metal layer of an IC, etc.) is between the first and second layers of the substrate. For instance, the plurality of conductive coils may be on an inner layer of the substrate and the metal backing is on an outer layer with respect to the conductive coil layer.

The conductive coils are electrically coupled to the metal backing by a via (e.g., a direct electrical connection) or by a capacitive coupling. As coupled, the conductive coils and the metal backing 190 form an inductive-capacitive network that substantially reduces surface waves of a given frequency band along a third layer of the substrate. Note that the first layer is between the second and third layers. In this manner, the PAMM provides an effective magnetic mirror at the third layer such that circuit elements (e.g., inductor, filter, antenna, etc.) on the third layer are electromagnetically isolated from electromagnetic signals on the other side of the conductive coil layer. In addition, electromagnetic signals on the side of the conductive coil layer are minor back to the circuit elements on the third layer such that they are additive or subtractive (depending on distance and frequency) to the electromagnetic signal received and/or generated by the circuit element.

The size, shape, and distance "d" between the first, second, and third layers effect the magnetic mirroring properties of the PAMM 184. For example, a conductive coil may have a shape that includes at least one of be circular, square, rectangular, hexagon, octagon, and elliptical and a pattern that includes at least one of interconnecting branches, an $n^{th}$ order Peano curve, and an $n^{th}$ order Hilbert curve. Each of the conductive coils may have the same shape, the same pattern, different shapes, different patterns, and/or programmable sizes and/or shapes. For example, a first conductive includes a first size, a first shape, and a first pattern and a second conductive coil includes a second size, a second shape, and a second pattern. As a specific example, a conductive coil may have a length that is less than or equal to ½ wavelength of a maximum frequency of the given frequency band.

Figure 33:
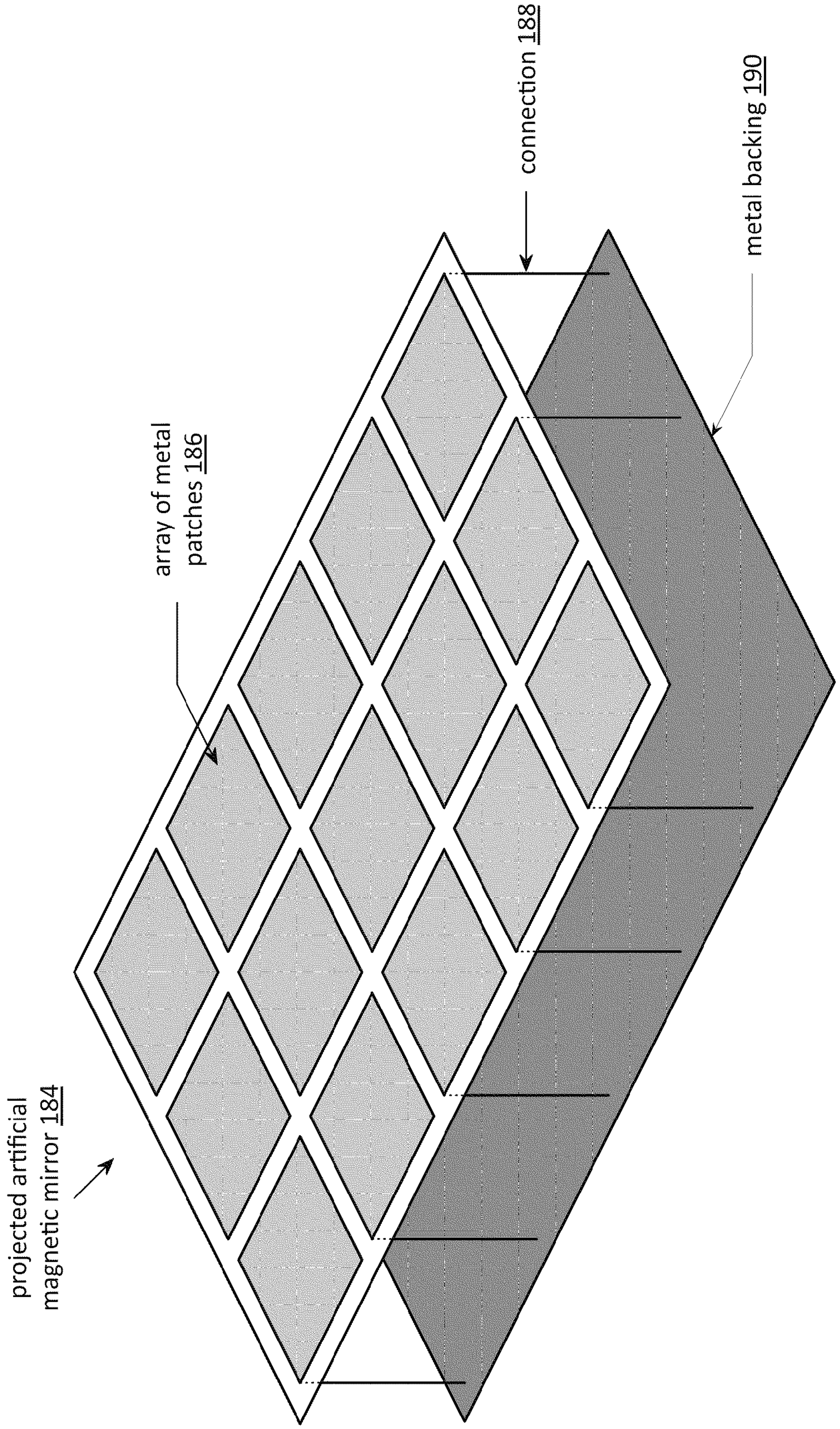
FIG. 33 is a diagram of an embodiment of a projected artificial magnetic mirror in accordance with the present invention.

FIG. 33 is a diagram of an embodiment of a projected artificial magnetic mirror 184 on a single layer that includes a plurality of metal patches 186. Each of the metal patches is substantially of the same shape, substantially of the same pattern, and substantially of the same size. The shape may be circular, square, rectangular, hexagon, octagon, elliptical, etc.; and the pattern may be a plate, a pattern with interconnecting branches, an $n^{th}$ order Peano curve, or an $n^{th}$ order Hilbert curve.

A metal patch may be coupled to the metal backing 190 by one or more connectors 188 (e.g., vias). Alternatively, a metal patch may be capacitively coupled to the metal backing 190 (e.g., no vias).

The plurality of metal patches 186 is arranged in an array (e.g., 3×5 as shown). The array may be of a different size and shape. For example, the array may be a square of n-by-n metal patches, where n is 2 or more. As another example, the array may be a series of concentric rings of increasing size and number of metal patches. As yet another example, the array may be of a triangular shape, hexagonal shape, octagonal shape, etc.

Figure 34:
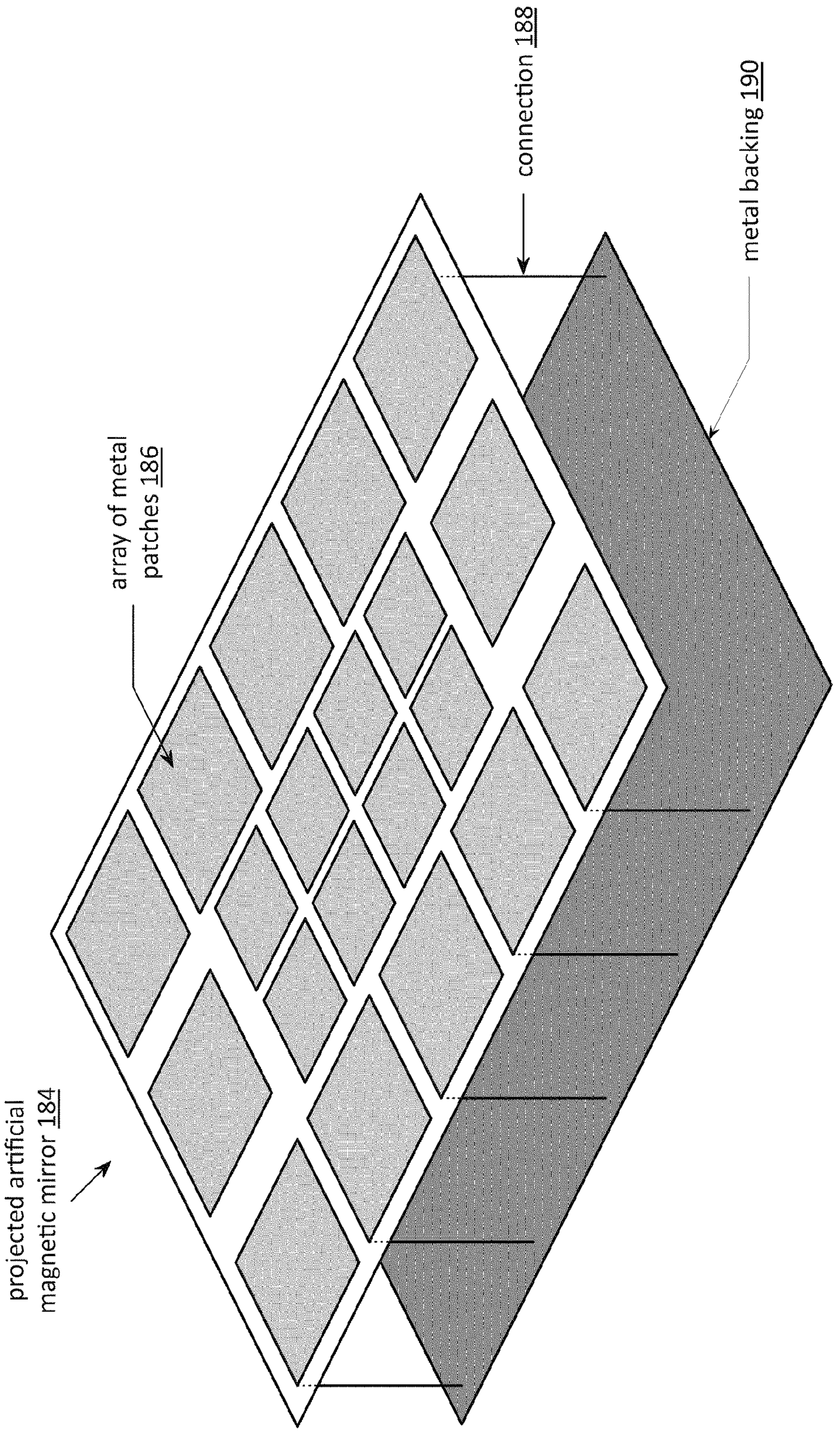
FIG. 34 is a diagram of an embodiment of a projected artificial magnetic mirror in accordance with the present invention.

FIG. 34 is a diagram of an embodiment of a projected artificial magnetic mirror 184 on a single layer that includes a plurality of metal patches 186. The metal patches 186 are substantially of the same shape, substantially of the same pattern, but of different sizes. The shape may be circular, square, rectangular, hexagon, octagon, elliptical, etc.; and the pattern may be a plate, a pattern with interconnecting branches, an $n^{th}$ order Peano curve, or an $n^{th}$ order Hilbert curve.

A metal patch may be coupled to the metal backing 190 by one or more connectors 188 (e.g., vias). Alternatively, a metal patch may be capacitively coupled to the metal backing 190 (e.g., no vias).

The plurality of metal patches 186 is arranged in an array and the different sized metal patches may be in various positions. For example, the larger sized metal patches may be on the outside of the array and the smaller sized metal patches may be on the inside of the array. As another example, the larger and smaller metal patches may be interspersed amongst each other. While two sizes of metal patches are shown, more sizes may be used.

Figure 35:
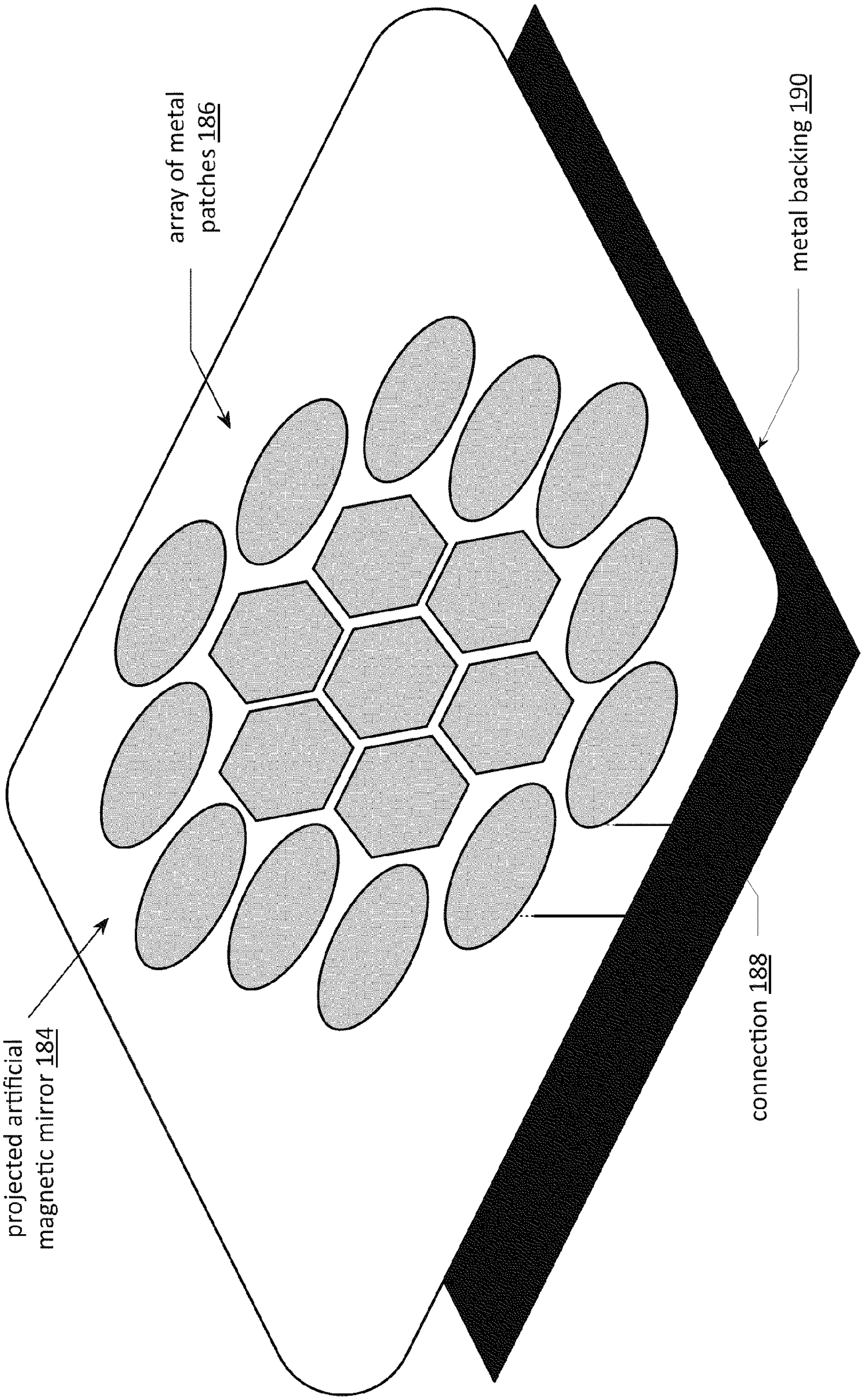
FIG. 35 is a diagram of an embodiment of a projected artificial magnetic mirror in accordance with the present invention.

FIG. 35 is a diagram of an embodiment of a projected artificial magnetic mirror 184 on a single layer that includes a plurality of metal patches 186. The metal patches are of different shapes, substantially of the same pattern, and substantially of the same size. The shapes may be circular, square, rectangular, hexagon, octagon, elliptical, etc.; and the pattern may be a plate, a pattern with interconnecting branches, an $n^{th}$ order Peano curve, or an $n^{th}$ order Hilbert curve.

A metal patch may be coupled to the metal backing 190 by one or more connectors 188 (e.g., vias). Alternatively, a metal patch may be capacitively coupled to the metal backing 190 (e.g., no vias).

The plurality of metal patches 186 is arranged in an array and the different shaped metal patches may be in various positions. For example, the one type of shaped metal patches may be on the outside of the array and another type of shaped metal patches may be on the inside of the array. As another example, the different shaped metal patches may be interspersed amongst each other. While two different shapes of metal patches are shown, more shapes may be used.

Figure 36:
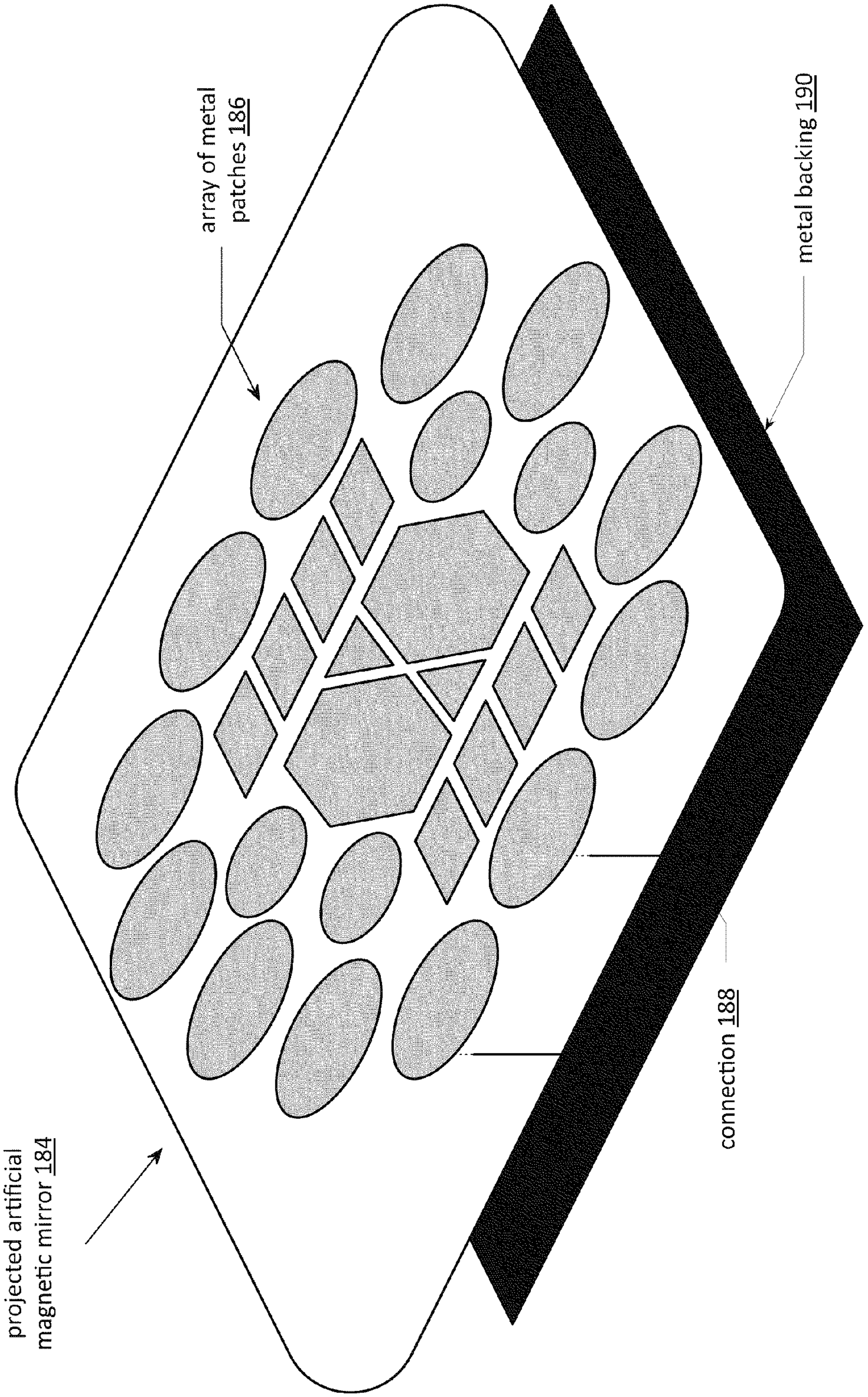
FIG. 36 is a diagram of an embodiment of a projected artificial magnetic mirror in accordance with the present invention.

FIG. 36 is a diagram of an embodiment of a projected artificial magnetic mirror 184 on a single layer that includes a plurality of metal patches 186. The metal patches are of different shapes, substantially of the same pattern, and of different sizes. The shapes may be circular, square, rectangular, hexagon, octagon, elliptical, etc.; and the pattern may be a plate, a pattern with interconnecting branches, an $n^{th}$ order Peano curve, or an $n^{th}$ order Hilbert curve.

A metal patch may be coupled to the metal backing 190 by one or more connectors 188 (e.g., vias). Alternatively, a metal patch may be capacitively coupled to the metal backing 190 (e.g., no vias).

The plurality of metal patches 186 is arranged in an array and the different shaped and sized metal patches may be in various positions. For example, the one type of shaped and sized metal patches may be on the outside of the array and another type of shaped metal patches may be on the inside of the array. As another example, a different shaped and sized metal patches may be interspersed amongst each other.

As another alternative of the projected artificial magnetic mirror (PAMM) 184, the pattern of the metal patches may be varied. As such, the size, shape, and pattern of the metal traces may be varied to achieve desired properties of the PAMM 184.

Figure 37:
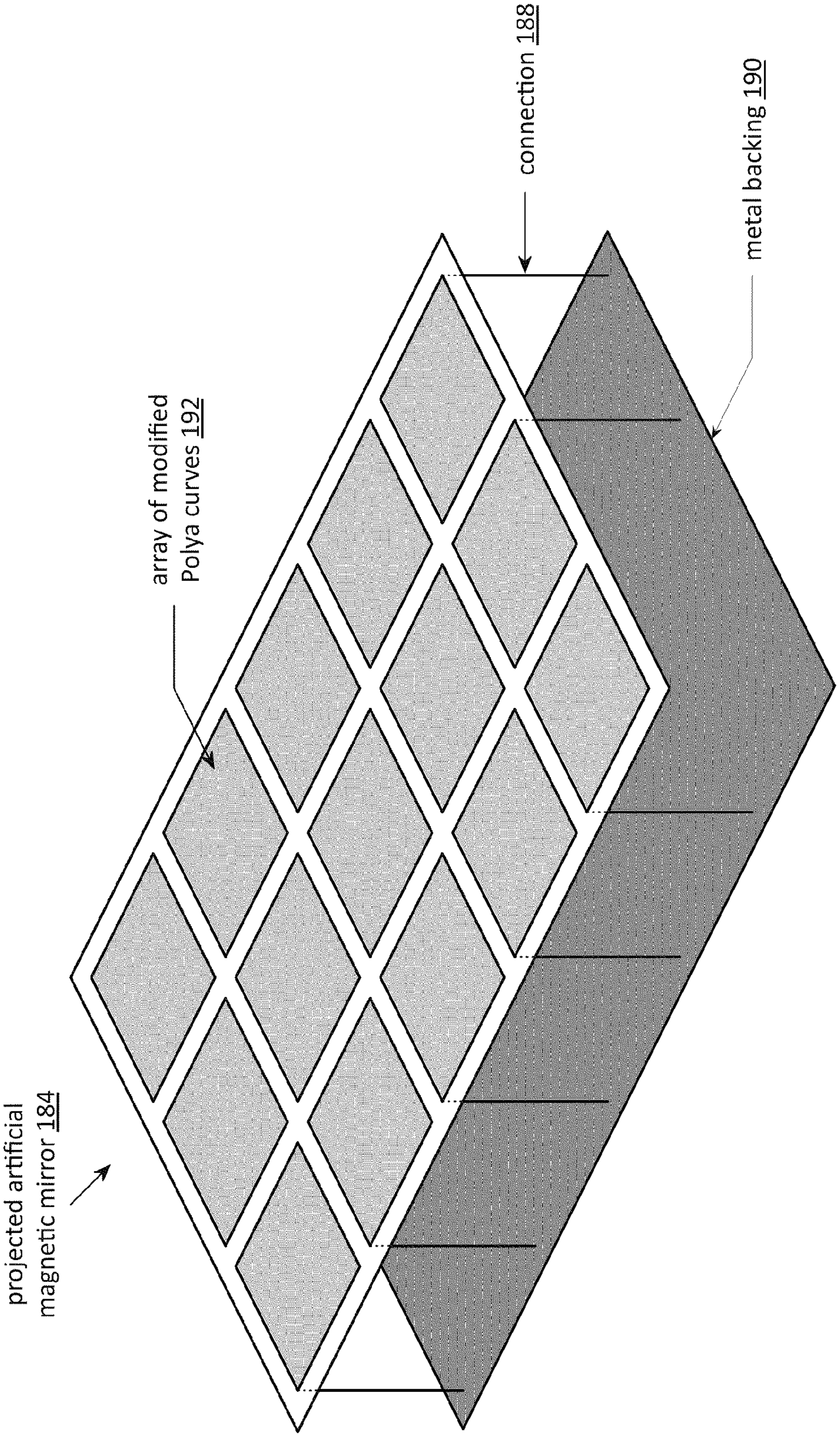
FIG. 37 is a diagram of an embodiment of a projected artificial magnetic mirror in accordance with the present invention.

FIG. 37 is a diagram of an embodiment of a projected artificial magnetic mirror 184 on a single layer that includes a plurality of metal patches 192. The metal patches are of substantially the same size, substantially of the same modified Polya curve pattern, and substantially of the same size. The shapes may be circular, square, rectangular, hexagon, octagon, elliptical, etc.; and the pattern may be a plate, a pattern with interconnecting branches, an $n^{th}$ order Peano curve, or an $n^{th}$ order Hilbert curve.

A metal patch may be coupled to the metal backing 190 by one or more connectors 188 (e.g., vias). Alternatively, a metal patch may be capacitively coupled to the metal backing 190 (e.g., no vias).

The plurality of metal patches 192 is arranged in an array (e.g., 3×5 as shown). The array may be of a different size and shape. For example, the array may be a square of n-by-n metal patches, where n is 2 or more. As another example, the array may be a series of concentric rings of increasing size and number of metal patches. As yet another example, the array may be of a triangular shape, hexagonal shape, octagonal shape, etc.

As alternatives, the size and/or shape of the metal traces may be different to achieve desired properties of the PAMM 184. As another alternative, the order, width, and/or scaling factor (s) of the modified Polya curve may be varied from one metal patch to another to achieve the desired PAMM 184 properties.

Figure 38A:
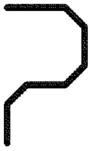
Figure 38B:
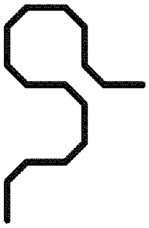
Figure 38C:
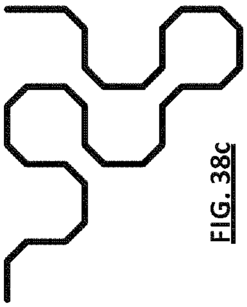
Figure 38D:
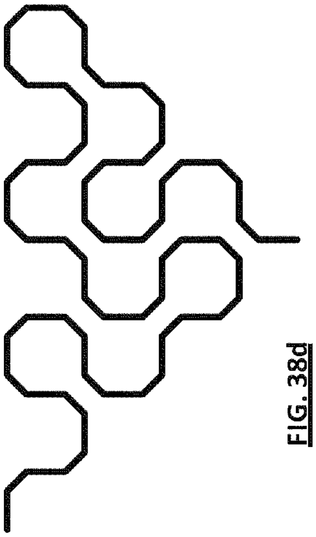
Figure 38E:
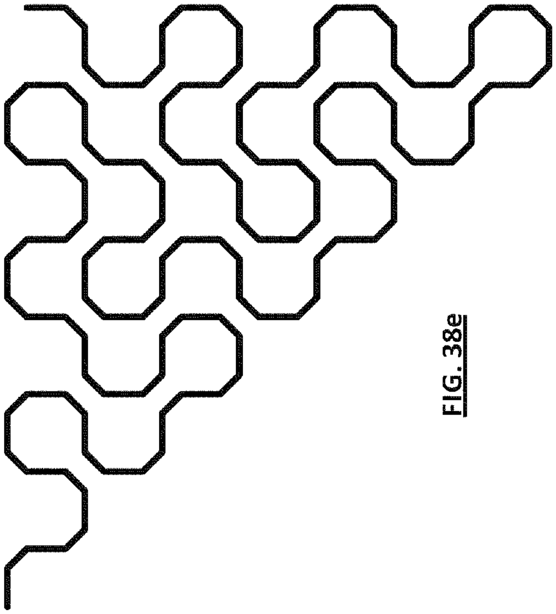

FIGS. 38*a*-38*e* are diagrams of embodiments of an MPC (modified Polya curve) metal trace having a constant width (w) and shaping factor (s) and varying order (n). In particular, FIG. 38*a* illustrates a MPC metal trace having a second order; FIG. 38*b* illustrates a MPC metal trace having a third order; FIG. 38*c* illustrates a MPC metal trace having a fourth order; FIG. 38*d* illustrates a MPC metal trace having a fifth order; and FIG. 38*e* illustrates a MPC metal trace having a sixth order. Note that higher order MPC metal traces may be used within the polygonal shape to provide the antenna structure.

FIGS. 39*a*-39*c* are diagrams of embodiments of an MPC (modified Polya curve) metal trace having a constant width (w) and order (n) and a varying shaping factor (s). In particular, FIG. 39*a* illustrates a MPC metal trace having a 0.15 shaping factor; FIG. 39*b* illustrates a MPC metal trace having a 0.25 shaping factor; and FIG. 39*c* illustrates a MPC metal trace having a 0.5 shaping factor. Note that MPC metal trace may have other shaping factors to provide the antenna structure.

FIGS. 40*a* and 40*b* are diagrams of embodiments of an MPC (modified Polya curve) metal trace. In FIG. 40*a*, the MPC metal trace is confined in an orthogonal triangle shape and includes two elements: the shorter angular straight line and the curved line. In this implementation, the antenna structure is operable in two or more frequency bands. For example, the antenna structure may be operable in the 2.4 GHz frequency band and the 5.5 GHz frequency band.

FIG. 40*b* illustrates an optimization of the antenna structure of FIG. 40*a*. In this diagram, the straight-line trace includes an extension metal trace 194 and the curved line is shortened. In particular, the extension trace 194 and/or the shortening of the curved trace tune the properties of the antenna structure (e.g., frequency band, bandwidth, gain, etc.).

Figure 41A:
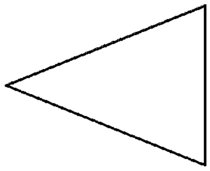
Figure 41B:
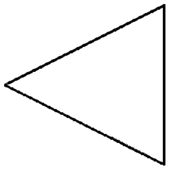
Figure 41C:
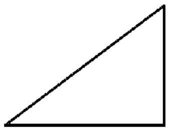
Figure 41D:
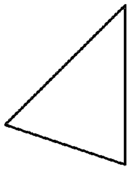
Figure 41E:
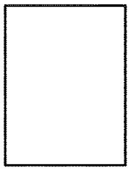
Figure 41F:
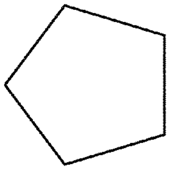
Figure 41G:
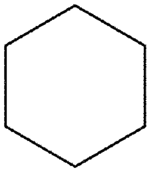
Figure 41H:
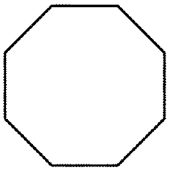

FIGS. 41*a*-41*h* are diagrams of embodiments of polygonal shapes in which the modified Polya curve (MPC) trace may be confined. In particular, FIG. 41*a* illustrates an Isosceles triangle; FIG. 41*b* illustrates an equilateral triangle; FIG. 41*c* illustrates an orthogonal triangle; FIG. 41*d* illustrates an arbitrary triangle; FIG. 41*e* illustrates a rectangle; FIG. 41*f* illustrates a pentagon; FIG. 41*g* illustrates a hexagon; and FIG. 41*h* illustrates an octagon. Note that other geometric shapes may be used to confine the MPC metal trace (for example, a circle, an ellipse, etc.).

FIG. 42 is a diagram of an example of programmable metal patch that can be programmed to have one or more modified Polya curves. The programmable metal patch includes a plurality of smaller metal patches arranged in an x-by-y matrix. Switching units positioned throughout the matrix receive control signals from a control module to couple the smaller metal patches together to achieve a desired modified Polya curve. Note that the smaller metal patches may be a continuous plate, a pattern with interconnecting branches, an $n^{th}$ order Peano curve, or an $n^{th}$ order Hilbert curve.

In the present example, the programmable metal patch is configured to have a third order modified Polya curve metal trace and a fourth order modified Polya curve metal trace. The configured metal traces may be separate traces or coupled together. Note that the programmable metal patch may be configured into other patterns (e.g., the continuous plate, a pattern with interconnecting branches, an $n^{th}$ order Peano curve, or an $n^{th}$ order Hilbert curve, etc.)

FIG. 43 is a diagram of an embodiment of an antenna having a projected artificial magnetic mirror (PAMM) having modified Polya curve traces. The PAMM includes a 5-by-3 array of metal patches having a modified Polya curve pattern 196, of substantially the same size, and of substantially the same shape. The antenna is a dipole antenna 198 of a size and shape for operation in the 60 GHz frequency band.

The radiating elements of the dipole antenna 198 are positioned over the PAMM 196 such that one or more connections can pass through the PAMM 196 to couple the dipole antenna 198 to circuit elements on the other side of the PAMM 196. In this example, the dipole antenna 198 is fabricated on an outside layer of a die and/or package substrate and the PAMM 196 is fabricated on an inner layer of the die and/or package substrate. The metal backing of the PAMM (not shown) is on a lower layer with respect to the array of metal patches.

FIG. 44 is a diagram of another embodiment of a projected artificial magnetic mirror 184 on a single layer that includes a plurality of coils 200. Each of the coils is substantially of the same size, shape, length, and number of turns. The shape may be circular, square, rectangular, hexagon, octagon, elliptical, etc. Note that a coil may be coupled to the metal backing 190 by one or more connectors 188 (e.g., vias). Alternatively, a coil may be capacitively coupled to the metal backing 190 (e.g., no vias). In a specific embodiment, the length of a coil may be less than or equal to ½ wavelength of the desired frequency band of the PAMM 184 (i.e., the frequency band in which surface waves and currents do not propagate and the tangential magnetic is small).

The plurality of coils 200 is arranged in an array (e.g., 3×5 as shown). The array may be of a different size and shape. For example, the array may be a square of n-by-n coils, where n is 2 or more. As another example, the array may be a series of concentric rings of increasing size and number of coils. As yet another example, the array may be of a triangular shape, hexagonal shape, octagonal shape, etc.

FIG. 45 is a cross sectional diagram of an embodiment of a projected artificial magnetic minor that includes a plurality of coils 202, the metal backing 204, and one or more dielectrics 206. Each of the coils is coupled to the metal backing 204 by one or more vias and is a distance "d" from the metal backing 204. The one or more dielectrics 206 are positioned between the metal backing 204 and the coils 202. The dielectric 206 may be a dielectric layer of a die and/or of a package substrate. Alternatively, the dielectric 206 may be injected between the metal backing 204 and the coils 202. While FIG. 45 references the coils 202 for forming a projected artificial magnetic mirror (PAMM), the cross-sectional view is applicable to any of the other embodiments of the PAMM previously discussed or to be subsequently discussed.

FIG. 46 is a schematic block diagram of the embodiment of the projected artificial magnetic mirror of FIG. 45. In this diagram, each coil is represented as an inductor and the capacitance between the coils 202 is represented as capacitors whose capacitance is based on the distance "d" between the coils and the metal backing, the distance between the coils, the size of the coils, and the properties of the dielectric 206.

The connection from a coil to the metal backing may be done at a tap of the inductor, which may be positioned at one or more locations on the coil.

As illustrated, the PAMM is a distributed inductor-capacitor network that can be configured to achieve the various frequency responses shown in one or more of FIGS. 1-15. For instance, the size of the coils may be varied to achieve a desired inductance. Further, the distance between the inductors may be varied to adjust the capacitance therebetween. Thus, by adjusting the inductance and/or capacitance along the distributed inductor capacitor network, one or more desired properties of the PAMM (e.g., amplifier, bandpass, band gap, electric wall, magnetic wall, etc.) within a desired frequency band may be obtained.

FIG. 47 is a cross sectional diagram of another embodiment of a projected artificial magnetic minor that includes a plurality of coils 202, the metal backing 204, and one or more dielectrics 206. One or more dielectrics 206 are positioned between the metal backing 204 and the coils 202. The dielectric 206 may be a dielectric layer of a die and/or of a package substrate. Alternatively, the dielectric 206 may be injected between the metal backing 204 and the coils 202. Note that the coils 202 are not coupled to the metal backing 204 by vias. While FIG. 47 references the coils 202 for forming a projected artificial magnetic mirror (PAMM), the cross-sectional view is applicable to any of the other embodiments of the PAMM previously discussed or to be subsequently discussed.

FIG. 48 is a schematic block diagram of the embodiment of the projected artificial magnetic minor of FIG. 47. In this diagram, each coil is represented as an inductor, the capacitance between the coils 202 is represented as capacitors, and the capacitance between the coils and the metal backing are also represented as capacitors.

As illustrated, the PAMM is a distributed inductor-capacitor network that can be configured to achieve the various frequency responses shown in one or more of FIGS. 1-15. For instance, the size of the coils may be varied to achieve a desired inductance. Further, the distance between the inductors (and/or the distance between a coil and the metal backing) may be varied to adjust the capacitance therebetween. Thus, by adjusting the inductance and/or capacitance along the distributed inductor capacitor network, one or more desired properties of the PAMM (e.g., amplifier, bandpass, band gap, electric wall, magnetic wall, etc.) within a desired frequency band may be obtained.

FIG. 49 is a cross sectional diagram of another embodiment of a projected artificial magnetic mirror that combines the embodiments of FIGS. 45 and 47. In particular, some of the coils 202 are coupled to the metal backing 204 by a via, while others are not. While FIG. 49 references the coils 202 for forming a projected artificial magnetic mirror (PAMM), the cross-sectional view is applicable to any of the other embodiments of the PAMM previously discussed or to be subsequently discussed.

FIG. 50 is a schematic block diagram of another embodiment of the projected artificial magnetic minor of FIG. 49. In this diagram, each coil is represented as an inductor, the capacitance between the coils is represented as capacitors, and the capacitance between the coils and the metal backing are also represented as capacitors. As is further shown, some of the coils are directly coupled to the metal backing by a connection (e.g., a via) and other coils are capacitively coupled to the metal backing.

As illustrated, the PAMM is a distributed inductor-capacitor network that can be configured to achieve the various frequency responses shown in one or more of FIGS. 1-15. For instance, the size of the coils 202 may be varied to achieve a desired inductance. Further, the distance between the inductors (and/or the distance between a coil and the metal backing) may be varied to adjust the capacitance therebetween. Thus, by adjusting the inductance and/or capacitance along the distributed inductor capacitor network, one or more desired properties of the PAMM (e.g., amplifier, bandpass, band gap, electric wall, magnetic wall, etc.) within a desired frequency band may be obtained.

FIG. 51 is a cross sectional diagram of another embodiment of a projected artificial magnetic minor that includes a plurality of coils 208-210, the metal backing 204, and one or more dielectrics 206. A first plurality of the coils 208 is on a first layer and a second plurality of coils 210 is on a second layer. Each of the coils is coupled to the metal backing 204 by one or more vias. The one or more dielectrics 206 are positioned between the metal backing 204 and the coils. The dielectric 206 may be a dielectric layer of a die and/or of a package substrate. Alternatively, the dielectric 206 may be injected between the metal backing 204 and the coils.

This embodiment of the PAMM creates a more complex distributed inductor-capacitor network since capacitance is also formed between the layers of coils. The inductors and/or capacitors of the distributed inductor-capacitor network can be adjusted to achieve the various frequency responses shown in one or more of FIGS. 1-15. For instance, the size of the coils may be varied to achieve a desired inductance. Further, the distance between the inductors, the distance between the layers, and/or the distance between a coil and the metal backing may be varied to adjust the capacitance therebetween. Thus, by adjusting the inductance and/or capacitance along the distributed inductor capacitor network, one or more desired properties of the PAMM (e.g., amplifier, bandpass, band gap, electric wall, magnetic wall, etc.) within a desired frequency band may be obtained.

While FIG. 51 references the coils for forming a projected artificial magnetic minor (PAMM), the cross-sectional view is applicable to any of the other embodiments of the PAMM previously discussed or to be subsequently discussed. Further, while each coil is shown to have a connection to the metal backing 204, some or all of the coils may not have a connection to the metal backing as shown in FIGS. 47 and 49.

FIG. 52 is a diagram of an embodiment of an antenna having a projected artificial magnetic minor 212 that includes spiral traces (e.g., coils). The PAMM 212 includes a 5-by-3 array of coils of substantially the same size, of substantially the same length, of substantially the same number of turns, and of substantially the same shape. The antenna is a dipole antenna 214 of a size and shape for operation in the 60 GHz frequency band.

The radiating elements of the dipole antenna 214 are positioned over the PAMM 212 such that one or more connections can pass through the PAMM 212 to couple the dipole antenna 214 to circuit elements on the other side of the PAMM 212. In this example, the dipole antenna 214 is fabricated on an outside layer of a die and/or package substrate and the PAMM 212 is fabricated on an inner layer of the die and/or package substrate. The metal backing of the PAMM 212 (not shown) is on a lower layer with respect to the array of metal patches.

FIG. 53 is a diagram of an example radiation pattern of a concentric spiral coil (e.g., symmetrical about a center point). In the presence of an external electromagnetic field (e.g., a transmitted RF and/or MMW signal), the coil functions as an antenna with a radiation pattern that is normal to its x-y plane 216. As such, when a concentric coil is incorporated into a projected artificial magnetic mirror (PAMM) 218, it reflects electromagnetic energy in accordance with its radiation pattern. For example, when an electromagnetic signal is received at an angle of incidence, the concentric coil, as part of the PAMM 218, will reflect the signal at the corresponding angle of reflection (i.e., the angle of reflection equals the angle of incidence).

FIG. 54 is a diagram of an example radiation pattern of a projected artificial magnetic minor having a plurality of concentric spiral coils 220. As discussed with reference to FIG. 53, the radiation pattern of a concentric spiral coil is normal to its x-y plane. Thus, an array of concentric spiral coils 220 will produce a composite radiation pattern that is normal to its x-y plane, which causes the array to function like a mirror for electromagnetic signals (in the frequency band of the PAMM).

FIG. 55 is a diagram of an example radiation pattern of a conventional dipole antenna 224. As shown, a dipole antenna 224 has a forward radiation pattern 226 and an image radiation pattern 228 that are normal to the plane of the antenna 224. When in use, the antenna 224 is positioned, when possible, such that received signals are within the forward radiation pattern 226, where the gain of the antenna is at its largest.

FIG. 56 is a diagram of an example radiation pattern of a dipole antenna 230 with a projected artificial magnetic mirror (PAMM) 232. In this example, the forward radiation pattern 236 is similar to the forward radiation pattern 226 of FIG. 55. The image radiation pattern 234, however, is reflected off of the PAMM 232 into the same direction as the forward radiation pattern 236. While blocking signals on the other side of it, the PAMM 232 increases the gain of the antenna 230 for signals on the antenna side of the PAMM 232 by 3 dB or more due to the reflection of the image radiation pattern 234.

FIG. 57 is a diagram of an example radiation pattern 240 of an eccentric spiral coil 238 (e.g., asymmetrical about a center point). In the presence of an external electromagnetic field (e.g., a transmitted RF and/or MMW signal), the eccentric spiral coil 238 functions as an antenna with a radiation pattern 240 that is offset from normal to its x-y plane. The angle of offset (e.g., θ) is based on the amount of asymmetry of the spiral coil 238. In general, the greater the asymmetry of the spiral coil 238, the greater its angle of offset will be.

When an eccentric spiral coil 238 is incorporated into a projected artificial magnetic minor (PAMM), it reflects electromagnetic energy in accordance with its radiation pattern 240. For example, when an electromagnetic signal is received at an angle of incidence, the eccentric spiral coil 238, as part of the PAMM, will reflect the signal at the corresponding angle of reflection plus the angle of offset (i.e., the angle of reflection equals the angle of incidence plus the angle of offset, which will asymptote parallel to the x-y plane).

FIG. 58 is a diagram of an example radiation pattern of a projected artificial magnetic minor (PAMM) having some eccentric and concentric spiral coils 242. The concentric spiral coils 246 have a normal radiation pattern as discussed with reference to FIG. 53 and the eccentric spiral coils 244 have an offset radiation pattern as shown in FIG. 57. With a combination of eccentric and concentric spiral coils 242, a focal point is created at some distance from the surface of the PAMM. The focus of the focal point (e.g., its relative size) and its distance from the surface of the PAMM is based on the angle of offset of eccentric spiral coils 244, the number of concentric spiral coils 246, the number of the eccentric spiral coils 246, and the positioning of both types of spiral coils.

FIG. 59 is a diagram of another example radiation pattern of a projected artificial magnetic mirror (PAMM) having a first type of eccentric spiral coils 250, a second type of eccentric spiral coils 252, and concentric spiral coils 246. The concentric spiral coils 246 have a normal radiation pattern as discussed with reference to FIG. 53 and the eccentric spiral coils 250-252 have an offset radiation pattern as shown in FIG. 57. The first type of eccentric spiral coils 250 has a first angle of offset and the second type of eccentric spiral coils 252 has a second angle of offset. In the present example, the second angle of offset is greater than the first.

With a combination of eccentric and concentric spiral coils 242, a focal point is created at some distance from the surface of the PAMM. The focus of the focal point (e.g., its relative size) and its distance from the surface of the PAMM is based on the angle of offset of eccentric spiral coils 250-252, the number of concentric spiral coils 246, the number of the eccentric spiral coils 250-252, and the positioning of both types of spiral coils.

While this example shows two types of eccentric spiral coils 250-252, more than two types can be used. The number of types of eccentric spiral coils 250-252 is at least partially dependent on the application. For instance, an antenna application may optimally be fulfilled with two or more types of eccentric spiral coils 250-252.

FIG. 60 is a diagram of a projected artificial magnetic minor (PAMM) having a first type of eccentric spiral coils, a second type of eccentric spiral coils, and concentric spiral coils. The concentric spiral coils have a normal radiation pattern as discussed with reference to FIG. 53 and the eccentric spiral coils have an offset radiation pattern as shown in FIG. 57. The first type of eccentric spiral coils has a first angle of offset and the second type of eccentric spiral coils has a second angle of offset. In the present example, the second angle of offset is greater than the first.

As shown, the overall shape of the PAMM is circular (but could be an oval, a square, a rectangle, or other shape), where the concentric spiral coils are of a pattern and in the center. The first type of eccentric spiral coils have a corresponding pattern and encircles (at least partially) the concentric spiral coils, which, in turn, is encircled (at least partially) by the second type of eccentric spiral coils that have a second corresponding pattern.

Note that, while FIGS. 53-60 show the coils coupled to the metal backing by a via, one or more of the coils may be capacitively coupled to the metal backing as previously discussed. As such, the PAMM of eccentric spiral coils and concentric spiral coils may have a similar connection pattern to the metal backing as shown in FIGS. 47 and 49.

FIG. 61 is a diagram of an embodiment of an effective dish antenna 254 that includes one or more antennas 256 and a plurality of coils 258 that form a projected artificial magnetic minor (PAMM). The PAMM may be similar to that of FIG. 60, where it includes two type of eccentric spiral coils 250-252 encircling concentric spiral coils 246. The one or more antennas 256 is positioned within the focal point 260 of the PAMM. In this manner, the PAMM functions as a dish for the antenna 256, focusing energy of an electromagnetic signal at the focal point 260. As such, a dish antenna is realized from a substantially flat structure.

The effective dish antenna 254 may be constructed for a variety of frequency ranges. For instance, the effective dish antenna 254 may be fabricated on a die and/or package substrate for use in a 60 GHz frequency band. Alternatively, the plurality of spiral coils 258 may be discrete components designed for operation in the C-band of 500 MHz to 1 GHz and/or in the K-band of 12 GHz to 18 GHz (e.g., satellite television and/or radio frequency bands). As yet another example, the effective dish 254 may be used in the 900 MHz frequency band, the 1800-1900 MHz frequency band, the 2.4 GHz frequency band, the 5 GHz frequency band, and/or any other frequency band used for RF and/or MMW communications.

FIG. 62 is a diagram of another embodiment of an effective dish antenna 264 that includes one or more antennas 256, a plurality of concentric spiral coils 246, and multiple types of eccentric spiral coils 250, 252, 266. In this embodiment, the focal point is 260 off-center based on the imbalance of the various types of eccentric spiral coils 250, 252, 266. As shown, only the first type of eccentric spiral coils 250 is shown to the right of the concentric spiral coils 246. To the left of concentric spiral coils 246 are the second type of spiral coils 252 and a third type of spiral coils 266. The third type of spiral coils 254 has a third angle of offset, which is larger than the second angle of offset.

The imbalance of eccentric spiral coils rotates the effective dish 254 with respect to the embodiment of FIG. 61. As such, the effective dish 264 is configured to have a particular angle of reception/transmission.

FIG. 63 is a diagram of an embodiment of an effective dish antenna array 268 that includes a plurality of effective dish antennas 254, 264. In this example, the array of effective dish antennas 268 includes effective dish antennas 254, 264 of FIGS. 61 and 62. Alternatively, the array 268 may include effective dish antennas of FIG. 61 only or of FIG. 62 only. As another alternative, the array may include different types of effective dish antennas than the examples of FIGS. 61 and 62.

The array of effective dish antennas 268 may have a linear shape as shown in FIG. 63, may have a circular shape, may have an oval shape, may have a square shape, may have a rectangular shape, or may have any other shape. For non-linear shapes (e.g., a circle), the effective dish antenna of FIG. 612 254 may be in the center of the circle, which is surrounded by effective dish antennas of FIG. 62 264.

FIG. 64 is a diagram of an example application of an effective dish antenna array. In this example, one or more effective dish antennas and/or one or more effective dish antenna arrays 272 are mounted on one or more parts of a vehicle (e.g., car, truck, bus, etc.). Alternatively, the effective antenna dish(es) and/or array(s) 272 may be integrated into the vehicle part. For example, a plastic rear fender of a car may have an effective dish array fabricated therein. As another example, the roof of a car may have an effective dish array fabricated therein.

For vehicle applications, the size of the effective dish antenna and/or array 272 will vary depending on the frequency band of the particular application. For example, for 60 GHz applications, the effective dish antenna and/or array 272 may be implemented on an integrated circuit. As another example, for satellite communications, the effective dish antenna and/or array 272 will be based on the wavelength of the satellite signal.

As another example, a vehicle may be equipped with multiple effective dish antennas and/or arrays 272. In this example, one dish antenna or array may be for a first frequency band and a second dish and/or array may be for a second frequency band.

FIG. 65 is a diagram of another example application of an effective dish antenna array. In this example, one or more effective dish antennas and/or one or more effective dish antenna arrays 272 are mounted on a building 274 (e.g., a home, an apartment building, an office building). Alternatively, the effective antenna dish(es) and/or array(s) 272 may be integrated into non-conductive exterior material of the building. For example, roofing material may have an effective dish array fabricated therein. As another example, siding material may have an effective dish array fabricated therein. As another example, wall, ceiling, and/or flooring material may have an effective dish array fabricated therein.

For building applications, the size of the effective dish antenna and/or array 272 will vary depending on the frequency band of the particular application. For example, for 60 GHz applications, the effective dish antenna and/or array 272 may be implemented on an integrated circuit. As another example, for satellite communications, the effective dish antenna and/or array 272 will be based on the wavelength of the satellite signal.

As another example, a building 274 may be equipped with multiple effective dish antennas and/or arrays. In this example, one dish antenna or array may be for a first frequency band and a second dish and/or array may be for a second frequency band. In furtherance of this example, the effective flat dishes may be used for antennas of a base station for supporting cellular communications and/or for antennas of an access point of a wireless local area network.

FIG. 66 is a diagram of an example of an adjustable coil 276 for use in a projected artificial magnetic minor (PAMM). The adjustable coil 276 includes an inner winding section 278, an outer winding section 280, and coupling circuitry 282 (e.g., MEMs switches, RF switches, etc.). The winding sections 278-280 may each include one or more turns and have the same length and/or width or different lengths and/or widths.

To adjust the characteristics of the coil 276 (e.g., its inductance, its reactance, its resistance, its capacitive coupling to other coils and/or to the metal backing), the winding sections 278-280 may be coupled in parallel (as shown in FIG. 68), coupled in series (as shown in FIG. 67), or used as separate coils.

With in the inclusion of adjustable coils, a PAMM may be adjusted to operate in different frequency bands. For instance, in a multi-mode communication device that operates in two frequency bands, the PAMM of an antenna structure (or other circuit structure [e.g., transmission line, filter, inductor, etc.]) is adjusted to correspond to the frequency band currently being used by the communication device.

FIG. 69 is a cross sectional diagram of an example of an adjustable coil for use in a projected artificial magnetic mirror (PAMM). As shown, the winding sections 286 are on one layer and the coupling circuit 282 is on a second layer. The layers are coupled together by gatable vias 284. For example, the coupling circuit 282 may include MEMS switches and/or RF switches that, for parallel coupling, couples the winding sections 286 together by enabling a plurality of gatable vias 284. As an example of series connection, the coupling circuit 282 enables one or a few gatable vias 284 near respective ends of the winding sections 286 to couple them together.

FIG. 70 is a cross sectional diagram of another example of an adjustable coil for use in a projected artificial magnetic mirror (PAMM). This embodiment is similar to that of FIG. 69 with the exception of the inclusion of parallel winding sections 288 (e.g., minor images of the winding section of FIG. 66, but on a different layer). As such, the coupling circuit 282 can couple the parallel winding sections 288 to the winding sections 286 on the upper layer to reduce the resistance, inductance, and/or reactance of the winding sections.

FIG. 71 is a schematic block diagram of a projected artificial magnetic minor having adjustable coils 290. In this example, each of the adjustable coils 290 has two winding sections (L1 and L2), three switches (S1-S3), and selectable tap switches 292. For a series connection of the winding sections, S1 is closed and S2 and S3 are open. For a parallel connection, S1 is open and S2 and S3 are closed. For two coil applications, all three switches are open.

To adjust the coupling to the metal backing, the selectable tap switches 292 may be open, thus enabling capacitive coupling to the metal backing. Alternatively, one or both of the selectable tap switches may be closed to adjust the inductor-capacitor circuit of the coil. Further, each winding section may have more than one tap, which further enables tuning of the inductor-capacitor circuit of the coil.

FIG. 72 is a diagram of another example of an adjustable coil for use in a projected artificial magnetic mirror (PAMM). In this embodiment, the adjustable coil includes a plurality of metal segments and a plurality of switching elements (e.g., transistors, MEMS switches, RF switches, etc.) that enable the coil to be configured as a concentric spiral coil (as shown in FIG. 74); as a first eccentric spiral coil (as shown in FIG. 73); or as a second eccentric spiral coil as shown in the present figure.

With programmable coils, the PAMM can be programmed to provide a flat dish (e.g., as shown in FIG. 54), a first type of effective dish (e.g., as shown in FIG. 61), and/or a second type of effective dish (e.g., as shown in FIG. 62). Thus, as the application for an effective dish antenna changes, the PAMM can be programmed to accommodate the changes in application.

FIG. 75 is a diagram of another example of an adjustable coil for use in a projected artificial magnetic minor (PAMM). The adjustable coil includes a plurality of small metal patches arranged in an x-by-y matrix. Switching units positioned throughout the matrix receive control signals from a control module to couple the small metal patches together to achieve a desired spiral coil. Note that the small metal patches may be a continuous plate, a pattern with interconnecting branches, an $n^{th}$ order Peano curve, or an $n^{th}$ order Hilbert curve.

In the present example, the adjustable coil is configured into an eccentric spiral coil. In the example of FIG. 76, the adjustable coil is configured into a concentric spiral coil. Note that the adjustable coil may be configured into other coil patterns (e.g., circular spiral, elliptical, etc.).

FIG. 77 is a diagram of an embodiment of an adjustable effective dish antenna array 294 that includes one or more antennas 296 and a plurality of adjustable coils 298 that form a projected artificial magnetic minor (PAMM). In the present example, the shape of the effective dish 294 may be changed. Alternatively, the focal point 300 of the effective dish 294 may be changed. The particular configuration of the adjustable effective dish antenna 294 will be driven by a present application. A control unit interprets the present application and generates control signals to configure the adjustable effective dish antenna 294 as desired.

FIG. 78 is a diagram of an embodiment of flip-chip connection between two die. The first die 304 includes one or more antennas 304 and projected artificial magnetic mirror (PAMM) 308. The second die 310 includes one or more circuit components 312 (e.g., LNA, PA, etc.). The metal plating 314 may be on the bottom surface of the first die 304 or on the top of the second die 310. In either case, the metal plating 314 provides the metal backing for the PAMM 308.

To coupling the first die 304 to the second 310, interfaces are provided in the metal plating to allow in-band communication between the antenna(s) 306 and one or more of the circuit components 312. The coupling 314 may also include conventional flip-chip coupling technology to facilitate electrical and/or mechanical coupling of the first die 304 to the second 310.

FIG. 79 is a schematic block diagram of an embodiment of communication devices 316 communicating using electromagnetic communications 318 (e.g., near field communication [NFC]). Each of the communication devices 316 includes a baseband processing module 320, a transmitter section 322, a receiver section 324, and an NFC coil structure 326 (e.g., a wireless communication structure). The NFC coil structure 326 will be described in greater detail with reference to one or more of FIGS. 80-86. Note that a communication device 316 may be a cellular telephone, a wireless local area network (WLAN) client, a WLAN access point, a computer, a video game console and/or player unit, etc.

The baseband processing module 320 may be implemented via a processing module that may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 79-87.

In an example of operation, one of the communication devices 316 has data (e.g., voice, text, audio, video, graphics, etc.) to transmit to the other communication device 316. In this instance, the baseband processing module 320 receives the data (e.g., outbound data) and converts it into one or more outbound symbol streams in accordance with one or more wireless communication standards (e.g., RFID, IS O/IEC 14443, ECMA-34, ISO/IEC 18092, near field communication interface and protocol 1 & 2 [NFCIP-1 & NFCIP-2]). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the baseband processing module 320 converts the outbound data into a single outbound symbol stream for Single Input Single Output (SISO) communications and/or for Multiple Input Single Output (MISO) communications and converts the outbound data into multiple outbound symbol streams for Single Input Multiple Output (SIMO) and Multiple Input Multiple Output (MIMO) communications.

The transmitter section 322 converts the one or more outbound symbol streams into one or more outbound signals that has a carrier frequency within a given frequency band (e.g., 2.4 GHz, 5 GHz, 57-66 GHz, etc.). In an embodiment, this may be done by mixing the one or more outbound symbol streams with a local oscillation to produce one or more up-converted signals. One or more power amplifiers and/or power amplifier drivers amplifies the one or more up-converted signals, which may be bandpass filtered, to produce the one or more outbound signals. In another embodiment, the transmitter section 322 includes an oscillator that produces an oscillation. The outbound symbol stream(s) provides phase information (e.g., +/−Δθ [phase shift] and/or θ(t) [phase modulation]) that adjusts the phase of the oscillation to produce a phase adjusted signal(s), which is transmitted as the outbound signal(s). In another embodiment, the outbound symbol stream(s) includes amplitude information (e.g., A(t) [amplitude modulation]), which is used to adjust the amplitude of the phase adjusted signal(s) to produce the outbound signal(s).

In yet another embodiment, the transmitter section 322 includes an oscillator that produces an oscillation(s). The outbound symbol stream(s) provides frequency information (e.g., +/−Δf [frequency shift] and/or f(t) [frequency modulation]) that adjusts the frequency of the oscillation to produce a frequency adjusted signal(s), which is transmitted as the outbound signal(s). In another embodiment, the outbound symbol stream(s) includes amplitude information, which is used to adjust the amplitude of the frequency adjusted signal(s) to produce the outbound signal(s). In a further embodiment, the transmitter section 322 includes an oscillator that produces an oscillation(s). The outbound symbol stream(s) provides amplitude information (e.g., +/−ΔA [amplitude shift] and/or A(t) [amplitude modulation) that adjusts the amplitude of the oscillation(s) to produce the outbound signal(s).

The NFC coil structure 326 receives the one or more outbound signals, converts it into an electromagnetic signal(s) and transmits the electromagnetic signal(s). The NFC coil 326 structure of the other communication devices receives the one or more electromagnetic signals, converts it into an inbound electrical signal(s) and provides the inbound electrical signal(s) to the receiver section 324.

The receiver section 324 amplifies the one or more inbound signals to produce one or more amplified inbound signals. The receiver section 324 may then mix in-phase (I) and quadrature (Q) components of the amplified inbound signal(s) with in-phase and quadrature components of a local oscillation(s) to produce one or more sets of a mixed I signal and a mixed Q signal. Each of the mixed I and Q signals are combined to produce one or more inbound symbol streams. In this embodiment, each of the one or more inbound symbol streams may include phase information (e.g., +/−Δθ [phase shift] and/or θ(t) [phase modulation]) and/or frequency information (e.g., +/−Δf [frequency shift] and/or f(t) [frequency modulation]). In another embodiment and/or in furtherance of the preceding embodiment, the inbound signal(s) includes amplitude information (e.g., +/−ΔA [amplitude shift] and/or A(t) [amplitude modulation]). To recover the amplitude information, the receiver section includes an amplitude detector such as an envelope detector, a low pass filter, etc.

The baseband processing module 320 converts the one or more inbound symbol streams into inbound data (e.g., voice, text, audio, video, graphics, etc.) in accordance with one or more wireless communication standards (e.g., RFID, ISO/IEC 14443, ECMA-34, IS O/IEC 18092, near field communication interface and protocol 1 & 2 [NFCIP-1 & NFCIP-2]). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the baseband processing module 320 converts a single inbound symbol stream into the inbound data for Single Input Single Output (SISO) communications and/or for Multiple Input Single Output (MISO) communications and converts the multiple inbound symbol streams into the inbound data for Single Input Multiple Output (SIMO) and Multiple Input Multiple Output (MIMO) communications.

FIG. 80 is a diagram of an embodiment of an integrated circuit (IC) 328 that includes a package substrate 330 and a die 332. The die 332 includes a baseband processing module 334, a transceiver 336, and one or more NFC coils 338. Such an IC 328 may be used in the communication devices of FIG. 79 and/or for other wireless communication devices.

FIG. 81 is a diagram of an embodiment of an integrated circuit (IC) 328 that includes a package substrate 330 and a die 332. This embodiment is similar to that of FIG. 80 except that one NFC coil structure 342 is on the package substrate 330 (another is on the die). Accordingly, IC 328 includes a connection from the NFC coil 342 structure on the package substrate 330 to the transceiver 336 on the die 332.

FIG. 82 is a diagram of an embodiment of an integrated circuit (IC) 328 that includes a package substrate 330 and a die 332. This embodiment is similar to that of FIG. 80 except that both NFC coil structures 342 are on the package substrate 330. Accordingly, IC 328 includes connections from the NFC coil structures 342 on the package substrate 330 to the transceiver 336 on the die 332.

In the various embodiments of the NFC coil structure of FIGS. 79-82, an NFC coil structure may include one or more coils that is sized for the given type and frequency of the NFC communication. For example, 60 GHz NFC communication allows for the NFC coil(s) to be on the die, while 2.4 GHz and 5 GHz NFC communications typically requires the NFC coils to be on the package substrate 330, and/or on the substrate supporting the IC 328 (e.g., on the PCB).

FIG. 83 is a cross sectional diagram of an embodiment of an NFC coil structure that is implemented on one or more layers of a die 346 of an integrated circuit (IC). The die 346 includes a plurality of layers 348 and may be of a CMOS fabrication process, a Gallium Arsenide fabrication process, or other IC fabrication process. In this embodiment, one or more coils 344 are fabricated as one or more metal traces of a particular length and shape based on the desired coil properties (e.g., frequency band, bandwidth, impedance, quality factor, etc.) of the coil(s) on an outer layer of the die 346.

On an inner layer, which is a distance “d” from the layer supporting the coil(s) 344, a projected artificial magnetic mirror (PAMM) 350 is fabricated. The PAMM 350 may be fabricated in one of a plurality of configurations as discussed with reference to one or more of FIGS. 33-63. The PAMM 350 may be electrically coupled to a metal backing 354 (e.g., ground plane) of the die 346 by one or more vias 352. Alternatively, the PAMM 350 may capacitively coupled to the metal backing 354 (i.e., is not directly coupled to the metal backing 354 by a via 352, but through the capacitive coupling of the metal elements of the PAMM 350 and the metal backing 354).

The PAMM 350 functions as an electric field reflector for the coil(s) 344 within a given frequency band. In this manner, circuit components 356 (e.g., the baseband processor, the components of the transmitter section and receiver section, etc.) fabricated on other layers of the die 346 are substantially shielded from the electromagnetic energy of the coil(s) 344. In addition, the reflective nature of the PAMM 350 may improve the gain of the coil(s) 344.

FIG. 84 is a diagram of an embodiment of an NFC coil structure that is implemented on one or more layers of a package substrate 360 of an integrated circuit (IC). The package substrate 360 includes a plurality of layers 362 and may be a printed circuit board or other type of substrate. In this embodiment, one or more coils 358 are fabricated as one or more metal traces of a particular length and shape based on the desired coil properties of the coil(s) on an outer layer of the package substrate 360.

On an inner layer of the package substrate 360, a projected artificial magnetic minor (PAMM) 364 is fabricated. The PAMM 364 may be fabricated in one of a plurality of configurations as discussed with reference to one or more of FIGS. 33-63. The PAMM 364 may be electrically coupled to a metal backing 368 (e.g., ground plane) of the die 370 by one or more vias 366. Alternatively, the PAMM 364 may capacitively coupled to the metal backing 368.

FIG. 85 is a diagram of an embodiment of an NFC coil structure that is similar to the NFC coil structure of FIG. 83 with the exception that the coil(s) 372 are fabricated on two or more layers of the die 346. The different layers of the coil 372 may be coupled in a series manner and/or in a parallel manner to achieve the desired properties (e.g., frequency band, bandwidth, impedance, quality factor, etc.) of the coil(s) 372.

FIG. 86 is a diagram of an embodiment of an NFC coil structure that is similar to the NFC coil structure of FIG. 84 with the exception that the coil(s) 374 are fabricated on two or more layers of the package substrate 360. The different layers 362 of the coil 374 may be coupled in a series manner and/or in a parallel manner to achieve the desired properties (e.g., frequency band, bandwidth, impedance, quality factor, etc.) of the coil(s).

FIG. 87 is a schematic block diagram of an embodiment of a radar system 376 that includes one or more radar devices 1-R, and a processing module 378. The radar system 376 may be fixed or portable. For example, the radar system 376 may be in the fixed configuration when it detects player movements of a gaming system in a room. In another example, the radar system 376 may be in the portable configuration when it detects vehicles around a vehicle equipped with the radar system 376. Fixed radar system applications also include radar for weather, control tower based aircraft tracking, manufacturing line material tracking, and security system motion sensing. Portable radar system applications also include vehicular safety applications (e.g., collision warning, collision avoidance, adaptive cruise control, lane departure warning), aircraft based aircraft tracking, train based collision avoidance, and golf cart based golf ball tracking.

Each of the radar devices 1-R includes an antenna structure 380 that includes a projected artificial magnetic minor (PAMM) as previously described, a shaping module 382, and a transceiver module 384. The processing module 378 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 378 may have an associated memory and/or memory element, which may be a single memory device, a plurality of memory devices, and/or embedded circuitry of the processing module 378. Such a memory device may be a read-only memory, random access memory, volatile memory, non-volatile memory, static memory, dynamic memory, flash memory, cache memory, and/or any device that stores digital information. Note that if the processing module 378 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 378 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 378 executes, hard coded and/or operational instructions corresponding to at least some of the steps and/or functions illustrated in FIGS. 87-92.

In an example of operation, the radar system 376 functions to detect location information regarding objects (e.g., object A, B, and/or C) in its scanning area 386. The location information may be expressed in two dimensional or three dimensional terms and may vary with time (e.g., velocity and acceleration). The location information may be relative to the radar system 376 or it may be absolute with respect to a more global reference (e.g., longitude, latitude, elevation). For example, relative location information may include distance between the object and the radar system 376 and/or angle between the object and the radar system 376.

The scanning area 386 includes the radiation pattern of each of the radar devices 1-R. For example, each radar device 1-R transmits and receives radar signals over the entire scanning area 386. In another example, each radar device 1-R transmits and receives radar signals to R unique portions of the scanning area 386 with substantially no overlap of their radiation patterns. In yet another example, some radar devices have overlapping radiation patterns while others do not.

The radar system 376 may detect objects and determine the location information in a variety of ways in a variety of frequency bands. The radar devices 1-R may operate in the 60 GHz band or any other band in the 30 MHz to 300 GHz range as a function of coverage optimization and system design goals to meet the needs of a particular application. For example, 50 MHz is utilized to penetrate the atmosphere to scan objects in earth orbit while 60 GHz can be utilized to scan for vehicles one to three car lengths from a radar equipped vehicle where the atmospheric effects are minimal. The radar devices 1-R operate in the same or different frequency ranges.

The location information may be determined by the radar system 376 when the radar system 376 is operating in different modes including one or more of each radar device operating independently, two or more radar devices operating collectively, continuous wave (CW) transmission, pulse transmission, separate transmit (TX) and receive (RX) antennas, and shared transmit (TX) and receive (RX) antennas. The radar devices may operate under the control of the processing module 378 to configure the radar devices to operate in accordance with the operating mode.

For example, in a pulse transmission mode, the processing module 378 sends a control signal 388 to the radar device to configure the mode and operational parameters (e.g., pulse transmission, 60 GHz band, separate transmit (TX), and receive (RX) antennas, work with other radar devices). The control signal 388 includes operational parameters for each of the transceiver module 384, the shaping module 382, and the antenna module 380. The transceiver 384 receives the control signal 388 and configures the transceiver 384 to operate in the pulse transmission mode in the 60 GHz band.

The transceiver module 384 may include one or more transmitters and/or one or more receivers. The transmitter may generate an outbound wireless signal 390 based on an outbound control signal 388 from the processing module 378. The outbound control signal 388 may include control information to operate any portion of the radar device and may contain an outbound message (e.g., a time stamp) to embed in the outbound radar signal. Note that the time stamp can facilitate determining location information for the CW mode or pulse mode.

In the example, the transceiver 384 generates a pulse transmission mode outbound wireless signal 390 and sends it to the shaping module 382. Note that the pulse transmission mode outbound wireless signal 390 may include a single pulse, and/or a series of pulses (e.g., pulse width less than 1 nanosecond every millisecond to once every few seconds). The outbound radar signal may include a time stamp message of when it is transmitted. In an embodiment, the transceiver 384 converts the time stamp message into an outbound symbol stream and converts the outbound symbol stream into an outbound wireless signal 390. In another embodiment, the processing module 378 converts the outbound message into the outbound symbol stream.

The shaping module 382 receives the control signal 388 (e.g., in the initial step from the processing module 378) and configures to operate with the antenna module 380 with separate transmit (TX) and receive (RX) antennas. The shaping module 382 produces one or more transmit shaped signals 392 for the antenna module 380 based on the outbound wireless signal 390 from the transceiver 384 and on the operational parameters based on one or more of the outbound control signal 388 from the processing module 378 and/or operational parameters from the transceiver 384. The shaping module 382 may produce the one or more transmit shaped signals 392 by adjusting the amplitude and phase of outbound wireless signal differently for each of the one or more transmit shaped signals 392.

The radar device antenna module 380 radiates the outbound radar signal 394 creating a transmit pattern in accordance with the operational parameters and mode within the scanning area 386. The antenna module 380 may include one or more antennas. Antennas may be shared for both transmit and receive operations. Note that in the example, separate antennas are utilized for TX (e.g., in the radar device) and RX (e.g., in a second radar device).

Antenna module antennas may include any mixture of designs including monopole, dipole, horn, dish, patch, microstrip, isotron, fractal, yagi, loop, helical, spiral, conical, rhombic, j-pole, log-periodic, slot, turnstile, collinear, and nano. Antennas may be geometrically arranged such that they form a phased array antenna when combined with the phasing capabilities of the shaping module 382. The radar device may utilize the phased array antenna configuration as a transmit antenna system to transmit outbound radar signals 394 as a transmit beam in a particular direction of interest.

In the example, the second radar device receives an inbound radar signal 394 via its antenna module 380 that results from the outbound radar signal 394 reflecting, refracting, and being absorbed in part by the one or more objects (e.g., objects A, C, and/or C) in the scanning area 386. The second radar device may utilize the phased array antenna configuration as a receive antenna system to receive inbound radar signals 394 to identify a direction of its origin (e.g., a radar signal reflection off an object at a particular angle of arrival).

The antenna module 380 of the second radar device sends the inbound radar signal 394 to its shaping module 382 as a shaped signal 392. The shaped signal 392 may be the result of the inbound radar signal 394 impinging on one or more antennas that comprise the antenna module 380 (e.g., an array). For example, the amplitude and phase will vary slightly between elements of a phased array.

The shaping module 382 produces one or more inbound wireless signals for the transceiver based on one or more receive shaped signals 392 from the antenna module 380 and on the operational parameters from one or more of the processing module 378 and/or the transceiver 384. The shaping module 382 may produce the one or more inbound wireless signals 390 by adjusting the amplitude and phase of one or more receive shaped signals 392 differently for each of the one or more receive shaped signals 392.

In an embodiment, the second radar device transceiver 384 generates an inbound control signal 388 based on the inbound wireless signal 390 from its shaping module 382. The inbound control signal 388 may include the status of the operational parameters, inbound wireless signal parameters (e.g., amplitude information, timing information, phase information), and an inbound message decoded from the inbound wireless signal. The transceiver 384 converts the inbound wireless signal 390 into an inbound symbol stream and converts the inbound symbol stream into the inbound message (e.g., to decode the time stamp). In another embodiment, the processing module 378 converts the inbound symbol stream into the inbound message.

The processing module 378 determines location information about the object based on the inbound radar signal 394 received by the radar device. In particular, the processing module 378 may determine the distance to the object based on the time stamp and the time at which the radar device received the inbound radar signal 394. Since the radar signals 394 travel at the speed of light, the distance can be readily determined.

In another example, where the mode is each radar device operating independently, each radar device transmits the outbound radar signal 394 to the scanning area 386 and each radar device receives the inbound radar signal 394 resulting from the reflections of the outbound radar signal 394 off the one or more objects. Each radar device utilizes its antenna module 380 to provide the processing module 378 with control signals 388 that can reveal the location information of an object with reference to the radar device. For example, the processing module 378 determines the location of the object when two radar devices at a known distance apart provide control signals 388 that reveal the angle of arrival of the inbound radar signal 394.

In another example of operation, the processing module 378 determines the operational parameters for radar devices 1 and 2 based on the requirements of the application (e.g., scanning area size and refresh rates of the location information). The processing module 378 sends the operational requirements to the radar devices (e.g., operate at 60 GHz, configure the transmit antenna of each radar device for an omni-directional pattern, transmit a time stamped 1 nanosecond pulse every 1 millisecond, sweep the scanning area 386 with a phased array antenna configuration in each radar device). The antenna module 380, the shaping module 382, and the transceiver 384 configure in accordance with the operational parameters. The receive antenna array may be initially configured to start at a default position (e.g., the far left direction of the scanning area 386).

The transceiver 384 generates the outbound wireless signal 390 including the time stamped outbound message. The shaping module 382 passes the outbound wireless signal 390 to the omni-directional transmit antenna where the outbound radar signal 394 is radiated into the scanning area 386. The inbound radar signal 394 is generated by a reflection off of object A. The receive antenna array captures the inbound radar signal 394 and passes the inbound wireless signal 390 to the transceiver 384. The transceiver 384 determines the distance to object A based on the received time stamp message and the received time. The transceiver 384 forms the inbound control signal 388 based on the determination of the amplitude of the inbound wireless signal 390 for this pulse and sends the inbound control signal 388 to the processing module 378 where it is saved for later comparison to similar data from subsequent pulses.

In the example, the transceiver module 384 and/or processing module 378 determines and sends updated operational parameters to the shaping module 382 to alter the pattern of the receive antenna array prior to transmitting the next outbound radar signal 394. The determination may be based on a pre-determined list or may be based in part on an analysis of the received information so far (e.g., track the receive antenna pattern towards the object where the pattern yields a higher amplitude of the inbound wireless signal).

The above process is repeated until each radar device has produced an inbound wireless signal peak for the corresponding receive antenna array pattern. The processing module 378 determines the angle of arrival of the inbound radar signal 394 to each of the radar devices based on the receive antenna array settings (e.g., shaping module operational parameters and antennas deployed). The processing module 378 determines the location information of object A based on the angle of arrival of the inbound radar signals 394 to the radar devices (e.g., where those lines intersect) and the distance and orientation of the radar devices to each other. The above process repeats until the processing module 378 has determined the location information of each object A, B, and C in the scanning area 386.

Note that the transceiver 384, shaping module 382, and antenna module 380 may be combined into one or more radar device integrated circuits operating at 60 GHz. As such, the compact packaging more readily facilitates radar system applications including player motion tracking for gaming consoles and vehicle tracking for vehicular based anti-collision systems. The shaping module 382 and antenna module 380 together may form transmit and receive beams to more readily identify objects in the scanning area 386 and determine their location information.

With the inclusion of a PAMM, the antenna structure 380 can have a full horizon to horizon sweep, thus substantially eliminating blind spots of radar systems for objects near the horizon (e.g., substantially eliminates avoiding radar detection by “flying below the radar”). This is achievable since the PAMM substantially eliminates surfaces waves that dominate conventional antenna structures for signals having a significant angle of incidence (e.g., greater than 60 degrees). Without the surface waves, the in-air beam can be detected even to an angle of incidence near 90 degrees.

FIG. 88 is a schematic block diagram of an embodiment of an antenna structure 380 and the shaping module 382 of the radar system of FIG. 87. The antenna structure 380 includes a plurality of transmit antennas 1-T, a plurality of receive antennas 1-R, and a common projected artificial magnetic mirror (PAMM) 396. The shaping module 382 includes a switching & combining module 398 and a phasing & amplitude module 400 that operate in combination to adjust the phase and amplitude of signals passing through them.

The shaping module 382 manipulates the outbound wireless signal 402 from the transceiver to form a plurality of transmit shaped signals 1-T that are applied to TX antennas 1-T. For example, the shaping module 382 outputs four transmit shaped signals 1-4 where each transmit shaped signal has a unique phase and amplitude compared to the other three. The antenna module 380 forms a transmit beam (e.g., the composite outbound radar signal 406 at angle Φ) when the TX antennas 1-4 are excited by the phase and amplitude manipulated transmit shaped signals 1-4. In another example, the shaping module 382 may pass the outbound wireless signal 402 from the transceiver directly to a single TX antenna utilizing an omni-directional antenna pattern to illuminate at least a portion of the scanning area with the outbound radar signal.

The composite outbound radar signal 406 may reflect off of the object in the scanning area and produce reflections that travel in a plurality of directions based on the geometric and material properties of the object. At least some of the reflections may produce the inbound radar signal that propagates directly from the object to the RX antenna while other reflections may further reflect off of other objects and then propagate to the RX antenna (e.g., multipath).

The shaping module 382 may manipulate receive shaped signals 1-R from the RX antennas 1-R to form the inbound wireless signal 494 that is sent to the transceiver. The antenna module 380 forms the composite inbound radar signal 408 based on the inbound radar signals 1-R and the antenna patterns of each of the RX antennas 1-R. For example, the antenna module 380 forms a receive antenna array with six RX antennas 1-6 to capture the inbound radar signals 1-6 that represent the composite inbound radar signal 408 to produce the receive shaped signals 1-6. The shaping module 382 receives six receive shaped signals 1-6 where each receive shaped signal has a unique phase and amplitude compared to the other five based on the direction of origin of the inbound radar signal and the antenna patterns of RX antennas 1-6. The shaping module 382 manipulates the phase and amplitude of the six receive shaped signals 1-6 to form the inbound wireless signal 404 such that the amplitude of the inbound wireless signal 404 will peak and/or the phase is an expected value when the receive antenna array (e.g., resulting from the operational parameters of the shaping module 382 and the six antenna patterns) is substantially aligned with the direction of the origin of inbound radar signal (e.g., at angle f3). The transceiver module detects the peak and the processing module determines the direction of origin of the inbound radar signal.

The shaping module 382 may receive new operational parameters from the transceiver and/or processing module to further refine either or both of the transmit and receive beams to optimize the search for the object. For example, the transmit beam may be moved to raise the general signal level in a particular area of interest. The receive beam may be moved to refine the composite inbound radar signal angle 408 of arrival determination. Either or both of the transmit and receive beams may be moved to compensate for multipath reflections where such extra reflections are typically time delayed and of a lower amplitude than the inbound radar signal from the direct path from the object.

Note that the switching and combining module 398 and the phasing and amplitude module 400 may be utilized in any order to manipulate signals passing through the shaping module 382. For example, the transmit shaped signal may be formed by phasing, amplitude adjustment, and then switching while the receive shaped signal may be combined, switched, phased, and amplitude adjusted. Further note that the antenna structure 380 may be implement in accordance with one or more of the antenna structures described herein.

FIG. 89 is a schematic block diagram of another embodiment of the antenna structure 380 and the shaping module 382 of the radar system of FIG. 87, which is similar to the corresponding structures of FIG. 88 with the exception that each antenna has its own projected artificial magnetic minor (PAMM) 396. With this configuration of the antenna structure 380, each antenna may be separately configured and/or adjusted by manipulating its PAMM 396.

To support the configuration of the PAMMs 396, the radar system further includes a PAMM control module 410. The PAMM control module 410 issues control signals 412 to each of the PAMM 396 to achieve the desired configuration. For example, each of the antennas may include an effective dish antenna as shown in FIG. 77, where the effective dish shape and/or the focal point of the dish can be changed. As an alternate example, the PAMMs 396 may include adjustable coils as shown in FIGS. 66-76 such that the properties (e.g., frequency band, band gap, band pass, amplifier, electric wall, magnetic wall, etc.) of the PAMMs 396 can be changed.

FIG. 90 is a schematic block diagram of an example of the radar system that includes the processing module (not shown), the shaping module 382, the PAMM control module 410, and the antenna structure. The antenna structure includes a transmit effective dish array 414 and a receive effective dish array 416. Each of the effective dish arrays includes a plurality of effective dish antennas. The shaping module 382 includes the phasing & amplitude module 398 and the switching & combining module 400.

This example begins with the radar system scanning for an object 418. The processing module coordinates the scanning, which is implemented in concert by the shaping module and the PAMM control module 410. For instance, the processing module issues a command to scan in a particular pattern (e.g., from horizon to horizon, in a particular region, etc.) to the PAMM control module 410 and to the shaping module 382. The command indicates the sweeping range (e.g., the variance of the angle of transmission and the angle of reception), the sweeping rate (e.g., how often the angles are changed), and the desired composite antenna radiation pattern. In addition to issuing the scanning command, the processing module generates at least one outbound signal 402.

For a seeking scan (e.g., no objects currently being tracked), the processing module issues the command to sweep from horizon to horizon with a wide antenna radiation pattern at a rate of 1 second. As another example, the processing module issues the command to sweep in a particular region (e.g., limited range for the transmission and reception angles) with a narrower radiation pattern at a rate of 500 mSec. Accordingly, the processing module may issue the command to sweep over any range of angles, with a variety of antenna radiation patterns and a variety of rates.

In response to the command, the PAMM control module 410 generates TX PAMM control signals 420 and RX PAMM control signals 422. The TX PAMM control signals 420 (e.g., one for each effective dish antenna) shapes the effective dish for the corresponding antenna. As an example of providing a wide antenna radiation pattern, the left effective dish antenna of the TX effective dish array 414 is configured to have a radiation pattern that is off normal by a set amount to the left. The center effective dish antenna of the TX effective dish array 414 is configured to have a normal radiation pattern (e.g., no offset) and the right effective dish antenna is configured to have a radiation pattern that is off normal by a set amount to the right. In this manner, composite radiation pattern is essential the sum of the three individual radiation patterns, which is wider than an individual radiation pattern. Note that the TX effective dish array 414 may include more than three effective dish antennas and the composite radiation pattern is three-dimensional. The RX effective dish array 416 is configured in a similar manner.

The shaping module 382 receives the outbound signal generates one or more shaped TX signals 424 based on the command. For example, if the command is to sweep from horizon to horizon, the shaping module generates an initial set of shaped TX signals 424 to have an angle such that, when the shaped TX signals 424 are transmitted via the TX effective dish array 414, the signals are transmitted along the horizon to the left of the radar system. The particular initial transmit angle (θ) depends on the breadth of the radiation pattern of the TX effective dish array. For example, the radiation pattern of the TX effective dish array 414 may be 45 degrees, thus the shaping module 382 will set the initial TX angle to 67.5 degrees (e.g., 90−22.5). As another example, if the TX effective dish array 414 has a 180-degree radiation pattern, then the shaping module 382 would set the initial TX angle to 0 and there would be no sweeping rate, since the radiation patterns covers from horizon to horizon.

When the radiation pattern of the TX effective dish array 414 is less than the 180 degrees, the shaping module 382 reshapes the outbound signal 402 to yield a new transmit angle (θ) at the sweep rate. The shaping module 382 continues reshaping the outbound signal 402 to yield new transmit angles until the sweep has swept from horizon to horizon and then the process is repeated.

While the shaping module 382 is generating the TX shaped signals 424, it may be receiving RX shaped signals 426 from the RX effective dish array 416 when an object 418 is present in the TX and RX antenna radiation patterns. Note that the RX antenna radiation pattern is adjusted in a similar manner as the TX antenna radiation pattern and substantially overlaps the TX antenna radiation pattern.

In this example, the RX effective dish array 414 receives reflected TX signals 424, refracted TX signals, or object-transmitted signals from the object 418 when it is in the RX antenna radiation pattern. The RX effective dish array 414 provides the RX signals 426 to the shaping module 382, which processes them as discussed above to produce an inbound signal 404. The processing module processes the inbound signal to determine the general location of the newly detected object 418.

FIG. 91 is a schematic block diagram that continues with the example of FIG. 90 after the radar system detects the object 418. As discussed with reference to FIG. 90, the processing module determines the general location of the newly detected object 418. To better track the motion of the object, the processing module generates a command to focus the antenna radiation patterns and the TX shaped signals 424 to the general location of the object 428.

The PAMM control module 410 receives the command and, in response, generates updated TX and RX PAMM control signals 420-422. As shown in this example, the TX control signals 420 adjusts the effective dish antennas of the TX effective dish array 414 to each have a radiation pattern that is more orientated towards the object 418. The effective dish antennas of the RX effective dish array 416 are adjusted in a similar manner.

The shaping module 382 generates the TX shaped signals 424 from the outbound signals 402 in accordance with the command. This further focuses on the object 418 (at least to the point of its general location). The shaping module 382 performs similar shaping functions on the RX shaped signals 426 to produce the inbound signal 404. The processing module interprets the inbound signal 404 to update the object's current position.

FIG. 92 is a schematic block diagram that continues with the example of FIGS. 90 and 91. As the processing module updates the object's position, it determines the object's motion. As such, the processing module is tracking the object 418 and may be able to predict its future locations based on its previous locations. Using this information, the processing module generates a command (e.g., an object motion tracking control signal) for the PAMM control module 410 and the shaping module 382 to continue focusing on the object 418.

While the radar system is tracking the object 418, it may also perform sweeps to detect other objects. For example, one or more of the effective dish antennas of the TX effective dish array 414 may be used to track the motion of the detected object 418, while other effective dish antennas are used for scanning. The effective dish antennas of the RX effective dish array 416 would be allocated in a similar manner. As another example, the processing module may issue a command that continues the focused antenna radiation pattern and focused shaped signals, but continues with the sweeping. In this manner, a more focused sweep is performed.

FIG. 93 is a cross sectional diagram of an embodiment of a lateral antenna structure that includes a metal backing 428, a first dielectric 430, a projected artificial magnetic minor (PAMM) 432, a second dielectric 434, an antenna 436, and a third dielectric 438. Each of the dielectric layers may be of the same material (e.g., a layer of a die, package substrate, PCB, etc.) or of a different material. The antenna 436 may a dipole, monopole, or other antenna as discussed herein.

With the dielectric 438 above the antenna 436, it functions as a waveguide or superstrate that channels the radiated energy of the antenna lateral to the antenna 436 as opposed to perpendicular to it. The PAMM 432 functions a previously discussed to mirror the electric field signals being transceived by the antenna 436.

FIG. 94 is a schematic block diagram of another embodiment of a radar system that includes the processing module (not shown), the shaping module 382, and an antenna structure 380. The processing module and the shaping module 382 function as previously discussed.

The antenna structure 380 includes a plurality of lateral antennas 436 (of FIG. 93) and one or more effective dish antennas 264 (of FIGS. 60-62). As shown, a first lateral antenna 436 has a +90 degree radiation pattern and a second lateral antenna 436 has a −90 degree radiation pattern. The effective dish antenna 264 has a 0 degree radiation pattern. With a few antennas, a near horizon-to-horizon composite radiation pattern is obtained. As previously discussed, using a PAMM 396 with an antenna substantially eliminates surface waves and currents that limit the transmit and receive angle of conventional antennas. With this limitation removed, the radar system can detect an object at any angle. Thus, there are no blind spots for the radar system.

FIG. 95 is a cross section diagram of an embodiment of an antenna structure that may be used in a radar system. The antenna structure includes a metal backing 428, a first dielectric 430, a projected artificial magnetic minor (PAMM) 432, a second dielectric 434, a plurality of antennas 436, and a plurality of third dielectrics 438. Each of the dielectric layers may be of the same material (e.g., a layer of a die, package substrate, PCB, etc.) or of a different material. Each of the antennas may a dipole, a monopole, or other antenna as discussed herein.

The third dielectrics 438 over the corresponding antennas 436 create lateral antennas with the lateral radiation patterns as shown. The uncovered antenna has a perpendicular radiation pattern. As such, an omni-directional antenna array can be achieved using a plurality of directional antennas on-chip, on-package, and/or on a printed circuit board.

FIG. 96 is a schematic block diagram of an embodiment of a multiple frequency band projected artificial magnetic minor (PAMM) that includes a plurality of metal traces 444 (e.g., represented by the inductors (L1-L3) with the gray outline). The metal traces 444 are positioned on one or more layers with various positioning and spacing to produce different capacitances therebetween (e.g., C1-C3). With proper sizing of the metal traces and positioning thereof, a distributed L-C network can be obtained that has two or more frequency bands of operation (e.g., the PAMM exhibiting desired properties of an amplifier, a band gap, a bandpass, an electrical wall, a magnetic wall, etc.).

In this example, the PAMM has two frequency bands of operation, where the first frequency band is lower than the second frequency band. In the first frequency band, C1 capacitors are of a capacitance that causes them to effectively be an open (e.g., at the first frequency, C1 capacitors have a high impedance). Capacitors C2 resonant with inductors L3 to provide a desired impedance. Inductor L2 and capacitor C3 are of an inductance and capacitance, respectively, that they are minimal affect in the first frequency band.

Thus, the L1 inductors and the tank circuit of capacitor C2 and inductor L3 to ground (e.g., the metal backing) are dominate in the first frequency band. These components may be tuned in the frequency band to provide the desired PAMM properties.

In the second frequency band, the tank circuits of C2 and L3 are of a high impedance, thus they are essentially open circuits. Further, capacitors C1 and inductors L1 are of a low impedance, thus they are essentially short circuits. Thus, inductors L2 and capacitors C3 are the primary components of the distributed L-C network in the second frequency band. Note that the effective switching provided by the tank circuits (C2 and L3) and coupling capacitors (C1) may be achieved by using switches (e.g., RF switches, MEMS switches, transistors, etc.).

FIG. 97 is a cross sectional diagram of an embodiment of a multiple frequency band projected artificial magnetic minor (PAMM) that includes a first PAMM layer, a second PAMM layer, two dielectric layers 446, a metal backing 450, and a plurality of connections 448. The metal traces of FIG. 96 may be implemented on the first or the second PAMM layer to achieve the desired inductance and/or associated capacitance. Note that capacitors may be specifically fabricated to provide one or more of the capacitors C1-C3.

FIG. 98 is a diagram of an embodiment of an antenna structure that includes a four port decoupling module 452, a dielectric 454, a projected artificial magnetic mirror (PAMM) 456, and a plurality of antennas (two antennas are shown in this illustration). As shown, the antennas are physically separated and are at opposite edges of a substrate. As an example of a 2×2 2.4 GHz antenna, the substrate may be an FR4 substrate that has a size of 20 mm×68 mm with a thickness of 1 mm. The radiator portion of the antenna structure may be 20 mm×18 mm such that the distance between the antennas is about 20 mm. For higher frequency antennas, the dimensions would be smaller.

As shown, the antenna structure is coupled to a ground plane 458, which may be implemented as a PAMM, and is separated from the PAMM layer 456 by the dielectric 454. The four port-decoupling module 452 provides coupling and isolation to the antennas. The four port-decoupling module 452 includes four ports (P1-P4), a pair of capacitors (C1, C2), and a pair of inductors (L1, L2). The capacitors may be fixed capacitors or variable capacitors to enable tuning. The inductors may be fixed inductors or variable inductors to enable tuning. In an embodiment, the capacitance of the capacitors and the inductance of the inductors are selected to provide a desired level of isolation between the ports and a desired impedance within a given frequency range.

FIG. 99 is a diagram of an embodiment of an antenna that includes a plurality of metal traces coupled together by a plurality of vias. In this manner of effective length of the antenna exceeds the geometric area of the antenna.

FIG. 100 is a diagram of an embodiment of a dual band MIMO antenna having a projected artificial magnetic minor (PAMM) 456. This embodiment is similar to that of FIG. 98 with the exception that it includes a second pair of antennas for a second frequency band.

FIG. 101 is a cross sectional diagram of an embodiment of a multiple projected artificial magnetic mirrors (PAMM) on a common substrate. The multiple PAMM structure includes a metal backing 460, a $1^{st}$ PAMM, a $2^{nd}$ PAMM, connections 462, and two dielectrics 464-466. In this configuration, the first PAMM is on the first dielectric 464 and the second PAMM is on the second dielectric 466. Further, the first and second PAMMs are vertically offset such that they have little to no overlapping areas in a vertical direction. Alternatively, the first and second PAMMs may have an overlapping section. Note that each of the first and second PAMMs may be tuned to the same or different frequency bands.

FIG. 102 is a cross sectional diagram of an embodiment of a multiple projected artificial magnetic mirrors (PAMM) on a common substrate. The multiple PAMM structure includes a metal backing 460, a $1^{st}$ PAMM, a $2^{nd}$ PAMM, connections 462, and a dielectric 464. In this configuration, the first and second PAMMs are on the dielectric 464 and are physically separated such that they have little to no interaction therebetween. Note that each of the first and second PAMMs may be tuned to the same or different frequency bands.

Figure 103A:
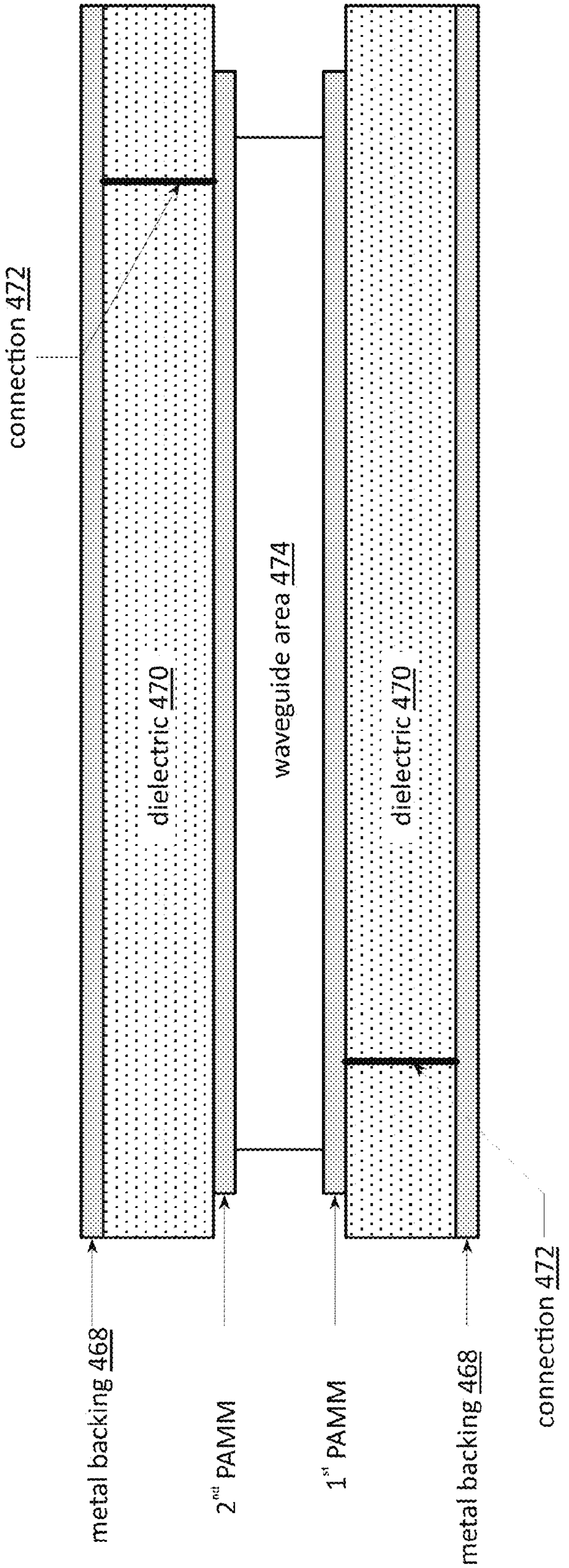

FIG. 103*a* is a cross sectional diagram of an embodiment of a projected artificial magnetic minor (PAMM) waveguide that includes a first PAMM assembly (e.g., a plurality of metal patches ($1^{st}$ PAMM), a first dielectric material 470, and a first metal backing 468), a second PAMM assembly (e.g., a plurality of metal patches ($2^{nd}$ PAMM), a second dielectric material 470, and a second metal backing 468), and a waveguide area 474.

The PAMM assembly is on a first set of layers of a substrate (e.g., IC die, IC package substrate, PCB, etc.) to form a first inductive-capacitive network that substantially reduces surface waves along a first surface of the substrate within a first given frequency band as previously discussed. The second PAMM assembly is on a second set of layers of the substrate to form a second inductive-capacitive network that substantially reduces surface waves along a second surface of the substrate within a second given frequency band. Note that the first given frequency band has a frequency range that is substantially similar to a frequency range of the second given frequency band; that substantially overlaps the frequency range of the second given frequency band; and/or that is substantially non-overlapping with the frequency range of the second given frequency band.

The first and second PAMM assemblies function to contain an electromagnetic signal substantially within the waveguide area 474. For example, if the electromagnetic signal is an RF or MMW signal radiated from an antenna proximally located to the waveguide area, energy of the RF or MMW signal will be substantially confined within the waveguide area.

Figure 103B:
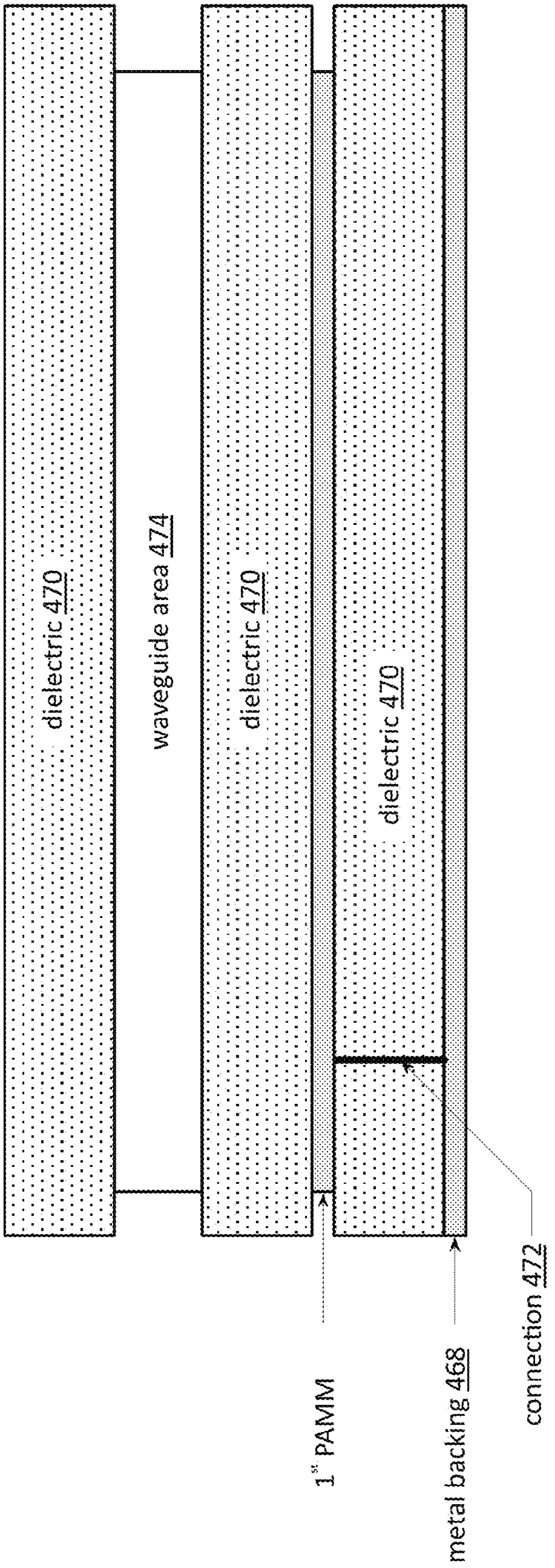

FIG. 103*b* is a cross sectional diagram of another embodiment of a projected artificial magnetic minor (PAMM) waveguide that includes a plurality of metal patches (e.g., $1^{st}$ PAMM), a metal backing 468, a waveguide area 474, and three dielectric layers 470, which may be of the same dielectric material, different dielectric material, or a combination thereof. The plurality of metal patches is on a first layer of a substrate (e.g., IC die, IC package substrate, PCB, etc.) and the metal backing is on a second layer of the substrate. The first of the dielectric materials is between the first and second layers of the substrate and the second of the dielectric materials is juxtaposed to the plurality of metal patches. The waveguide area 474 is between the second and third dielectric materials.

In an example of operation, the plurality of metal patches is electrically coupled (e.g., direct or capacitively) to the metal backing 468 to form an inductive-capacitive network that substantially reduces surface waves along a surface of the substrate within a given frequency band. With the waveguide area 474 between the second and third dielectric materials, at least one of the inductive-capacitive network, the second dielectric material, and the third dielectric material facilitates confining an electromagnetic signal within the waveguide area 474. For instance, the PAMM layer reflects energy of electromagnetic signals into the waveguide area 474 and the third dielectric (e.g., the one pictured above the waveguide area 474) channels radiated energy laterally along its surface.

Figure 103C:
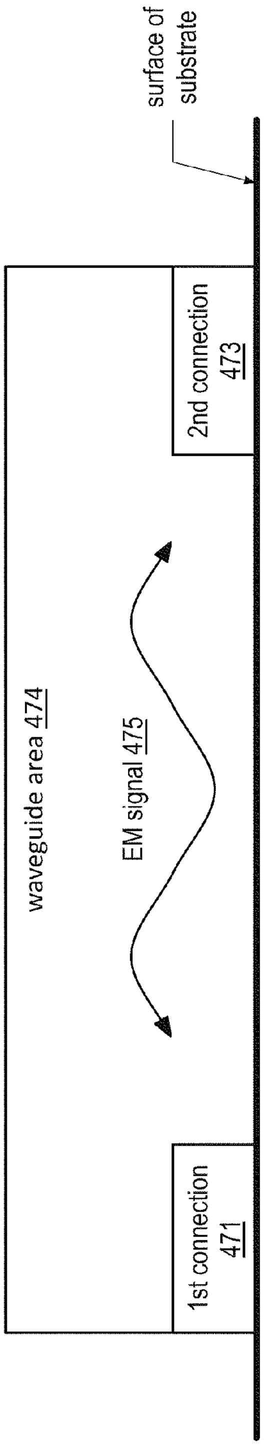

FIG. 103*c* is a cross-sectional diagram of an embodiment of the waveguide area 474 that includes first and second connections 471 and 473. The connections 471 and 473 may be metal traces, antennas, microstrips, etc. on a layer of the substrate and are operable to communicate the electromagnetic signal. The waveguide area 474 may further include air and/or a dielectric material as a waveguide dielectric (i.e., the material filling the waveguide area 474).

Figure 103D:
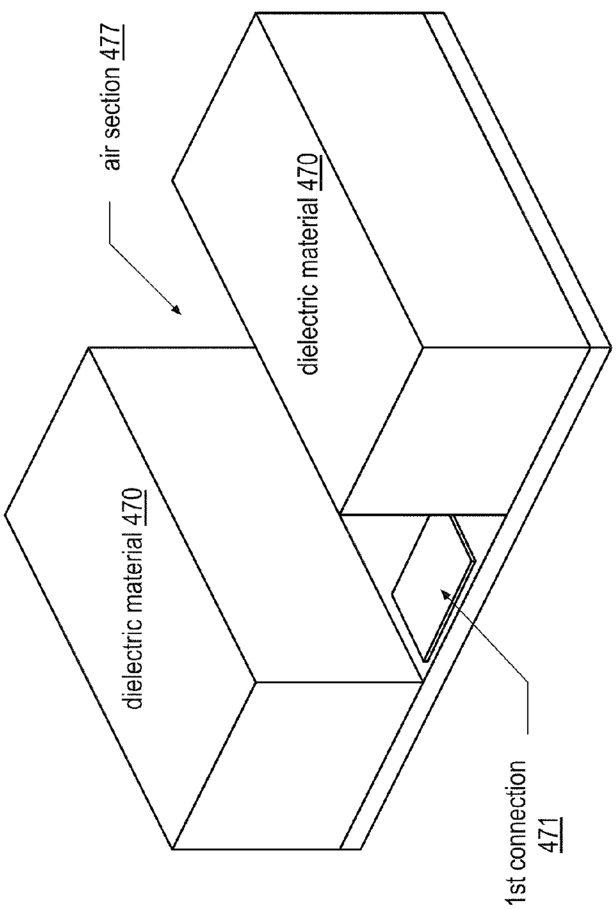

FIG. 103*d* is a cross-sectional diagram of another embodiment of the waveguide area 474 that includes the first and second connections 471 and 473 and a fourth dielectric material 470, which includes an air section 477. The connections 471 and 473 are on a layer of the substrate and are positioned within the air section 477. In this manner, the electromagnetic signal communicated between the first and second connections 471 and 473 is substantially confined to the air section 477.

FIG. 104 is a diagram of an embodiment of an-chip projected artificial magnetic mirror interface for in-band communications. In this example, a PAMM 478 layer includes one or more feedthroughs 476 that enable in-band signals to be communicated between a circuit 484 on one side of the PAMM 478 and a connector 482 (or other circuit) on the other side of the PAMM 478. The connectors 482 may be electrical connections or optical connectors.

FIG. 105 is a cross sectional diagram of an embodiment of a projected artificial magnetic minor (PAMM) 484 to a lower layer. As shown, the circuit element 494 is on a lower level than the PAMM layer 484.

FIG. 106 is a diagram of an embodiment of a transmission line 496 coupled to one or more circuit components 506. The transmission line 496 is fabricated on an outer layer 498 of a die and/or package substrate and a projected artificial magnetic mirror (PAMM) 500 is fabricated on an inner layer 502 of the die and/or package substrate. The circuit components 506 are fabricated on one or more layers of the die and/or package substrate, which may be the bottom layer 508. A metal backing 510 is fabricated on the bottom layer 508. While not shown, the transmission line 496 may be coupled to an antenna structure and/or to an impedance matching circuit.

The projected artificial magnetic minor (PAMM) 500 includes at least one opening to allow one or more connections to pass there-through, thus enabling electrical connection of the transmission line 496 to one or more of the circuit components 506 (e.g., a power amplifier, a low noise amplifier, a transmit/receive switch, an circulator, etc.). The connections 504 may be metal vias that are may or may not be insulated.

FIG. 107 is a diagram of an embodiment of a filter 512 having a projected artificial magnetic minor (PAMM) 500. The filter 512 is fabricated on an outer layer 498 of a die and/or package substrate and the PAMM 500 is fabricated on an inner layer 502 of the die and/or package substrate. The circuit components 506 are fabricated on one or more layers of the die and/or package substrate, which may be the bottom layer 508. A metal backing 510 is fabricated on the bottom layer 508. While not shown, the filter 512 may be coupled to one or more of the circuit components 506.

The projected artificial magnetic minor (PAMM) 500 may include at least one opening to allow one or more connections to pass there-through, thus enabling electrical connection of the filter 512 to one or more of the circuit components 506 (e.g., a power amplifier, a low noise amplifier, a transmit/receive switch, an circulator, etc.). The connections may be metal vias that are may or may not be insulated.

FIG. 108 is a diagram of an embodiment of an inductor 514 having a projected artificial magnetic mirror (PAMM) 500. The inductor 514 is fabricated on an outer layer 498 of a die and/or package substrate and the PAMM 500 is fabricated on an inner layer 502 of the die and/or package substrate. The circuit components 506 are fabricated on one or more layers of the die and/or package substrate, which may be the bottom layer 508. A metal backing 510 is fabricated on the bottom layer 508. While not shown, the inductor 514 may be coupled to one or more of the circuit components 506.

The projected artificial magnetic minor (PAMM) 500 may include at least one opening to allow one or more connections to pass there-through, thus enabling electrical connection of the inductor 514 to one or more of the circuit components 506 (e.g., a power amplifier, a low noise amplifier, a transmit/receive switch, an circulator, etc.). The connections may be metal vias that are may or may not be insulated.

FIG. 109 is a cross sectional diagram of an embodiment of an antenna structure on a multi-layer die and/or package substrate 516. The antenna structure includes one or more antennas 518, a projected artificial magnetic mirror (PAMM) 520, and a metal backing 522. The die and/or package substrate 516 may also support circuit components 524 on other layers 526.

In this embodiment, the one or more antennas 518 are coplanar with the PAMM 520. The PAMM 520 may be adjacent to the antenna(s) 518 or encircle the antenna(s) 518. The PAMM 520 is constructed to have a magnetic wall that is at the level of the PAMM 520 (as opposed to above or below it). In this instance, the antenna 518 can be coplanar and exhibit the properties previously discussed.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof. Further, a concept discussed with reference to particular figure may be applicable with a concept discussed with reference to another figure even though not specifically mentioned.

What is claimed is:

1. A projected artificial magnetic mirror (PAMM) waveguide comprises:

a plurality of metal patches, wherein a first layer of a substrate is on a first side of the plurality of metal patches;

a metal backing on a second layer of the substrate;

a first dielectric material between the first and second layers of the substrate, wherein the plurality of metal patches is electrically coupled to the metal backing to form an inductive-capacitive network that substantially reduces surface waves along a surface of the substrate within a given frequency band;

a second dielectric material juxtaposed to a second side of the plurality of metal patches;

a third dielectric material; and a waveguide area formed between the second and third dielectric materials and including the surface of the substrate, wherein at least one of the inductive-capacitive network, the second dielectric material, and the third dielectric material facilitates confining an electromagnetic signal within the waveguide area.

2. The PAMM waveguide of claim 1, wherein the waveguide area comprises:

a first connection on a third layer of the substrate that is on the surface of the substrate; and a second connection on the third layer of the substrate, wherein the electromagnetic signal is communicated between the first and second connections.

3. The PAMM waveguide of claim 1, wherein the waveguide area comprises at least one of:

air as a waveguide dielectric; and a fourth dielectric material as the waveguide dielectric.

4. The PAMM waveguide of claim 1, wherein the waveguide area comprises:

a first connection on a third layer of the substrate that is on the surface of the substrate;

a second connection on the third layer of the substrate, wherein the electromagnetic signal is communicated between the first and second connections; and a fourth dielectric material on the third layer between the first and second connections.

5. The PAMM waveguide of claim 1, wherein the waveguide area comprises:

a fourth dielectric having an air section;

a first connection on a third layer of the substrate that is on the surface of the substrate;

a second connection on the third layer of the substrate, wherein the electromagnetic signal is communicated between the first and second connections and wherein the first and second connections are proximally positioned in the air section.

6. The PAMM waveguide of claim 1, wherein a metal patch of the plurality of metal patches comprises at least one of:

a microstrip;

a coil;

a concentric spiral coil;

an eccentric spiral coil;

a modified Polya curve metal trace;

a plurality of metal segments and a plurality of switching elements.

7. A projected artificial magnetic mirror (PAMM) waveguide comprises:

a first projected artificial magnetic mirror (PAMM) assembly on a first set of layers of a substrate to form a first inductive-capacitive network that substantially reduces surface waves along a first surface of the substrate within a first given frequency band;

a second PAMM assembly on a second set of layers of the substrate to form a second inductive-capacitive network that substantially reduces surface waves along a second surface of the substrate within a second given frequency band; and a waveguide area between the first and second PAMM assemblies, wherein an electromagnetic signal is substantially confined within the waveguide area.

8. The PAMM waveguide of claim 7, wherein the first PAMM assembly comprises:

a plurality of metal patches on a first layer of the first set of layers;

a metal backing on a second layer of the first set of layers; and a dielectric material between the first and second layers of the first set of layers, wherein a metal patch of the plurality of metal patches includes at least one of:

a microstrip;

a coil;

a concentric spiral coil;

an eccentric spiral coil;

a modified Polya curve metal trace;

a plurality of metal segments and a plurality of switching elements.

9. The PAMM waveguide of claim 7, wherein the second PAMM assembly comprises:

a plurality of metal patches on a first layer of the second set of layers;

a metal backing on a second layer of the second set of layers; and a dielectric material between the first and second layers of the second set of layers, wherein a metal patch of the plurality of metal patches includes at least one of:

a microstrip;

a coil;

a concentric spiral coil;

an eccentric spiral coil;

a modified Polya curve metal trace;

a plurality of metal segments and a plurality of switching elements.

10. The PAMM waveguide of claim 7 further comprises:

the first given frequency band having a frequency range that is at least one of: substantially similar to a frequency range of the second given frequency band, substantially overlaps the frequency range of the second given frequency band, and substantially non-overlapping with the frequency range of the second given frequency band.

11. The PAMM waveguide of claim 7, wherein the waveguide area comprises:

a first connection on a third layer of the substrate that is within the waveguide area; and a second connection on the third layer of the substrate, wherein the electromagnetic signal is communicated between the first and second connections.

12. The PAMM waveguide of claim 7, wherein the waveguide area comprises at least one of:

air as a waveguide dielectric; and a fourth dielectric material as the waveguide dielectric.

13. The PAMM waveguide of claim 7, wherein the waveguide area comprises:

a first connection on a third layer of the substrate that is within the waveguide area;

a second connection on the third layer of the substrate, wherein the electromagnetic signal is communicated between the first and second connections; and a fourth dielectric material on the third layer between the first and second connections.

14. The PAMM waveguide of claim 7, wherein the waveguide area comprises:

a fourth dielectric having an air section;

a first connection on a third layer of the substrate and is within the air section;

a second connection on the third layer of the substrate and is within the air, section wherein the electromagnetic signal is communicated between the first and second connections.

15. A projected artificial magnetic mirror (PAMM) waveguide comprises:

a first projected artificial magnetic mirror (PAMM) assembly on a first layer of a substrate, wherein the PAMM assembly includes a first plurality of metal patches;

a metal backing on a second layer of the substrate;

a first dielectric material between the first and second layers of the substrate, wherein the plurality of metal patches is electrically coupled to the metal backing to form an inductive-capacitive network that substantially reduces surface waves along a surface of the substrate within a given frequency band;

a second dielectric material juxtaposed to the plurality of metal patches;

a third dielectric material; and a waveguide area between the second and third dielectric materials and including the surface of the substrate, wherein at least one of the inductive-capacitive network, the second dielectric material, and the third dielectric material facilitates confining an electromagnetic signal within the waveguide area.

16. The PAMM waveguide of claim 15, wherein the waveguide area comprises:

a first connection on a third layer of the substrate that is on the surface of the substrate; and a second connection on the third layer of the substrate, wherein the electromagnetic signal is communicated between the first and second connections.

17. The PAMM waveguide of claim 15, wherein the waveguide area comprises at least one of:

air as a waveguide dielectric; and a fourth dielectric material as the waveguide dielectric.

18. The PAMM waveguide of claim 15, wherein the waveguide area comprises:

a first connection on a third layer of the substrate that is on the surface of the substrate;

a second connection on the third layer of the substrate, wherein the electromagnetic signal is communicated between the first and second connections; and a fourth dielectric material on the third layer between the first and second connections.

19. The PAMM waveguide of claim 15, wherein the waveguide area comprises:

a fourth dielectric having an air section;

a first connection on a third layer of the substrate that is on the surface of the substrate;

a second connection on the third layer of the substrate, wherein the electromagnetic signal is communicated between the first and second connections and wherein the first and second connections are proximally positioned in the air section.

20. The PAMM waveguide of claim 15, wherein a metal patch of the plurality of metal patches comprises at least one of:

a microstrip;

a coil;

a concentric spiral coil;

an eccentric spiral coil;

a modified Polya curve metal trace;

a plurality of metal segments and a plurality of switching elements.

* * * * *